United States Patent
Takeuchi et al.

[11] Patent Number: 5,862,275
[45] Date of Patent: Jan. 19, 1999

[54] DISPLAY DEVICE

[75] Inventors: Yukihisa Takeuchi, Nishikamo-Gun; Tsutomu Nanataki, Toyoake; Iwao Ohwada, Nagoya; Masao Takahashi, Kuwana, all of Japan

[73] Assignee: NGK Insulators, Ltd., Japan

[21] Appl. No.: 882,066

[22] Filed: Jun. 25, 1997

[30] Foreign Application Priority Data

Jul. 10, 1996 [JP] Japan ................................ 8-180981
Dec. 16, 1996 [JP] Japan ................................ 8-335876

[51] Int. Cl.⁶ .......................... G02B 6/26; H01L 41/08
[52] U.S. Cl. .................... 385/19; 385/901; 310/324; 310/328; 310/330; 359/295; 345/85
[58] Field of Search ................... 385/19, 8, 14, 385/129, 131, 901; 310/324, 327, 330, 328, 331, 348, 358; 359/291, 295, 196, 222–224; 345/30, 48, 84–85, 108

[56] References Cited

U.S. PATENT DOCUMENTS

| | | | |
|---|---|---|---|
| 4,113,360 | 9/1978 | Baur et al. | 345/84 |
| 5,052,777 | 10/1991 | Ninnis et al. | 385/19 |
| 5,430,344 | 7/1995 | Takeuchi et al. | 310/330 |
| 5,600,197 | 2/1997 | Takeuchi et al. | 310/328 |
| 5,613,022 | 3/1997 | Odhner et al. | 385/20 |

FOREIGN PATENT DOCUMENTS 0 675 477 A1 10/1995 European Pat. Off. .
7-287176 A 10/1995 Japan .

*Primary Examiner*—Hemang Sanghavi
*Attorney, Agent, or Firm*—Wall Marjama Bilinski & Burr

[57] ABSTRACT

Disclosed is a display device for displaying a picture on an optical waveguide plate in accordance with an image signal by controlling displacement movement of each of actuator elements in a direction to make contact or separation with respect to the optical waveguide plate so that scattered light is controlled at a predetermined position on the optical waveguide plate, wherein the actuator element comprises a main actuator element including a piezoelectric/electrostrictive layer, and a pair of electrodes formed on a first principal surface of the piezoelectric/electrostrictive layer, a vibrating section contacting with a second principal surface of the piezoelectric/electrostrictive layer, for supporting the main actuator element, and a fixed section for supporting the vibrating section in a vibrative manner, and wherein the actuator element further comprises a displacement-transmitting section for transmitting, to the optical waveguide plate, displacement movement of the main actuator element caused by applying a voltage between the pair of electrodes. According to the display device, the electrostatic capacity of the actuator element can be reduced, further, display brightness without any nonuniformity can be obtained, and it is possible to improve the image quality.

23 Claims, 30 Drawing Sheets

Va: VOLTAGE TO GIVE ELECTRIC FIELD Ea (-3E)
Vg: VOLTAGE TO GIVE ELECTRIC FIELD Eg (+3E)

P : POLARIZATION DIRECTION
E : DIRECTION OF ELECTRIC FIELD

P : POLARIZATION DIRECTION
E : DIRECTION OF ELECTRIC FIELD

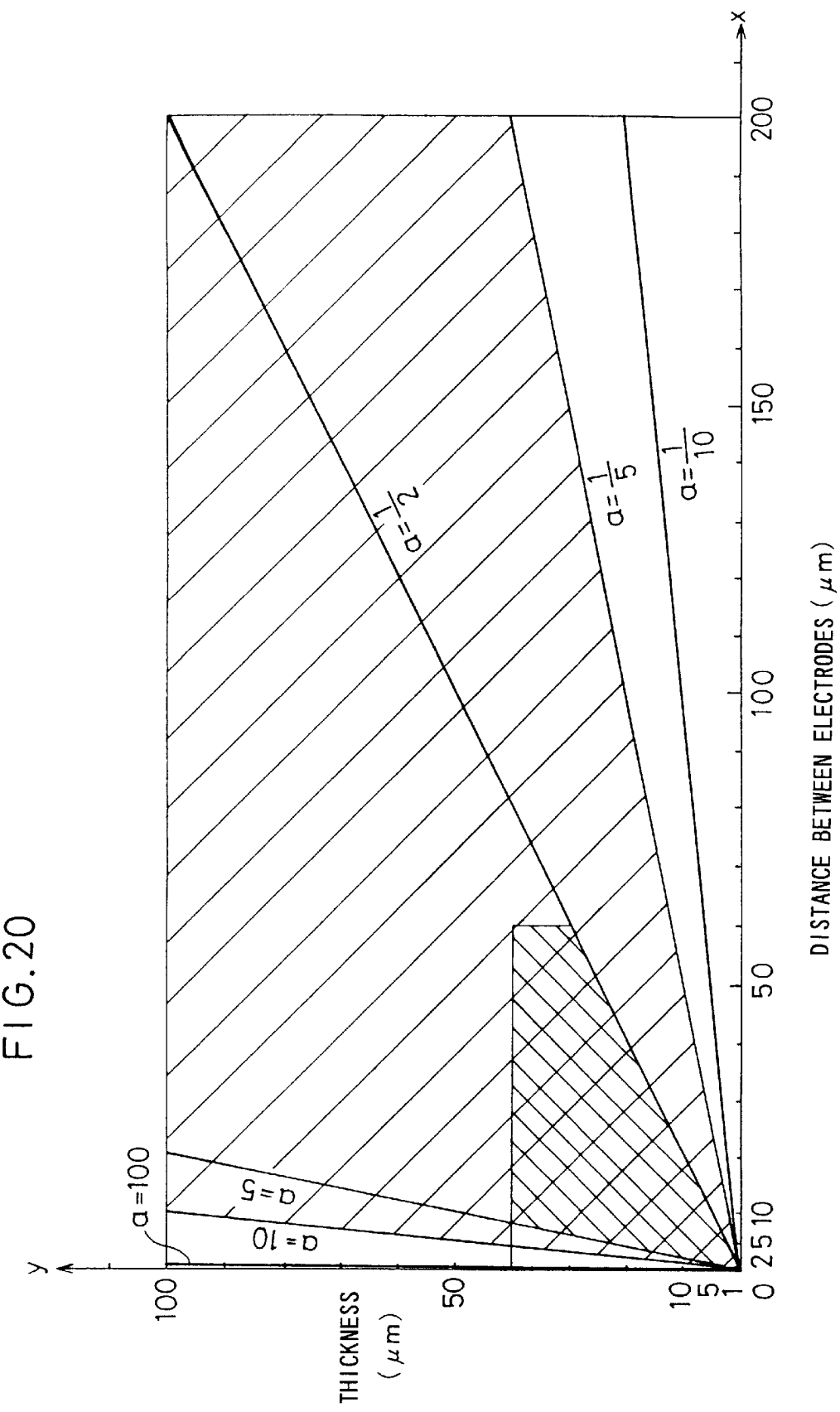

Va : VOLTAGE TO GIVE ELECTRIC FIELD Ea (−3E)
Vg : VOLTAGE TO GIVE ELECTRIC FIELD Eg (+3E)

⇩ : POLARIZATION DIRECTION
↓ : DIRECTION OF ELECTRIC FIELD

⇩ : POLARIZATION DIRECTION
↑ : DIRECTION OF ELECTRIC FIELD

⇧ : POLARIZATION DIRECTION
↑ : DIRECTION OF ELECTRIC FIELD

⇧ : POLARIZATION DIRECTION
↓ : DIRECTION OF ELECTRIC FIELD

DISPLAY DEVICE

BACKGROUND OF THE INVENTION

1. Field of the Invention:

The present invention relates to a display device which consumes less electric power and provides high brightness on a screen. In particular, the present invention relates to improvement in a display device for displaying a picture on an optical waveguide plate corresponding to an image signal by controlling displacement movement of actuator elements in a direction to make contact or separation with respect to the optical waveguide plate in accordance with an attribute of the inputted image signal to control leakage light at predetermined positions on the optical waveguide plate.

2. Description of the Related Art:

Display devices such as cathode-ray tube (CRT) and liquid crystal display devices have been hitherto known.

Those known as the cathode-ray tube include, for example, ordinary television sets and monitor devices for computers. Although the cathode-ray tube provides a bright screen, it involves problems in that a large amount of electric power is consumed, and an entire display device has a large depth or length as compared with a size of the screen.

On the other hand, the liquid crystal display device is advantageous in that an entire device can be miniaturized, and the amount of electric power consumption is small. However, the liquid crystal display device involves problems in that the screen brightness is inferior, and the screen has a narrow angle of view.

Further, when a color screen is produced by using the cathode-ray tube or the liquid crystal display device, it is necessary that the number of picture elements is three times that of a black-and-white screen. For this reason, problems also arise in that the device itself is complicated, the electric power consumption increases, and the cost inevitably increases.

In order to solve the foregoing problems, the present applicant has been suggested a novel display device (for example, see Japanese Laid-Open Patent Publication No. 7-287176). As shown in FIG. 30, this display device includes actuator elements 100 arranged for each of picture elements. Each of the actuator elements 100 comprises a main actuator element 108 and a substrate 114. The main actuator element 108 includes a piezoelectric/electrostrictive layer 102 and upper lower electrodes 104, 106 formed on upper and lower surfaces of the piezoelectric/electrostrictive layer 102 respectively. The substrate 114, which is disposed under the main actuator element 108, includes a vibrating section 110 and a fixed section 112. The lower electrode 106 of the main actuator element 108 contacts with the vibrating section 110. The main actuator body 108 is supported by the vibrating section 110.

The substrate 114, which is composed of a ceramic material, is constructed by integrating the vibrating section 110 and the fixed section 112. A recess 116 is formed in the substrate 114 so that the vibrating section 110 is thin-walled.

A displacement-transmitting section 120 for ensuring a predetermined size of a contact area with respect to an optical waveguide plate 118 is connected to the upper electrode 104 of the main actuator element 108. In the illustrative device shown in FIG. 30, the displacement-transmitting section 120 is disposed closely to the optical waveguide plate 118 in a state of OFF selection or NO selection in which the actuator element 100 stands still, while in a state of ON selection, the displacement-transmitting section 120 is disposed to contact with the optical waveguide plate 118 with a distance of not more than the wavelength of light intervening therebetween, if any.

Light 122 is introduced, for example, from an end of the optical waveguide plate 118. In this arrangement, all of the light 122 is subjected to total reflection at the inside of the optical waveguide plate 118 without being transmitted through front and back surfaces of the optical waveguide plate 118, by controlling the magnitude of the refractive index of the optical waveguide plate 118. In this state, a voltage signal corresponding to an attribute of an image signal is selectively applied to the actuator element 100 via the upper electrode 104 and the lower electrode 106 to allow the actuator element 100 to perform various displacement movements based on ON selection, OFF selection, and NO selection. Thus the displacement-transmitting section 120 is controlled for its contact and separation with respect to the optical waveguide plate 118. Accordingly, scattered light (leakage light) 124 is controlled at a predetermined position of the optical waveguide plate 118, and a picture is displayed on the optical waveguide plate 118 in accordance with the image signal.

This display device is advantageous, for example, in that (1) the electric power consumption can be decreased, (2) the screen brightness can be increased, and (3) it is unnecessary to increase the number of picture elements when a color screen is produced, as compared with a black-and-white screen.

However, the illustrative display device suggested by the applicant has a so-called sandwich structure of the main actuator element 108 in which the upper electrode 104 and the lower electrode 106 are formed on the piezoelectric/electrostrictive layer 102. Therefore, it is feared that the electrostatic capacity of the main actuator element 108 may inevitably become large, and the CR time constant for signal transmittance may become large in view of wiring resistance between the mutual main actuator elements 108.

If the CR time constant becomes large, a problem arises in that rounding occurs in signal waveform of a voltage signal corresponding to an attribute of an image signal, and it is impossible to apply a specified voltage to each of the electrodes. This results in failure in provision of necessary distortion to the piezoelectric/electrostrictive layer 102. Especially, it is feared that the display brightness is weakened at portions corresponding to the actuator elements 100 arranged at positions (for example, peripheral and central portions of the screen) far from the voltage signal supply point.

In the case of the illustrative display device suggested by the applicant, the actuator element 100, which is composed of the main actuator element 108 having the sandwich structure, the vibrating section 110, and the fixed section, has a certain bending displacement characteristic as shown in FIG. 31B. Namely, the bending displacement characteristic is symmetrical in positive and negative directions of the electric field in relation to a reference electric field point (point of the electric field=0) as a center. It is assumed that the direction of the bending displacement is positive when the actuator element 100 is displaced in a convex manner in a first direction (direction for the upper electrode 104 formed on the piezoelectric/electrostrictive layer 102 to face the free space), while the direction of the bending displacement is negative when the actuator element 100 is displaced in a concave manner.

The displacement characteristic is obtained by observing the displacement of the actuator element 100 as follows.

Namely, the piezoelectric/electrostrictive layer 102 is subjected to a polarization treatment by applying a predetermined voltage between the upper electrode 104 and the lower electrode 106. After that, the voltage applied between the upper electrode 104 and the lower electrode 106 is continuously changed so that the electric field applied to the actuator element 100 changes to, for example, electric fields of +3E→−3E→+3E.

Namely, at first, an electric field for polarization (for example, +5E) is applied in the positive direction to the actuator element 100 to perform the polarization treatment for the piezoelectric/electrostrictive layer 10. After that, the voltage application between the upper electrode 104 and the lower electrode 106 is stopped to give a no-voltage-loaded state. Simultaneously with the start of measurement, a sine wave having a frequency of 1 Hz and peak values of ±3E (see FIG. 31A) is applied to the actuator element 100. During this process, the displacement amount is continuously measured at respective points (Point A to Point D) by using a laser displacement meter. FIG. 31B shows a characteristic curve obtained by plotting results of the measurement on a graph of electric field-bending displacement. As indicated by arrows in FIG. 31B, the displacement amount of the bending displacement continuously changes in accordance with continuous increase and decrease in electric field.

Specifically, it is assumed that the measurement is started from an electric field +3E. At first, as shown in FIG. 32A, the electric field is applied to the actuator element 100 in the same direction as that of the polarization direction. Accordingly, the piezoelectric/electrostrictive layer 102 is elongated in a direction across the upper electrode 104 and the lower electrode 106, and it is contracted in a direction parallel to the upper electrode 104 and the lower electrode 106. As a result, the entire actuator element is displaced in the negative direction in an amount of about 0.9 Δy.

After that, when the electric field is changed from +3E to −0.5E, the displacement amount is gradually decreased. When the electric field is in the negative direction, as shown in FIG. 32B, the electric field is applied in the direction opposite to the polarization direction. Therefore, elongation occurs in the piezoelectric/electrostrictive layer 102 in the direction parallel to the upper electrode 104 and the lower electrode 106, and the displacement is changed to the positive direction.

Next, when the electric field is changed in a direction of −0.5E→−3E, the polarization direction is gradually inverted. Namely, the direction of the electric field is gradually aligned with the polarization direction. As for Point B→Point c→Point C in FIG. 31B, it is assumed that the polarization is inverted approximately completely at Point c, because no hysteresis is observed between Point c and Point C.

As shown in FIG. 33A, the alignment of the direction of the electric field with the polarization direction allows the piezoelectric/electrostrictive layer 102 to change from the state of horizontal elongation to a state of contraction. At a stage at which the electric field is −3E, the displacement amount is approximately the same as the displacement amount (0.9 Δy) obtained at the start point of the measurement.

Namely, when the polarization direction is coincident with the direction of the electric field, the piezoelectric/electrostrictive layer 102 is contracted in the direction parallel to the electrodes 104, 106 (elongated in the direction across the electrodes 104, 106). This situation corresponds to the states represented by Point A and Point C. When the polarization direction is opposite to the direction of the electric field, the piezoelectric/electrostrictive layer 102 is elongated in the direction parallel to the electrodes 104, 106 (contracted in the direction across the electrodes 104, 106). This situation corresponds to the states represented by Point B and Point D. It is noted that there are given 1E=about 1.7 kV/mm and 1 Δy=about 1.6 μm.

After that, when the electric field is changed from −3E to +0.5E, the displacement amount is gradually decreased. When the electric field is in the positive direction, as shown in FIG. 33B, the electric field is applied in the direction opposite to the polarization direction. Accordingly, elongation occurs in the piezoelectric/electrostrictive layer 102 in the direction parallel to the upper electrode 104 and the lower electrode 106, and the displacement is changed to the positive direction.

When the electric field is changed in a direction of +0.5E→+3E, the polarization direction is gradually inverted. When the direction of the electric field is aligned with the polarization direction, the piezoelectric/electrostrictive layer 102 is changed from the state of horizontal elongation to a state of contraction.

As described above, in the case of the actuator element 100 of the illustrative display device suggested by the applicant, the bending displacement characteristic is symmetrical in the positive and negative directions in relation to the reference electric field point (electric field E=0) as the center. Therefore, the relative displacement amount is small between the no-voltage-loaded state and the voltage-applied state, and the relative displacement amount is small between the states in which mutually opposite electric fields are applied respectively. As a result, it is feared that the control of the actuator element 100 may become difficult. This fact involves a possibility for the display device to be disadvantageous from a viewpoint of improvement in image quality. Accordingly, it is necessary to promptly make a countermeasure thereagainst.

SUMMARY OF THE INVENTION

The present invention has been made taking such tasks into consideration, an object of which is to provide a display device which has an advantage that the electrostatic capacity of an actuator element can be reduced, in addition to an advantage that it is unnecessary to increase the number of picture elements even when the display device is applied to a color display system as compared with a black-and-white screen, in which display brightness without any nonuniformity can be obtained when a white color is displayed on an entire surface of a display screen, and it is possible to improve the image quality.

In order to achieve the object described above, the present invention provides a display device including an optical waveguide plate for introducing light thereinto, and a driving unit disposed opposingly to one plate surface of the optical waveguide plate and arranged with actuator elements of a number corresponding to a large number of picture elements, for displaying a picture on the optical waveguide plate in accordance with an image signal by controlling displacement movement of each of the actuator elements in a direction to make contact or separation with respect to the optical waveguide plate in accordance with an attribute of the image signal to be inputted so that leakage light is controlled at a predetermined position on the optical waveguide plate, wherein the actuator element comprises a main actuator element including a piezoelectric/electrostrictive layer, and a pair of electrodes formed on a first principal surface of the piezoelectric/electrostrictive layer, a vibrating section contacting with a second principal surface of the piezoelectric/electrostrictive layer, for supporting the main actuator element, and a fixed section for supporting the vibrating section in a vibrative manner, and wherein the actuator element further comprises a displacement-transmitting section for transmitting, to the optical waveguide plate, the displacement movement of the actuator element caused by applying a voltage between the pair of electrodes.

Accordingly, at first, the light is introduced, for example, from an end of the optical waveguide plate, and all of the light is subjected to total reflection at the inside of the optical waveguide plate without being transmitted through front and back surfaces of the optical waveguide plate by controlling the magnitude of the refractive index of the optical waveguide plate. In this state, for example, when the displacement-transmitting section contacts with the back surface of the optical waveguide plate with a distance of not more than the wavelength of the light, if any, the light, which has been subjected to total reflection, is transmitted to a surface of the displacement-transmitting section which contacts with the back surface of the optical waveguide plate. The light, which has once arrived at the surface of the displacement-transmitting section, is reflected by the surface of the displacement-transmitting section, and it behaves as scattered light. A part of the scattered light is reflected again in the optical waveguide plate. However, the greater part of the scattered light is transmitted through the front surface of the optical waveguide plate without being reflected by the optical waveguide plate.

As described above, the presence or absence of light emission (leakage light) from the front surface of the optical waveguide plate can be controlled in accordance with the presence or absence of the contact of the displacement-transmitting section disposed at the back of the optical waveguide plate. In this arrangement, one unit for making the displacement movement of the displacement-transmitting section in the direction to make contact or separation with respect to the optical waveguide plate may be considered to be one picture element. Accordingly, a large number of the picture elements are arranged in a matrix form, and the displacement movement concerning each of the picture elements is controlled in accordance with an attribute of an image signal to be inputted. Thus a picture (for example, characters and patterns) can be displayed on the front surface of the optical waveguide plate in accordance with the image signal, in the same manner as the cathode-ray tube and the liquid crystal display device.

Next, explanation will be made for application of the display device according to the present invention to a color display system. At first, it is considered that human recognizes a color on the basis of mixing of the three primary colors remaining on the optic nerve. Namely, the action, which is equivalent to that of the color display system in present use based on the mixing of the three primary colors, is performed in the human vision.

Based on this knowledge, the principle of color development of the present invention will be explained. The principle of color development is specified by the mixing system of R (red), G (green), and B (blue) which are the three primary colors. Now, it is assumed that the period of color development is T in order to consider that the maximum emission time of RGB is divided into three. When the ratio of RGB emission times is 1:1:1, white light is obtained. When the ratio of RGB emission times is 4:1:5, an intermediate color corresponding to the ratio is obtained.

Therefore, the time of color development may be controlled as follows. Namely, the emission times of the three primary colors are controlled, while the contact time between the optical waveguide plate and the displacement-transmitting section is synchronized with the period of color development. Alternatively, the contact time between the optical waveguide plate and the displacement-transmitting section is controlled, while the emission times of the three primary colors are synchronized with the period of color development.

In view of the foregoing facts, the display device according to the present invention is advantageous in that it is unnecessary to increase the number of picture elements as compared with the case of a black-and-white screen even when the display device is applied to the color display system.

In the display device according to the present invention, the main actuator element for selectively displacing the displacement-transmitting section comprises the piezoelectric/electrostrictive layer, and the pair of electrodes formed on the first principal surface of the piezoelectric/electrostrictive layer. In this arrangement, when a predetermined voltage is applied between the pair of electrodes, an electric field is generated in the superficial direction around the first principal surface of the piezoelectric/electrostrictive layer. The intensity of the electric field is maximum at the first principal surface (front face) of the piezoelectric/electrostrictive layer. The intensity of the electric field gradually decreases in the depth direction.

Elongation occurs in the piezoelectric/electrostrictive layer in accordance with the electric field generated in the superficial direction of the first principal surface. However, no elongation occurs in the vibrating section which supports the piezoelectric/electrostrictive layer at the second principal surface. Accordingly, the difference occurs in distortion between the first and second principal surfaces of the piezoelectric/electrostrictive layer. As a result, elastic deformation occurs in the piezoelectric/electrostrictive layer, in which the side of the first principal surface is convex. In accordance with the convex elastic deformation of the piezoelectric/electrostrictive layer, the displacement-transmitting section is displaced toward the side of the optical waveguide plate to induce occurrence of leakage light from the optical waveguide plate as described above.

In the display device according to the present invention, the pair of electrodes are formed on the side of the first principal surface of the piezoelectric/electrostrictive layer, and thus air or a constitutive material of the displacement-transmitting section (having an extremely small dielectric constant as compared with the piezoelectric/electrostrictive layer) intervenes between the pair of electrodes. Therefore, the electrostatic capacity of the main actuator element is small, and hence the CR time constant for signal transmittance is also small. Namely, rounding scarcely occurs in the signal waveform of the voltage signal corresponding to the attribute of the image signal. Accordingly, it is possible to selectively apply a specified voltage between the pair of electrodes for each of the picture elements, and thus necessary elongation can be given to each of the piezoelectric/electrostrictive layers. Especially, the decrease in display brightness is suppressed at portions corresponding to the actuator elements arranged at positions far from the voltage signal supply point (for example, peripheral and central portions of the screen). As described above, the display device according to the present invention has an advantage that the electrostatic capacity of the actuator element can be reduced, in addition to an advantage that it is unnecessary to increase the number of picture elements even when the display device is applied to a color display system as compared with a black-and-white screen. Further, display brightness without any nonuniformity can be obtained when a white color is displayed on an entire surface of a display screen, and it is possible to improve the image quality.

If a part of the piezoelectric/electrostrictive layer is lost together with a part of the electrode disposed thereon due to dielectric breakdown or the like during production steps, for example, the actuator element sufficiently functions only by repairing the lost electrode even when the piezoelectric/electrostrictive layer is not repaired. Accordingly, it is possible to eliminate vain efforts such as reproduction of an entire device during production steps, and it is possible to achieve improvement in yield of the display device.

In the display device according to the present invention, it is preferable that the vibrating section and the fixed section are formed of ceramic in an integrated manner, and a hollow space is formed at a portion corresponding to the vibrating section so that the vibrating section is thin-walled. This preferred embodiment makes it possible to easily produce the fixed section and the vibrating section, which is advantageous in that the production cost of the display device is reduced to be cheap. In this arrangement, the thick-walled fixed section and the thin-walled vibrating section are consequently formed by providing the hollow space in a substrate composed of ceramic. Accordingly, the vibrating section responds to elongation of the piezoelectric/electrostrictive layer in a sensitive manner. Thus the vibrating section promptly follows any change in voltage signal. Further, the rigidity is sufficiently ensured at a boundary between the vibrating section and the fixed section. Therefore, breakage scarcely occurs due to fatigue of the boundary caused by vibration of the vibrating section.

In the display device according to the present invention, it is preferable that both of the hollow space and the piezoelectric/electrostrictive layer have smoothly cornered planar configurations respectively, and the planar configuration of the hollow space has a size larger than that of the piezoelectric/electrostrictive layer. In this preferred embodiment, the boundary between the vibrating section and the fixed section has a smoothly cornered configuration in the same manner as the planar configuration of the hollow space. Accordingly, the stress, which is generated by vibration of the vibrating section, is not locally concentrated. Thus it is possible to improve the fatigue limit or endurance limit at the boundary, it is possible to realize a long service life of the actuator element, and consequently it is possible to realize a long service life of the display device.

It is preferable that both of the hollow space and the piezoelectric/electrostrictive layer have circular planar configurations or oblong or elliptic planar configurations. Alternatively, it is preferable that both of the hollow space and the piezoelectric/electrostrictive layer have rectangular planar configurations with smooth corners, or they have polygonal planar configurations with respective apex angle portions having rounded shapes.

In these preferred embodiments, all of the circumferential edge of the vibrating section is supported by the fixed section. Accordingly, it is possible to greatly improve the fatigue limit at the circumferential edge of the vibrating section, it is possible to realize a long service life of the actuator element, and consequently it is possible to realize a long service life of the display device.

In the display device according to the present invention, it is preferable that the pair of electrodes on the piezoelectric/electrostrictive layer are subjected to wiring in a planar form to have a spiral configuration in which the pair of electrodes are arranged in parallel to one another and separated from each other. In this embodiment, when a predetermined voltage is applied between the pair of electrodes, an electric field is generated radially (isotropically) on the first principal surface of the piezoelectric/electrostrictive layer. Accordingly, elongation occurs radially (isotropically) at the first principal surface of the piezoelectric/electrostrictive layer. Simultaneously, elongation, which is smaller than the elongation of the surface portion, occurs radially (isotropically), or contraction occurs radially (isotropically) at deep portions in the piezoelectric/electrostrictive layer. Therefore, the piezoelectric/electrostrictive layer efficiently makes displacement so that its central portion is convex. Moreover, dispersion in displacement is decreased among the respective picture elements.

In the display device according to the present invention, it is preferable that both of the pair of electrodes on the piezoelectric/electrostrictive layer have a planar configuration in which a lot of branches are spread from a trunk which extends toward a center of the piezoelectric/electrostrictive layer, and the pair of electrodes are separated from each other and arranged complementarily. In this embodiment, when a predetermined voltage is applied between the pair of electrodes, elongation occurs radially (isotropically) at the first principal surface of the piezoelectric/electrostrictive layer, in the same manner as the foregoing embodiment of the present invention. Simultaneously, elongation, which is smaller than the elongation of the surface portion, occurs radially (isotropically), or contraction occurs radially (isotropically) at deep portions in the piezoelectric/electrostrictive layer. Therefore, the piezoelectric/electrostrictive layer efficiently makes displacement so that its central portion is convex. Further, dispersion in displacement is decreased among the respective picture elements.

Especially, the electrode is divided into the trunk and the branches according to the present invention. Therefore, even if a part of the piezoelectric/electrostrictive layer, for example, a part of the piezoelectric/electrostrictive layer corresponding to any branch is lost together with the branch due to dielectric breakdown or the like, the other parts are extremely scarcely affected thereby. The actuator element sufficiently functions as long as the trunk remains. It is a matter of course that the original function before the loss can be restored only by repairing the lost branch of the electrode. Accordingly, it is possible to realize easy maintenance for the display device.

In the display device according to the present invention, it is preferable that spontaneous distortion is removed to operate the actuator element by applying a signal between the pair of electrodes to invert a polarization direction of the piezoelectric/electrostrictive layer. Namely, the actuator element is operated by applying the signal to invert the polarization direction of the piezoelectric/electrostrictive layer (for example, an alternating signal of +100 V→−100 V→+100 V→−100 V) every time when the voltage signal is applied between the pair of electrodes of the main actuator element. In this embodiment, it is possible to always maintain a large displacement amount of the actuator element, because the displacement is obtained such that an amount of displacement corresponding to an amount of the spontaneous distortion of the piezoelectric/electrostrictive layer is always added. Establishment of such a state makes it possible to easily perform ON/OFF control for the display device, which is advantageous in that the image quality is improved. It is noted that the displacement amount is not increased even when the foregoing operation is performed in the case of the structure in which the piezoelectric/electrostrictive layer is interposed by the upper electrode and the lower electrode, i.e., in the case of the sandwich structure.

Preferably, the display device according to the present invention may be constructed such that a bending displacement characteristic of the actuator element, which is obtained by applying an electric field not less than four times a predetermined electric field between the pair of electrodes, is asymmetrical in relation to a reference electric field point as a center.

The bending displacement characteristic is obtained by observing the bending displacement of the actuator element when the voltage applied between the pair of electrodes is continuously changed so that the electric field applied to the actuator element is changed in an alternating manner, after the piezoelectric/electrostrictive layer is subjected to a polarization treatment by applying a voltage for polarization between the pair of electrodes of the main actuator element. In this case, the direction of the bending displacement is positive when the actuator element is displaced in a convex manner in a first direction (direction for the pair of electrodes formed on the piezoelectric/electrostrictive layer to face the free space), while the direction of the bending displacement is negative when the actuator element is displaced in a concave manner. The predetermined electric field is herein referred to an electric field at which the direction of polarization is inverted by applying a reverse electric field at portions near to the first principal surface (front face) of the piezoelectric/electrostrictive layer.

Specifically, for example, when the predetermined voltage is applied in the positive direction between the pair of electrodes in order to perform the polarization treatment for the piezoelectric/electrostrictive layer, an electric field in the positive direction is generated in the superficial direction around the first principal surface of the piezoelectric/electrostrictive layer. The intensity of the electric field generated in the piezoelectric/electrostrictive layer is maximum at the first principal surface, and the intensity is gradually decreased in the depth direction. The piezoelectric/electrostrictive layer is subjected to the polarization treatment in the same direction as that of the electric field in accordance with the generation of the electric field in the positive direction. After that, for example, the voltage application to the pair of electrodes is stopped to establish a no-voltage-loaded state.

Subsequently, the voltage applied between the pair of electrodes is continuously changed so that the electric field applied to the actuator element is changed in an alternating manner. At this time, for example, at a stage in which the electric field is generated in the same direction as the direction of the electric field (for example, the positive direction) having been generated during the polarization treatment, the polarization direction of the piezoelectric/electrostrictive layer is coincident with the direction of the electric field, and the electric field is intensely applied in the vicinity of the surface of the piezoelectric/electrostrictive layer. Accordingly, the piezoelectric/electrostrictive layer is elongated in the horizontal direction. Therefore, it is considered that the main piezoelectric/electrostrictive element is displaced in any of the first and second directions.

After that, the following operation is performed at a stage in which the voltage applied between the pair of electrode is changed, and the electric field is generated in the actuator element in a direction opposite to the direction of the electric field during the polarization treatment.

At first, at a stage in which the electric field is weak, the polarization direction of the piezoelectric/electrostrictive layer is mutually opposite to the direction of the electric field, and hence the piezoelectric/electrostrictive layer is contracted in the horizontal direction. Accordingly, the actuator element is subjected to bending displacement in the second direction. After that, when the electric field is intensified, the polarization at the surface portion of the piezoelectric/electrostrictive layer begins to make inversion to cause a phenomenon in which the polarization direction is coincident with the direction of the electric field in the vicinity of the surface of the piezoelectric/electrostrictive layer, while the polarization direction is opposite to the direction of the electric field at deep portions in the piezoelectric/electrostrictive layer. Namely, two types of polarization exist in the piezoelectric/electrostrictive layer, and the actuator element functions as a pseudo-bi-morph type piezoelectric/electrostrictive element.

As a result, the direction of distortion at portions close to the first principal surface of the piezoelectric/electrostrictive layer is mutually opposite to the direction of distortion at portions close to the vibrating section. Thus the entire actuator element makes displacement in a convex manner in the first direction (direction for the pair of electrodes formed on the piezoelectric/electrostrictive layer to face the free space). The displacement amount is extremely large owing to the pseudo-bi-morph type action described above.

Especially, in the present invention, the displacement characteristic is asymmetrical in the positive and negative directions of the electric field in relation to the reference electric field point as the center. Accordingly, for example, a difference occurs in amount of bending displacement between those obtained at two peak values of a periodically changing electric field. Thus the relative displacement amount is increased between the no-voltage-loaded state and the voltage-applied state, and the relative displacement amount is increased between states in which mutually opposite electric fields are applied. Therefore, when the present invention is applied to the actuator elements arranged for units of picture elements of the display device, the actuator elements can be easily controlled. The present invention is extremely advantageous in order to improve the image quality of the display device.

In the display device constructed as described above, it is preferable that a relationship of $A \geq 1.5\ B$ is satisfied provided that A and B represent amounts of bending displacement obtained by applying electric fields which are not less than four times the two predetermined electric fields having an identical absolute value and having different directions respectively, on the basis of the reference electric field point. In accordance with the relationship, it is possible to obtain the bending displacement characteristic which is asymmetrical in relation to the reference electric field point as the center.

In the display device constructed as described above, it is preferable that assuming that the voltage is applied between the pair of electrodes within a predetermined voltage range, the voltage is applied to a group of the actuator elements to be subjected to ON selection, selected from the large number of the actuator elements, in a direction to maximize the displacement amount in the first direction in the bending displacement characteristic. Further, it is preferable that the voltage is applied to a group of the actuator elements to be subjected to OFF selection or NO selection, in a direction to minimize the displacement amount in the first direction in the bending displacement characteristic. Accordingly, the actuator elements subjected to ON selection are maximally displaced in the first direction, and the actuator elements subjected to OFF selection or NO selection are minimally displaced. The difference in displacement is distinct between the actuator elements subjected to ON selection and the actuator elements subjected to OFF selection (or NO selection). Thus it is possible to obtain vivid contrast and contour of a picture displayed on the display screen.

In the display device constructed as described above, it is preferable that a relationship of y=ax is satisfied, and an expression of $1/10 \leq a \leq 100$ is satisfied provided that x represents a distance between the pair of electrodes ($1 \mu m \leq x \leq 200 \mu m$), and y represents a thickness of the piezoelectric/electrostrictive layer ($1 \mu m \leq y \leq 100 \mu m$).

In this embodiment, the bending displacement characteristic of the actuator element, which is obtained by applying the electric field between the pair of electrodes, lies in the foregoing bending displacement characteristic. Namely, it is possible to obtain the bending displacement characteristic which is asymmetrical in relation to the reference electric field point as the center. Accordingly, as for the display device according to this preferred embodiment of the present invention, the actuator elements arranged for units of picture elements can be easily controlled, which is extremely advantageous in order to improve the image quality of the display device.

In the display device constructed as described above, it is preferable that an expression of $1/5 \leq a \leq 10$ is satisfied, and it is more preferable that an expression of $1/2 \leq a \leq 5$ is satisfied, and expressions of $1 \mu m \leq x \leq 60 \mu m$ and $1 \mu m \leq y \leq 40 \mu m$ are satisfied.

In the display device constructed as described above, it is preferable that a relationship of y=bz is satisfied, and an expression of $1/5 \leq b \leq 10$ is satisfied provided that z represents a thickness of the vibrating section ($1 \mu m \leq z \leq 50 \mu m$), when the thickness y of the piezoelectric/electrostrictive layer and the thickness of the vibrating section are specified. Thus it is possible to increase the bending displacement amount.

In the display device constructed as described above, it is preferable that an expression of $1/3 \leq b \leq 5$ is satisfied. It is more preferable that an expression of $1/3 \leq b \leq 5$ is satisfied, and expressions of $1 \mu m \leq y \leq 40 \mu m$ and $1 \mu m \leq z \leq 20 \mu m$ are satisfied.

In the present invention, it is preferable that the vibrating section has a cross-sectional configuration corresponding to a shortest dimension m passing through a center of the vibrating section, and the cross-sectional configuration satisfies the following conditions (1) to (3) in the no-voltage-loaded state. In this preferred embodiment, the actuator element can have a large amount of relative displacement between the no-voltage-loaded state and the voltage-applied state. Accordingly, it is easy to perform ON/OFF control for the display device, which is advantageous in order to improve the image quality. Further, it is possible to allow the produced actuator element to make large bending displacement in the first direction without fail, making it possible to achieve improvement in yield of the display device.

(1) At least a part of the upper surface of the piezoelectric/electrostrictive layer in the vicinity of its center makes a protrusion in a direction directed oppositely to the vibrating section from a reference line formed by connecting one outermost local minimum point and the other outermost local minimum point adjacent to the fixed section.

(2) When the outermost local minimum point as described above is not present, the outermost local minimum point is regarded to be a point included in the upper surface of the vibrating section along the minimum dimension m and corresponding to a boundary point between the fixed section and the vibrating section.

(3) Assuming that a boundary between the vibrating section and the fixed section is a zero position, and a length of shortest dimension m of the vibrating section is 100%, when the outermost local minimum point is absent in a range of 40% of the length of shortest dimension m of the vibrating section starting from the zero position, then the outermost local minimum point is regarded to be the point included in the upper surface of the vibrating section along the minimum dimension m and corresponding to the boundary point between the fixed section and the vibrating section.

Especially, in the present invention, it is preferable that an amount t of the protrusion satisfies $m/1000 \leq t \leq m/10$.

The above and other objects, features and advantages of the present invention will become more apparent from the following description when taken in conjunction with the accompanying drawings in which a preferred embodiment of the present invention is shown by way of illustrative example.

DESCRIPTION OF THE DRAWINGS

FIG. 20 shows characteristic curves illustrating a dimensional relationship between the thickness of the piezoelectric/electrostrictive layer and the distance between the pair of electrodes of each of the actuator elements of the display device according to the embodiment of the present invention.

DESCRIPTION OF THE PREFERRED EMBODIMENTS

Illustrative embodiments of the display device according to the present invention (hereinafter simply referred to as "display device according to the embodiment of the present invention") will be explained below with reference to FIGS. 1 to 29.

Figure 1:
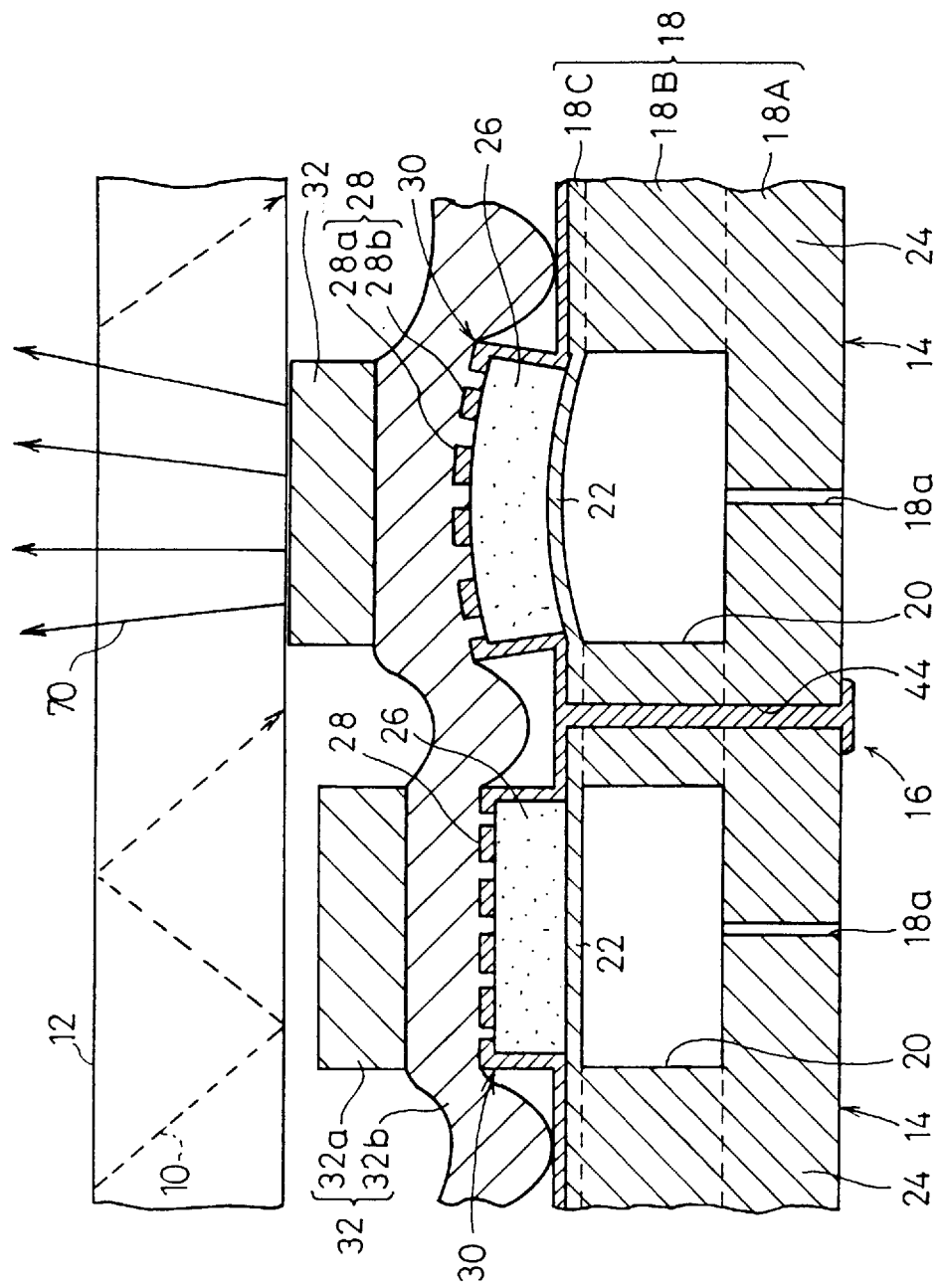
FIG. 1 shows an arrangement of a display device according to an embodiment of the present invention.

As shown in FIG. 1, the display device according to the embodiment of the present invention comprises an optical waveguide plate 12 for introducing light 10 thereinto, and a driving unit 16 provided opposingly to the back surface of the optical waveguide plate 12 and including a large number of actuator elements 14 arranged corresponding to picture elements.

The driving unit 16 has a substrate 18 composed of, for example, a ceramic material, and the actuator elements 14 are arranged at positions on the substrate 18 corresponding to the respective picture elements. The substrate 18 is disposed so that its first principal surface is opposed to the back surface of the optical waveguide plate 12. The first principal surface is a continuous surface (flushed surface). Hollow spaces 20 are formed inside the substrate 18 at positions corresponding to the respective picture elements, for forming vibrating sections 22 respectively as described later on. Each of the hollow spaces 20 communicates with the outside via a through hole 18a having a small diameter provided through a second principal surface of the substrate 18.

A portion of the substrate 18, at which the hollow space 20 is formed, is thin-walled. The other portion of the substrate 18 is thick-walled. The thin-walled portion has a structure which tends to undergo vibration in response to an external stress, and thus it functions as a vibrating section 22. The portion other than the hollow space 20 is thick-walled, and it functions as a fixed section 24 for supporting the vibrating section 22.

Namely, the substrate 18 has a stacked structure comprising a substrate layer 18A as a lowermost layer, a spacer layer 18B as an intermediate layer, and a thin plate layer 18C as an uppermost layer. The substrate 18 can be recognized as an integrated structure including the hollow spaces 20 formed at the positions corresponding to the picture elements, in the spacer layer 18B. The substrate layer 18A not only functions as a reinforcing substrate, but also functions as a substrate for wiring. The substrate 18 may be produced either by integrated firing or by additional attachment.

As shown in FIG. 1, each of the actuator elements 14 comprises the vibrating section 22 and the fixed section 24 as described above. The actuator element 14 further comprises a main actuator element 30 including a piezoelectric/electrostrictive layer 26 formed directly on the vibrating section 22, and a pair of electrodes 28 (a first electrode 28a and a second electrode 28b) formed on an upper surface of the piezoelectric/electrostrictive layer 26, and a displacement-transmitting section 32 connected onto the main actuator element 30, for increasing the contact area with respect to the optical waveguide plate 12 to provide an area corresponding to the picture element, as shown in FIG. 1.

Namely, the display device according to the embodiment of the present invention has a structure in which the main actuator element 30 comprising the piezoelectric/electrostrictive layer 26 and the pair of electrodes 28 is formed on the substrate 18. The pair of electrodes 28 may have a structure in which they are formed on both upper and lower sides of the piezoelectric/electrostrictive layer 26, or they are formed on only one side of the piezoelectric/electrostrictive layer 26. However, in order to make advantageous joining between the substrate 18 and the piezoelectric/electrostrictive layer 26, it is preferable that the pair of electrodes 28 are formed on only the upper side (side opposite to the substrate 18) of the piezoelectric/electrostrictive layer 26 so that the substrate 18 directly contacts with the piezoelectric/electrostrictive layer 26 in a state in which there is no difference in horizontal level, as in the display device according to the embodiment of the present invention.

Figure 2:
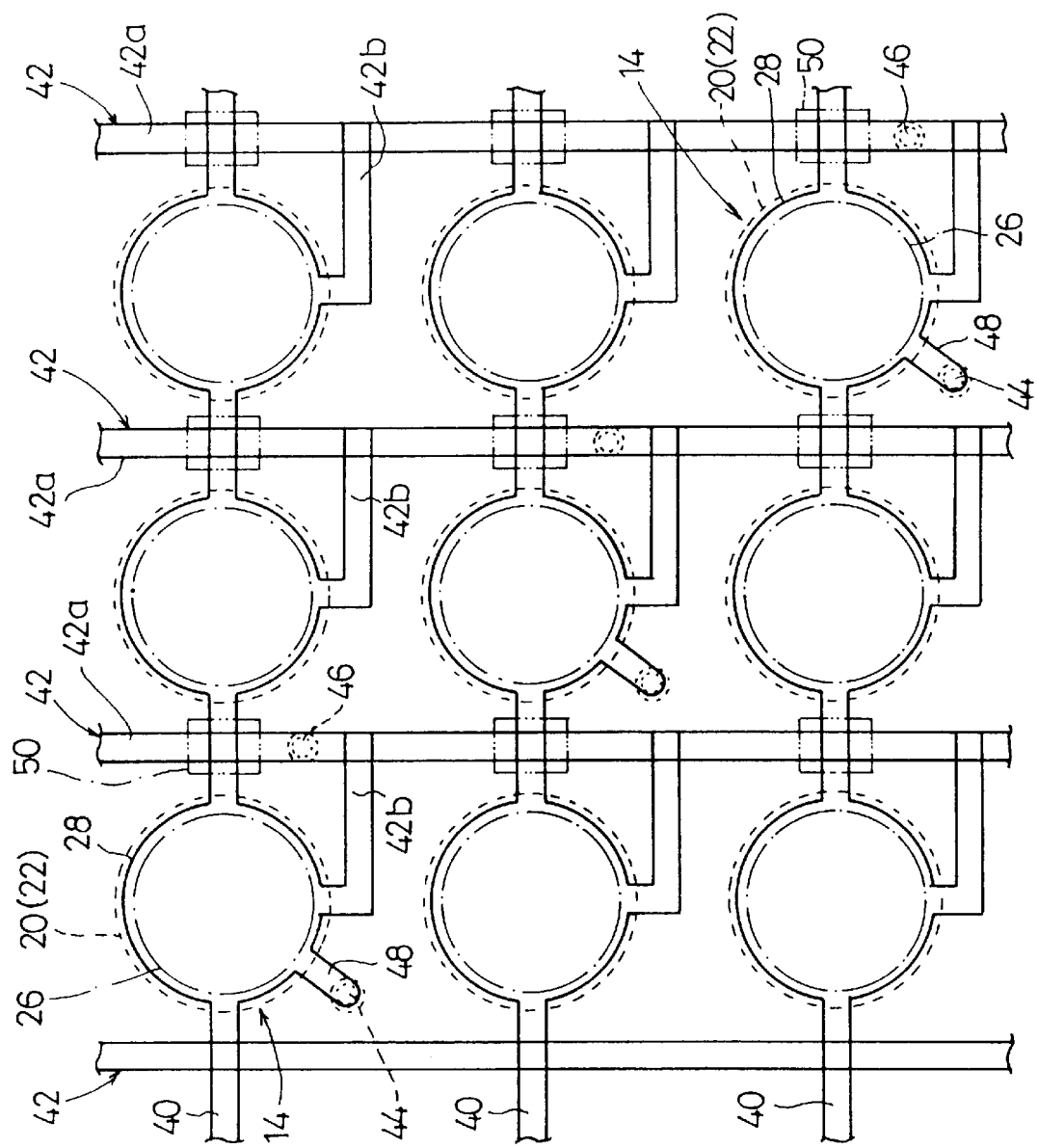
FIG. 2 shows an enlarged plan view illustrating an arrangement of actuator elements (picture elements) in the display device according to the embodiment of the present invention.

Now, shapes of the respective members will be explained with reference to FIGS. 2 to 9. At first, as shown in FIG. 2, the hollow space 20, which is formed in the substrate 18 (see FIG. 1), has a circumferential surface having a circular planar configuration. Namely, the vibrating section 22 has a circular planar configuration (see broken lines). The piezoelectric/electrostrictive layer 26 also has a circular planar configuration (see chain lines). The pair of electrodes 28 form an outer circumferential configuration which is circular as well (see solid lines). In this embodiment, the vibrating section 22 is designed to have the largest size. The outer circumferential configuration of the pair of electrodes 28 is designed to have the second largest size. The planar configuration of piezoelectric/electrostrictive layer 26 is designed to have the smallest size. Alternatively, it is allowable to make design so that the outer circumferential configuration of the pair of electrodes 28a, 28b is largest.

Figure 3:
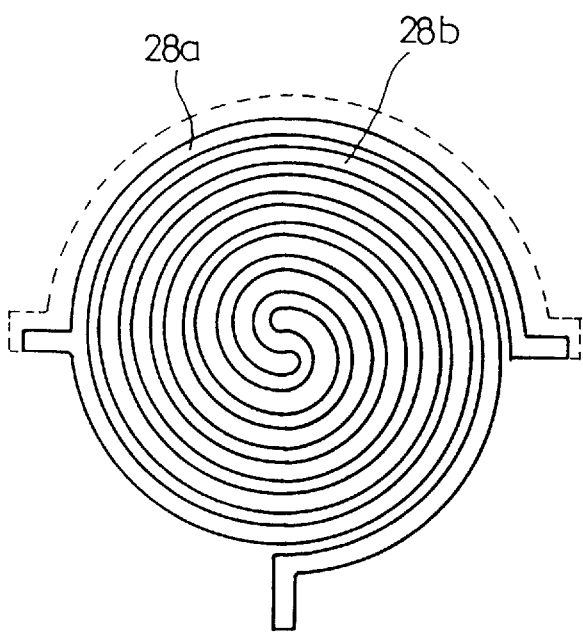
FIG. 3 shows a plan view illustrating the display device according to the embodiment of the present invention, especially illustrating a planar configuration (spiral configuration) of a pair of electrodes.

The pair of electrodes 28 (the first electrode 28a and the second electrode 28b) formed on the piezoelectric/electrostrictive layer 26 have, for example, a spiral planar configuration as shown in FIG. 3, in which the pair of electrodes 28a, 28b are parallel to one another and separated from each other to form a spiral structure composed of several turns. The number of turns of the spiral is actually not less than 5 turns. However, FIG. 3 illustratively shows 3 turns in order to avoid complicated illustration.

As shown in FIG. 2, the wiring arrangement communicating with the respective electrodes 28a, 28b includes vertical selection lines 40 having a number corresponding to a number of rows of a large number of the picture elements, and signal lines 42 having a number corresponding to a number of columns of the large number of the picture elements. Each of the vertical selection lines 40 is electrically connected to the first electrode 28a of each of the picture elements (actuator elements 14, see FIG. 1). Each of the signal lines 42 is electrically connected to the second electrode 28b of the picture element 14. The respective vertical selection lines 40, which are included in one row, are wired in series such that the wiring is led from the first electrode 28a provided for the picture element 14 in the previous column, and then the wiring is connected to the first electrode 28a provided for the picture element 14 in the present column. The signal line 42 comprises a main line 42a extending in the direction of the column, and branch lines 42b branched from the main line 42a and connected to the second electrode 28b of each of the picture elements 14.

The voltage signal is supplied to the respective vertical selection lines 40 from an unillustrated wiring board (stuck to the second principal surface of the substrate 18) via through holes 44. The voltage signal is also supplied to the respective signal lines 42 from the unillustrated wiring board via through holes 46.

Various arrangement patterns may be assumed for the through holes 44, 46. However, in the illustrative arrangement shown in FIG. 2, the through holes 44 for the vertical selection lines 40 are formed as follows provided that the number of rows is M, and the number of columns is N. In the case of N=M or N>M, the through hole 44 is formed in the vicinity of a picture element in the nth row and nth column (n=1, 2 . . . ) and at a position deviated toward the signal line (main line 42a) in the (n−1)th column. In the case of N<M, the through hole 44 is formed in the vicinity of a picture element in the (αN+n)th row and nth column (α=0, 1 . . . (quotient of M/N−1)) and at a position deviated toward the signal line (main line 42a) in the (n−1)th column.

On the other hand, the through holes 46 for the signal lines 42 are formed as follows. In the case of N=M or N<M, the through hole 46 is formed on the main line 42a of each of the signal lines 42 and at a position adjacent to a picture element in the nth row and nth column (n=1, 2 . . . ). In the case of N>M, the through hole 46 is formed on the main line 42a of each of the signal lines 42 and at a position adjacent to a picture element in the nth row and (βM+n)th column (β=0, 1 . . . (quotient of N/M−1)). The through hole 44 for the vertical selection line 40 is not formed on the vertical selection line 40, unlike the through hole 46 for the signal line 42. Accordingly, a relay conductor 48 is formed between the through hole 44 and the first electrode 28a, for making electric continuity therebetween.

Insulative films 50 (shown by two-dot chain lines), each of which is composed of, for example, a silicon oxide film, a glass film, or a resin film, are allowed to intervene at intersections between the respective vertical selection lines 40 and the respective signal lines 42, in order to ensure insulation between the mutual wiring arrangements 40, 42.

Figure 4:
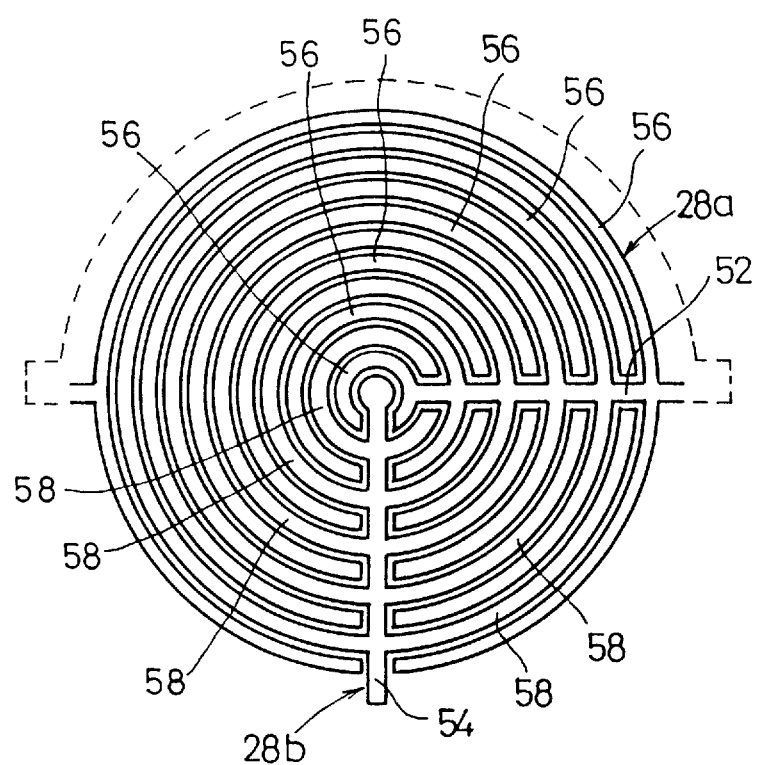
FIG. 4 shows a plan view illustrating a first modified embodiment of the display device according to the embodiment of the present invention, especially illustrating a planar configuration (branched configuration) of a pair of electrodes.

The planar configuration of the pair of electrodes 28 is not limited to the spiral configuration as shown in FIG. 3. The planar configuration may be a configuration as shown in FIG. 4 (display device according to a first modified embodiment). Specifically, the display device according to the first modified embodiment includes the pair of electrodes 28a, 28b each of which has a configuration composed of a trunk 52, 54 which extends toward the center of the piezoelectric/electrostrictive layer 26, and a lot of branches 56, 58 branched from the trunk 52, 54. In this configuration, the pair of electrodes 28a, 28b are separated from each other and arranged complementarily (hereinafter referred to as "branched configuration" for convenience).

Figure 5:
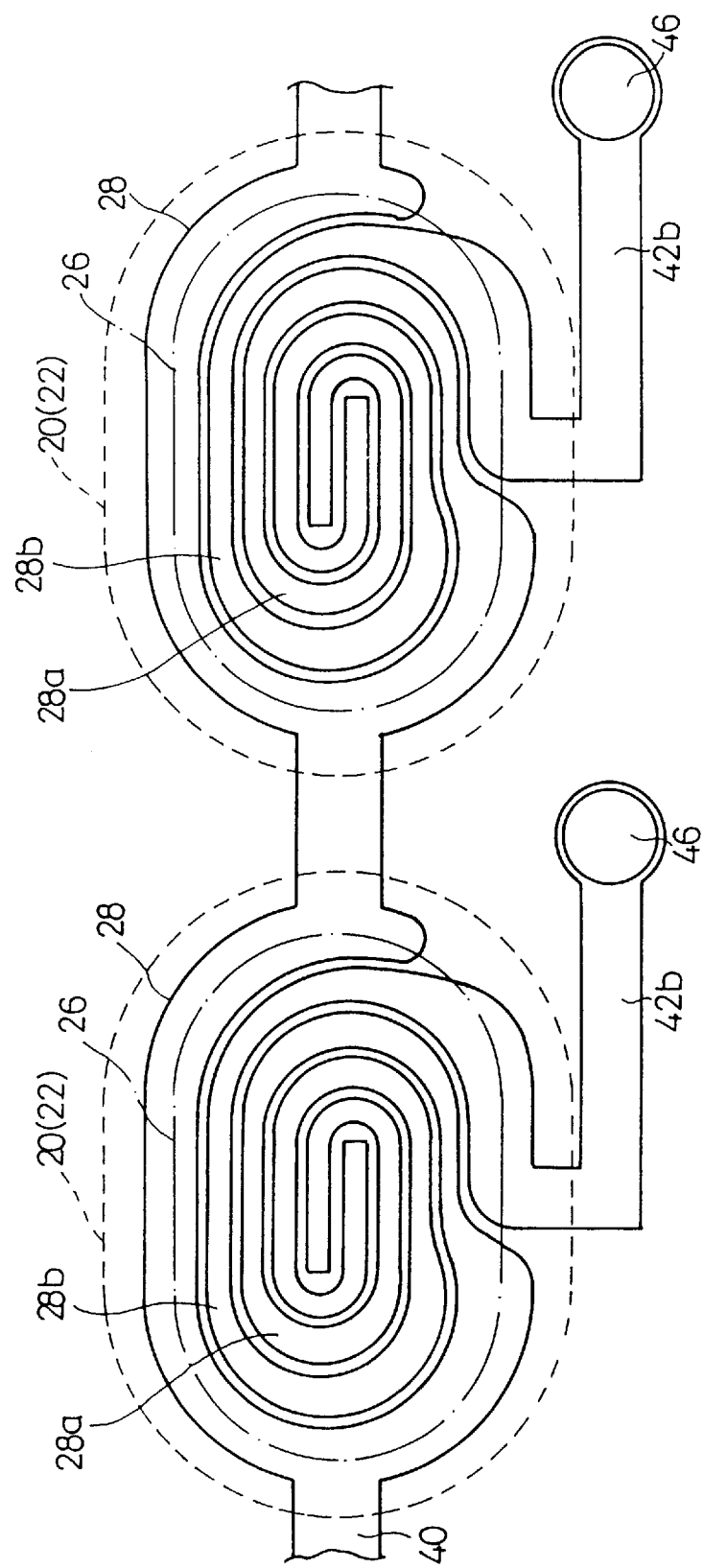
FIG. 5 shows a plan view illustrating a second modified embodiment of the display device according to the embodiment of the present invention, especially illustrating planar configurations (oblong and spiral configurations) of a vibrating section, a piezoelectric/electrostrictive layer, and a pair of electrodes.
Figure 6:
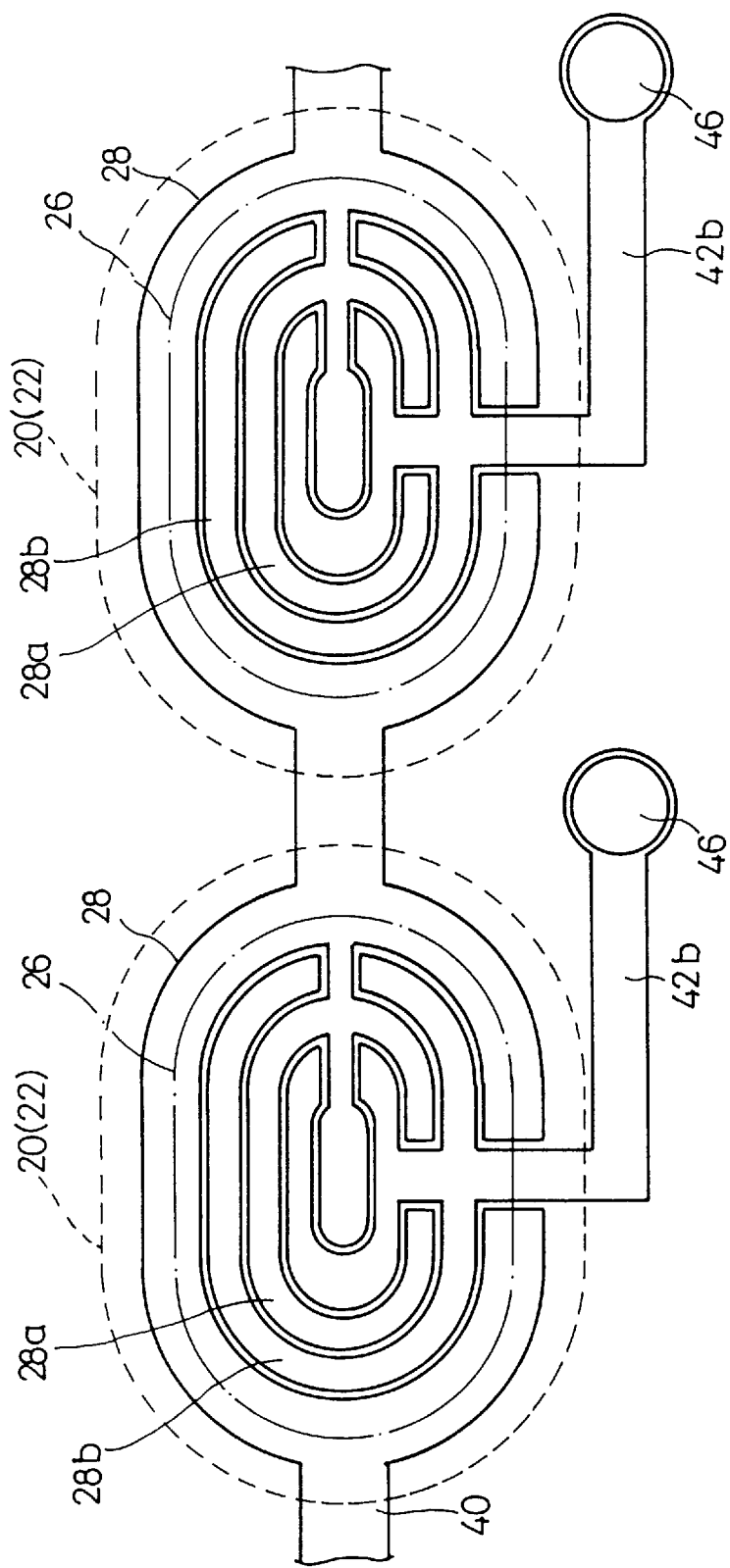
FIG. 6 shows a plan view illustrating a third modified embodiment of the display device according to the embodiment of the present invention, especially illustrating planar configurations (oblong and branched configurations) of a vibrating section, a piezoelectric/electrostrictive layer, and a pair of electrodes.
Figure 7:
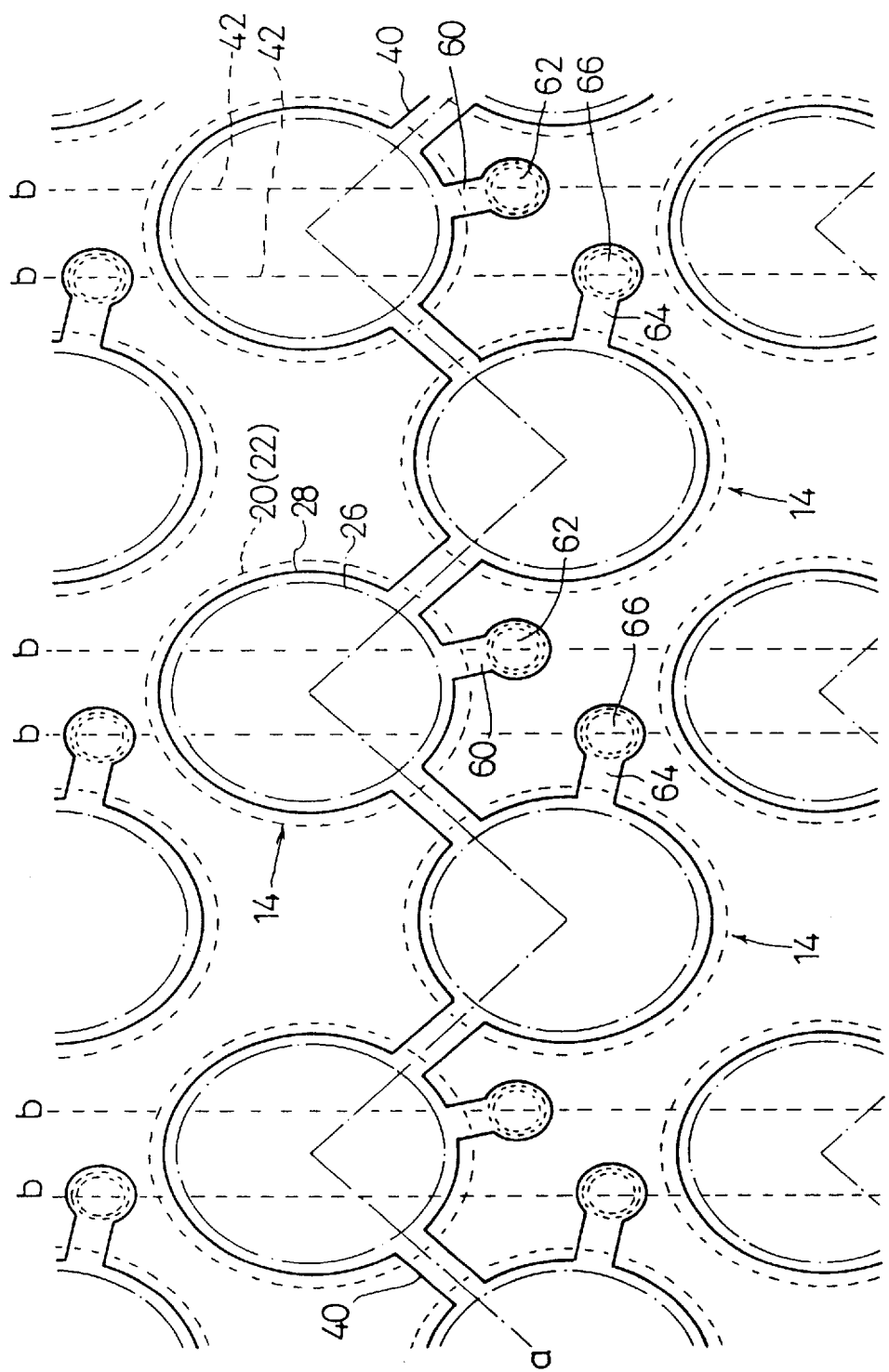
FIG. 7 shows an enlarged plan view illustrating an arrangement of actuator elements (picture elements) in a fourth modified embodiment of the display device according to the embodiment of the present invention.

The display device according to the embodiment of the present invention and the display device according to the first modified embodiment have been explained as those having the circular planar configuration of the vibrating section, the circular planar configuration of the piezoelectric/electrostrictive layer 26, and the circular outer circumferential configuration formed by the pair of electrodes 28. Alternatively, those usable as the planar configurations and the outer circumferential configuration include oblong configurations (track configurations: display devices according to second and third modified embodiments) as shown in FIGS. 5 and 6, and an elliptic configuration (display device according to a fourth modified embodiment) as shown in FIG. 7.

Figure 8:
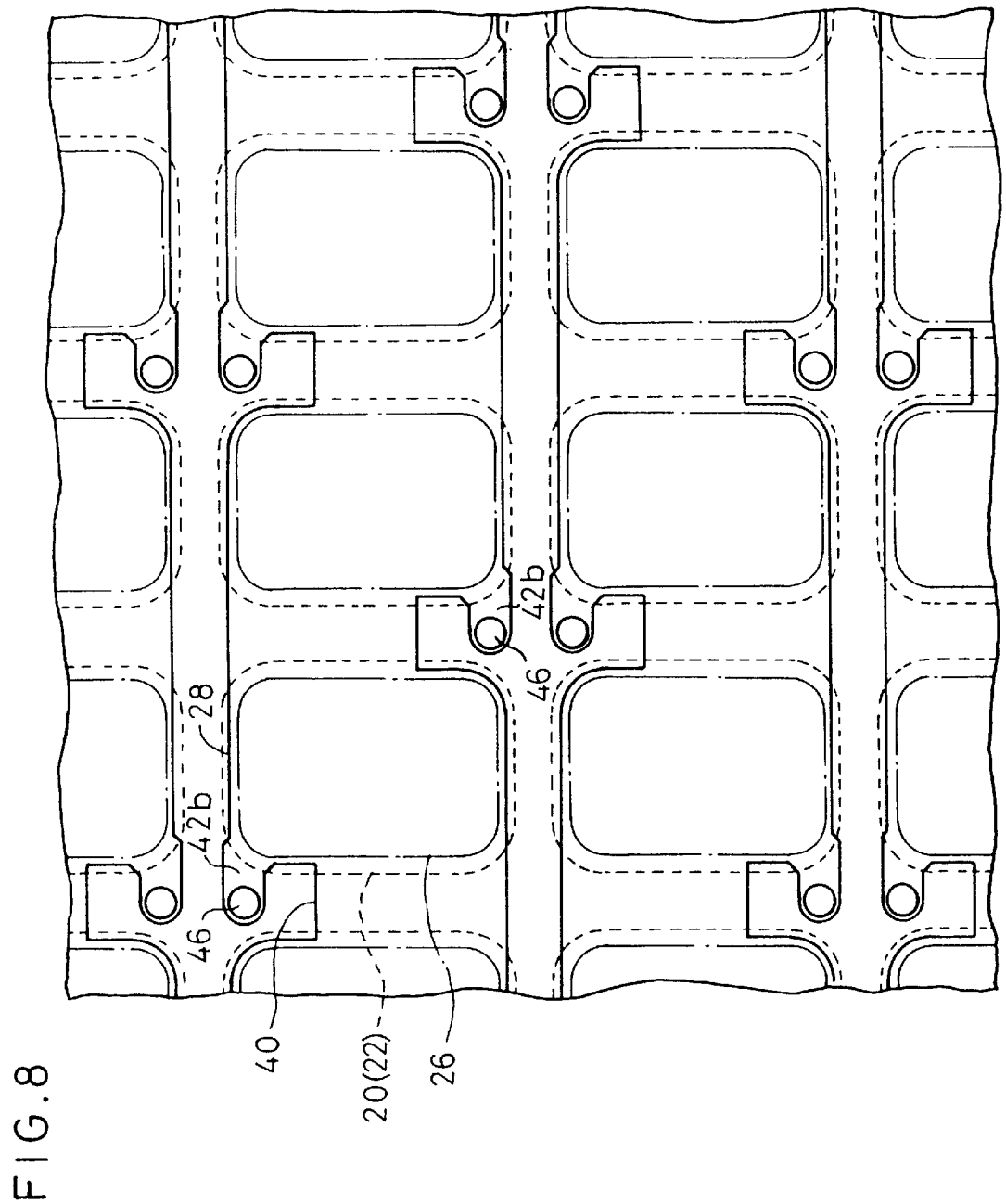
FIG. 8 shows an enlarged plan view illustrating an arrangement of actuator elements (picture elements) in a fifth modified embodiment of the display device according to the embodiment of the present invention.

Alternatively, as shown in FIG. 8, both of the planar configuration of the vibrating section 22 and the planar configuration of the piezoelectric/electrostrictive layer 26 may be rectangular configurations with smoothed corners (display device according to a fifth modified embodiment). Further alternatively, as shown in FIG. 9, both of the planar configuration of the vibrating section 22 and the planar configuration of the piezoelectric/electrostrictive layer 26 may be polygonal configurations (for example, octagonal configurations) with respective apex angle portions having rounded shapes (display device according to a sixth modified embodiment).

Figure 10:
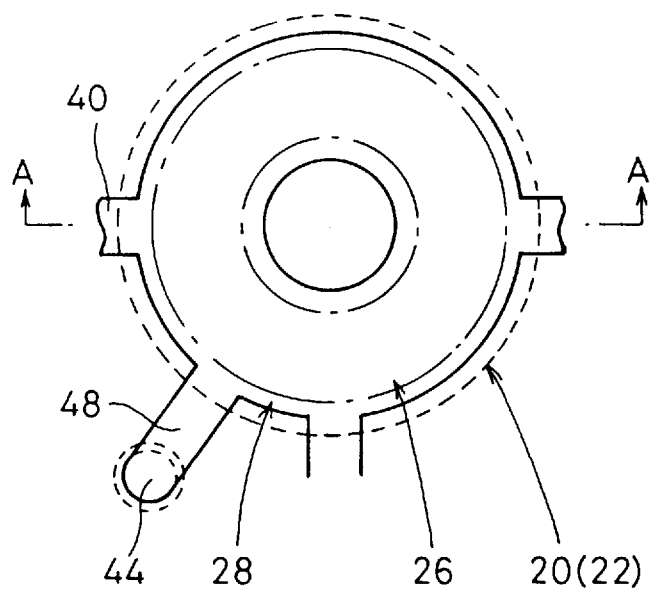
FIG. 10 schematically shows a plan view illustrating a ring-shaped piezoelectric/electrostrictive layer of the actuator element of the display device according to the embodiment of the present invention.
Figure 11:
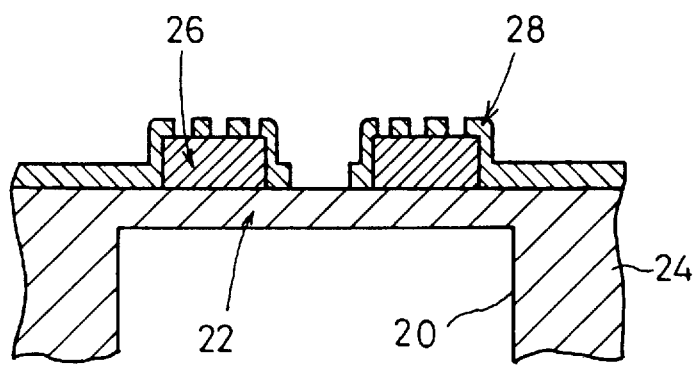
FIG. 11 shows a cross-sectional view taken along a line A—A in FIG. 10.
Figure 12:
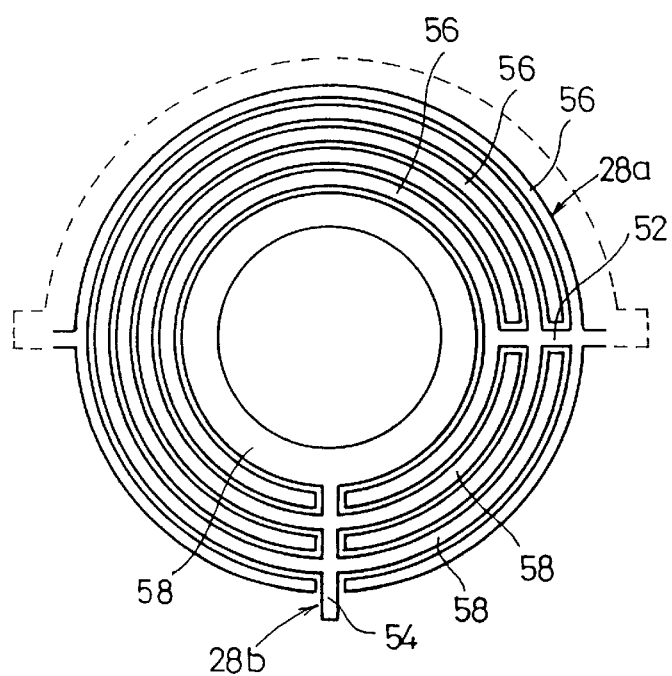
FIG. 12 shows a plan view illustrating a piezoelectric/electrostrictive layer having a ring-shaped planar configuration and a pair of electrodes having a branched configuration, of the actuator element of the display device according to the embodiment of the present invention.
Figure 13A:
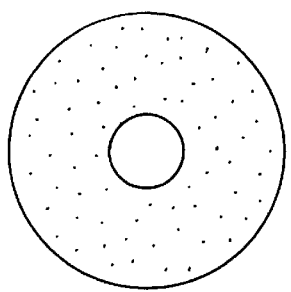
FIG. 13A shows a plan view illustrating a ring-shaped piezoelectric/electrostrictive layer having a circular circumferential configuration.
Figure 13B:
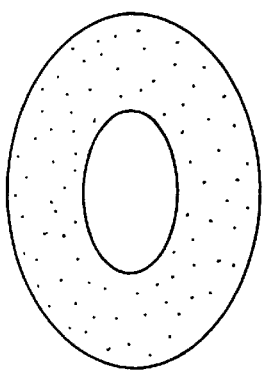
FIG. 13B shows a plan view illustrating a ring-shaped piezoelectric/electrostrictive layer having an elliptic 6circumferential configuration.
Figure 13C:
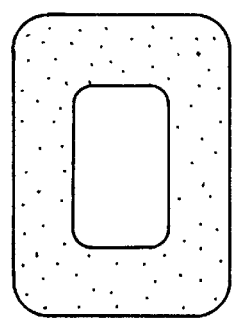
FIG. 13C shows a plan view illustrating a ring-shaped piezoelectric/electrostrictive layer having a rectangular circumferential configuration.

The configuration of the vibrating section 22, the planar configuration of the piezoelectric/electrostrictive layer 26, and the outer circumferential configuration formed by the pair of electrodes 28 may be combinations of circular and elliptic configurations, or combinations of rectangular and elliptic configurations, without any special limitation. As shown in FIGS. 10 and 11, those preferably adopted as the planar configuration of the piezoelectric/electrostrictive layer 26 include a ring-shaped configuration. In this case, as shown in FIGS. 13A to 13C, those usable as the outer circumferential configuration include various ones such as circular, elliptic, and rectangular configurations. FIG. 12 shows an illustrative arrangement in which the planar configuration of the piezoelectric/electrostrictive layer 26 is a ring-shaped configuration, and the pair of electrodes 28a, 28b have a branched configuration.

Figure 9:
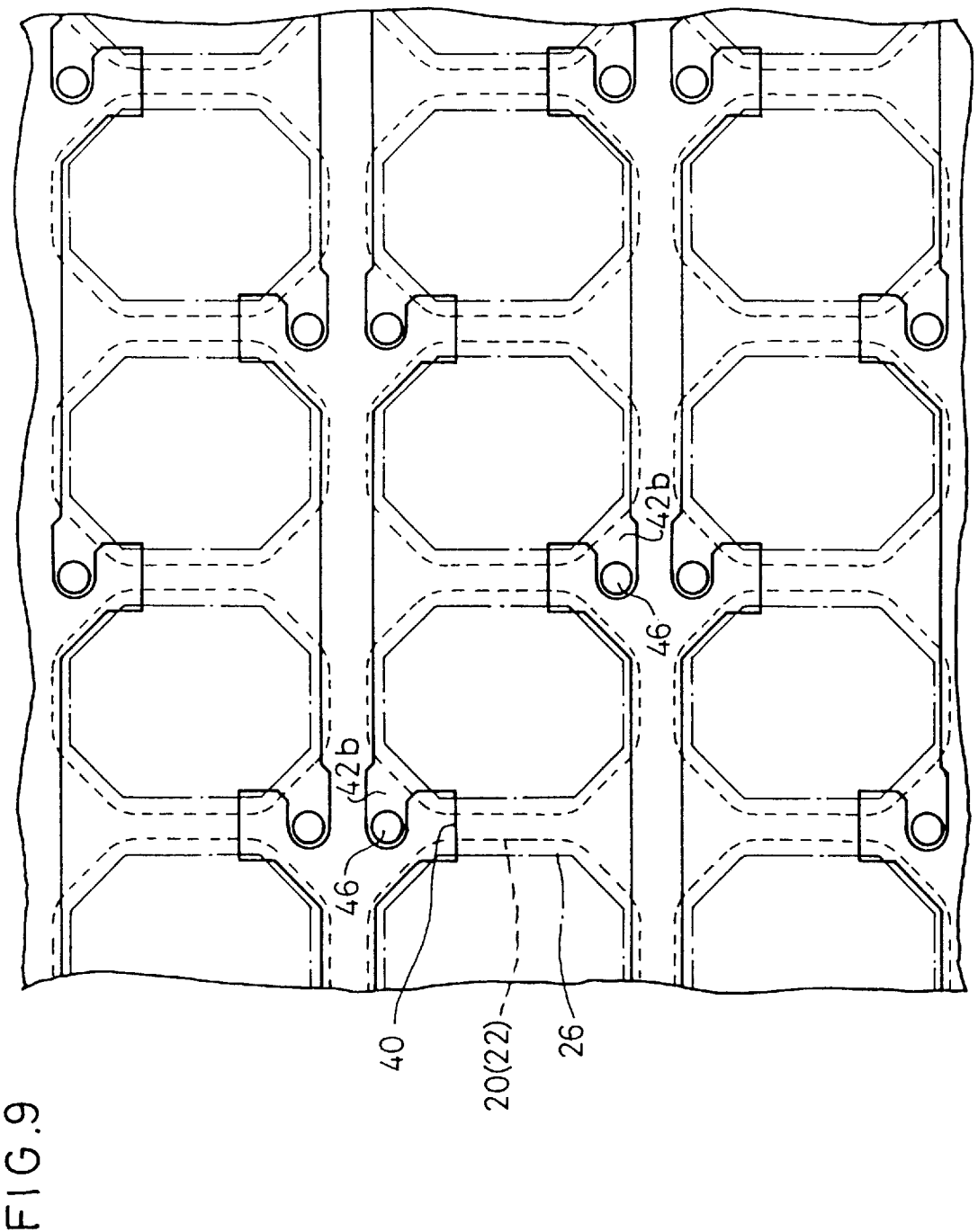
FIG. 9 shows an enlarged plan view illustrating an arrangement of actuator elements (picture elements) in a sixth modified embodiment of the display device according to the embodiment of the present invention.

In the illustrative arrangements shown in FIGS. 2, 8, and 9, the respective actuator elements 14 (picture elements) are arranged in the matrix form on the substrate 18. Alternatively, as in the display device according to the fourth modified embodiment shown in FIG. 7, the picture elements (actuator elements 14) may be arranged in a zigzag form with respect to the respective rows. In the case of the arrangement pattern shown in FIG. 7, the actuator elements 14 (picture elements) are arranged in the zigzag form in relation to the respective rows. Accordingly, the line (indicated by a chain line a) connecting through the vertical selection lines 40 has a zigzag form in relation to each of the rows. The signal lines 42 have a wiring pattern as shown by broken lines b wired on the unillustrated wiring board, in which the picture elements 14 arranged in the zigzag form are divided, for example, into a group of picture elements (actuator elements 14) located vertically upwardly, and two signal lines 42 are wired mutually adjacently at positions corresponding to the former and latter groups of picture elements. In FIG. 7, the picture elements arranged in the zigzag form are wired as follows. Namely, for example, the second electrode 28b of the picture element (actuator element 14) located vertically upwardly is electrically connected to the right signal line 42 of the mutually adjacent two signal lines 42, 42, via a relay conductor 60 and a through hole 62. The second electrode 28b of the picture element (actuator element 14) located vertically downwardly is electrically connected to the left signal line 42 of the mutually adjacent two signal lines 42, 42, via a relay conductor 64 and a through hole 66.

Next, the operation of the display device according to the embodiment of the present invention will be explained with reference to FIGS. 14 to 26. At first, two illustrative operations will be explained for each of the actuator elements 14, and then the operation of the display device itself will be explained.

At first, the first illustrative operation of the actuator element 14 will be explained with reference to FIGS. 1, 14, and 15. Concerning each of the picture elements (actuator elements 14) of the display device according to the embodiment of the present invention shown in FIG. 1, when no voltage signal is applied to the first electrode 28a and the second electrode 28b of the actuator element 14, i.e., in the case of the no-voltage-loaded state, any voltage (difference in electric potential) is not generated between the pair of electrodes 28a, 28b. Accordingly, no elongation occurs in the piezoelectric/electrostrictive layer 26, providing a state in which the displacement-transmitting section 32 is separated from the optical waveguide plate 12.

Figure 14:
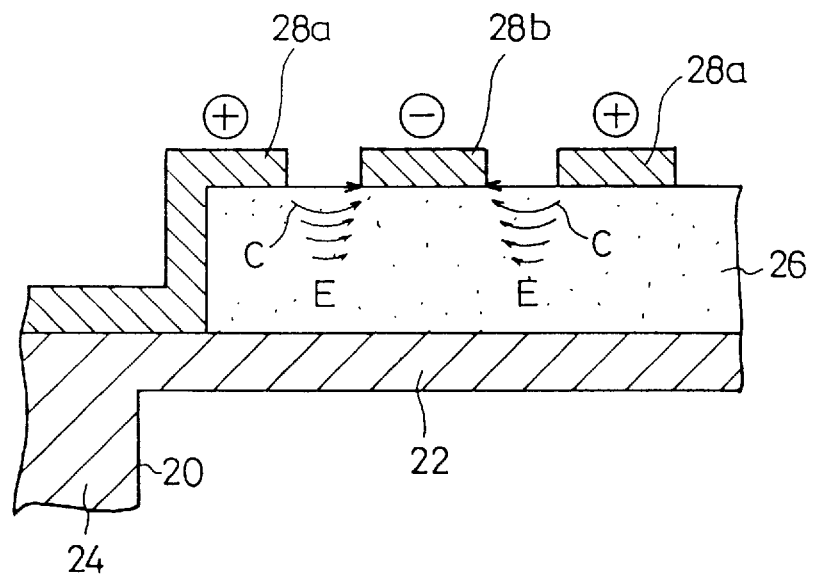
FIG. 14 functionally shows a principle of displacement of the actuator element concerning first illustrative operation of the display device according to the embodiment of the present invention.

Next, as shown in FIG. 14, for example, a positive voltage signal is applied to the first electrode 28a of the actuator element 14, and a negative voltage signal is applied to the second electrode 28b so that a predetermined voltage is established between the pair of electrodes 28a, 28b, i.e., a voltage-applied state is established. In this state, an electric field E (see electric force lines c) is generated around the first principal surface of the piezoelectric/electrostrictive layer 26. The intensity of the electric field E is largest at the first principal surface (front face) of the piezoelectric/electrostrictive layer 26, and the intensity is gradually decreased in the depth direction.

When a voltage to give ON selection is applied between the pair of electrodes 28a, 28b in the voltage-applied state, the piezoelectric/electrostrictive layer 26 causes elongation in accordance with the electric field E generated in the superficial direction along the first principal surface, however, no elongation occurs in the vibrating section 22 which supports the piezoelectric/electrostrictive layer 26 on the second principal surface. Accordingly, a difference in distortion occurs between the first and second principal surfaces of the piezoelectric/electrostrictive layer 26. As a result, as shown in FIG. 1, elastic deformation occurs in the piezoelectric/electrostrictive layer 26, which is convex on the side of the first principal surface. The convex elastic deformation of the piezoelectric/electrostrictive layer 26 allows the displacement-transmitting section 32 to make bending displacement toward the optical waveguide plate 12, and the displacement-transmitting section 32 contacts with the optical waveguide plate 12.

The displacement-transmitting section 32 contacts with the back surface of the optical waveguide plate 12 in response to the bending displacement of the main actuator element 30. When the displacement-transmitting section 32 contacts with the back surface of the optical waveguide plate 12, for example, the light 10, which has been subjected to total reflection in the optical waveguide plate 12, is transmitted through the back surface of the optical waveguide plate 12, and the light 10 is transmitted to the surface of the displacement-transmitting section 32. The light 10 is reflected by the surface of the displacement-transmitting section 32.

As described above, the displacement-transmitting section 32 is provided in order to reflect the light 10 having been transmitted through the back surface of the optical waveguide plate 12, and in order to increase the area to contact with the optical waveguide plate 12 to be not less than a predetermined value. Namely, the light emission area is specified by the contact area between the displacement-transmitting section 32 and the optical waveguide plate 12.

In the display device according to the embodiment of the present invention, the displacement-transmitting section 32 comprises a plate member 32a for specifying a substantial light emission area, and a displacement-transmitting member 32b for transmitting the displacement of the main actuator element 30 to the plate member 32a.

The contact between the displacement-transmitting section 32 and the optical waveguide plate 12 means that the displacement-transmitting section 32 and the optical waveguide plate 12 are positioned with an intervening distance, if any, the distance being not more than a wavelength of the light 10 (light 10 introduced into the optical waveguide plate 12).

When the supply of the voltage signal to the first electrode 28a and the second electrode 28b is stopped to give, for example, OFF selection or NO selection, the predetermined voltage is not generated between the pair of electrodes 28a, 28b. Accordingly, the piezoelectric/electrostrictive layer 26 is restored from the convex state to its original state, giving a state in which the displacement-transmitting section 32 is separated from the optical waveguide plate 12.

It is preferable that during the operation of the actuator element 14 described above, a signal to invert the polarization direction of the piezoelectric/electrostrictive layer 26 is applied between the pair of electrodes 28a, 28b of the main actuator element 30 so that spontaneous distortion is removed to drive the actuator element 14.

Figure 15:
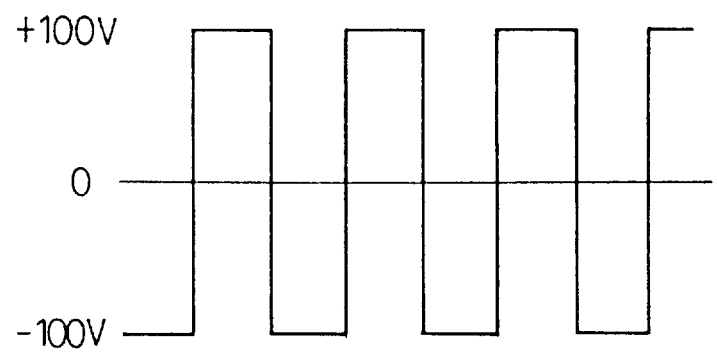
FIG. 15 shows a signal waveform illustrating an example of an alternating signal applied between the pair of electrodes when the actuator element of the display device according to the embodiment of the present invention is in an ON selection state.

Specifically, in the case of ON selection, the actuator element 14 is driven by applying the signal to invert the polarization of the piezoelectric/electrostrictive layer 26 every time when the voltage signal is applied between the pair of electrodes 28a, 28b of the main actuator element 30, for example, by applying an alternating signal of +100 V→−100 V→+100 V as shown in FIG. 15. In this procedure, it is possible to always maintain a large displacement amount of the actuator element 14, because the displacement is obtained as an amount to which a displacement amount corresponding to an amount of the spontaneous distortion of the piezoelectric/electrostrictive layer 26 is always added. In the case of OFF selection or NO selection, it is preferable to apply a voltage having a small absolute value of the electric field, for example, a voltage having an absolute value of not more than 20 V, in an alternating manner. The effect to increase the displacement amount can be realized approximately equivalently to that described above when the piezoelectric/electrostrictive layer 26 has the ring-shaped planar configuration (see FIGS. 10 to 13). Especially, the electrostatic capacity can be further decreased by allowing the piezoelectric/electrostrictive layer 26 to have the ring-shaped configuration. Accordingly, it is possible to obtain an effect that the rounding or the like of the driving signal can be effectively suppressed.

It is noted that the displacement amount is not increased even when a display device is operated in the same manner as described above, if the display device has the structure in which the piezoelectric/electrostrictive layer 26 is interposed between the upper and lower electrodes, i.e., the conventional sandwich structure.

Next, the second illustrative operation of the actuator element will be explained with reference to FIGS. 16 to 25. Before detailed explanation, the operation principle of the actuator element 14 based on the second illustrative operation will be explained with reference to FIG. 1 and FIGS. 16 to 19.

Figure 16A:
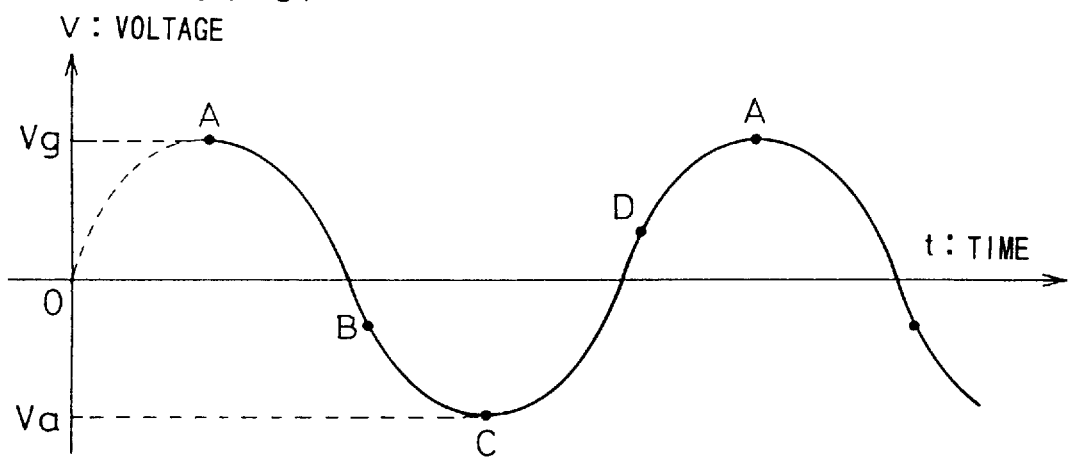
FIG. 16A shows a timing chart illustrating an electric potential waveform to be applied to the pair of electrodes in order to measure a bending displacement characteristic of the actuator element of the display device according to the embodiment of the present invention.
Figure 16B:
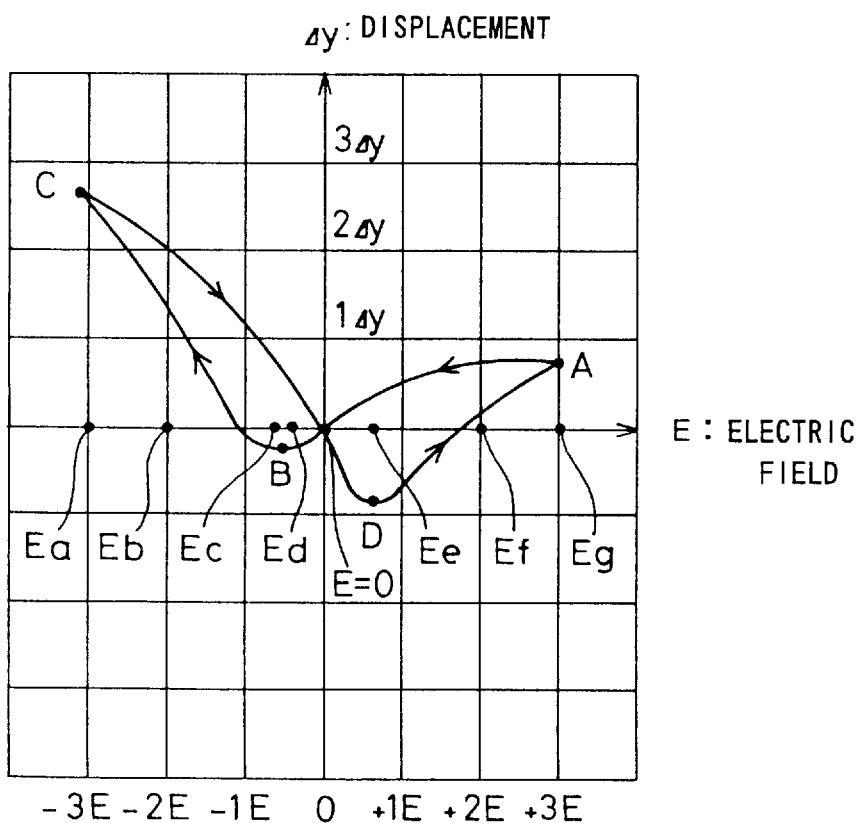
FIG. 16B shows a characteristic curve illustrating the bending displacement characteristic of the actuator element.

At first, the display device according to the embodiment of the present invention has a bending displacement characteristic of the actuator element 14, obtained by applying the electric field between the pair of electrodes 28a, 28b, as shown in FIG. 16B. The bending displacement characteristic of the actuator element 14 is asymmetrical in relation to a reference electric field point (point of the electric field=0) as a center.

The bending displacement characteristic is obtained by applying a predetermined voltage between the pair of electrodes 28a, 28b of the main actuator element 30 to perform a polarization treatment for the piezoelectric/electrostrictive layer 26, and then observing the bending displacement of the actuator element 14 while continuously changing the voltage applied to the actuator element 14. As shown in FIG. 1, the bending displacement is herein referred to such that the direction of bending displacement is positive when the actuator element 14 makes bending displacement in a convex manner in a first direction (direction for the pair of electrodes 28a, 28b formed on the piezoelectric/electrostrictive layer 26 to face the free space), while the direction of bending displacement is negative when the actuator element 14 makes bending displacement in a concave manner.

Figure 17A:
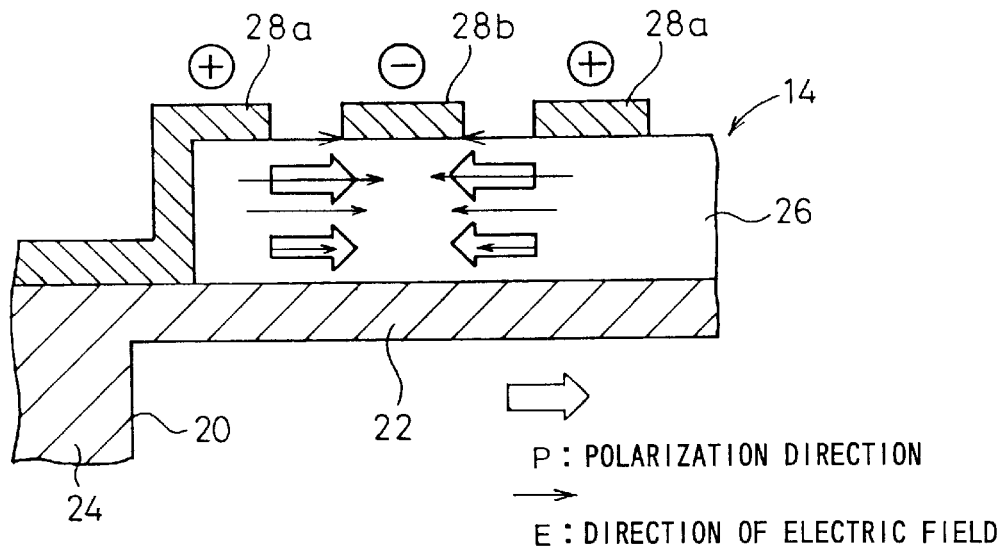
FIG. 17A explanatorily shows a polarization direction and a direction of an electric field obtained when the piezoelectric/electrostrictive layer is subjected to an initial polarization treatment.

The measurement of the bending displacement characteristic will be specifically explained with reference to an example. At first, as shown in FIG. 17A, when a predetermined voltage is applied in the positive direction between the pair of electrodes 28a, 28b to perform the polarization treatment for the piezoelectric/electrostrictive layer 26, for example, an electric field in the positive direction (for example, an electric field indicated by +5E in FIG. 16B) is generated in the superficial direction around the first principal surface of the piezoelectric/electrostrictive layer 26. In this procedure, an expression of 1E=about 2.5 kV/mm is given.

The intensity of the electric field generated in the piezoelectric/electrostrictive layer 26 is largest at the first principal surface, and it is gradually decreased in the depth direction. Accordingly, polarization does not proceed easily at deep portions. However, polarization can be allowed to proceed up to such portions located in the depth direction by applying a sufficient electric field, taking a sufficient time, and applying an appropriate amount of heat.

An electric field (+5E), which exceeds the range of use of the electric field usable to normally operate the actuator element 14 of the display device (for example, a range of +3E to −3E in FIG. 16B), is applied, for example, for 7 hours at an appropriate temperature. Thus the polarization treatment is achieved for the piezoelectric/electrostrictive layer 26 in the same direction as that of the applied electric field.

Figure 17B:
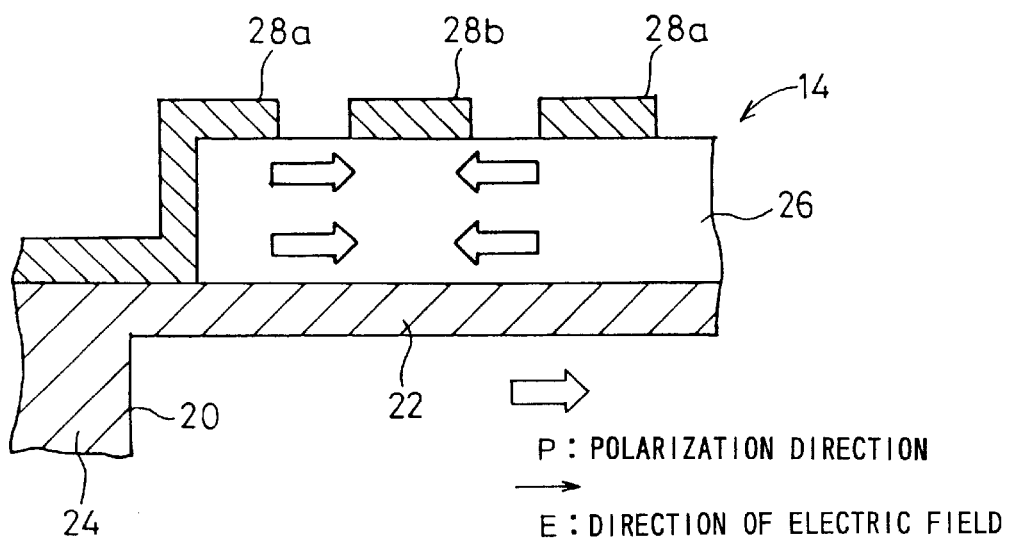
FIG. 17B explanatorily shows a polarization direction in a state (no-voltage-loaded state) in which voltage application to the pair of electrodes is stopped.

After that, as shown in FIG. 17B, the voltage application between the pair of electrodes 28a, 28b is stopped to give a no-voltage-loaded state. Simultaneously with the start of measurement, a sine wave having a frequency of 1 Hz and peak values of ±3E (see FIG. 16A) is applied to the actuator element 14. During this process, the displacement amount is continuously measured at respective points (Point A to Point D) by using a laser displacement meter. FIG. 16B shows a characteristic curve obtained by plotting results of the measurement on a graph of electric field-bending displacement. As indicated by arrows in FIG. 16B, the displacement amount of the bending displacement continuously changes in accordance with continuous increase and decrease in electric field while providing a certain degree of hysteresis.

Figure 18A:
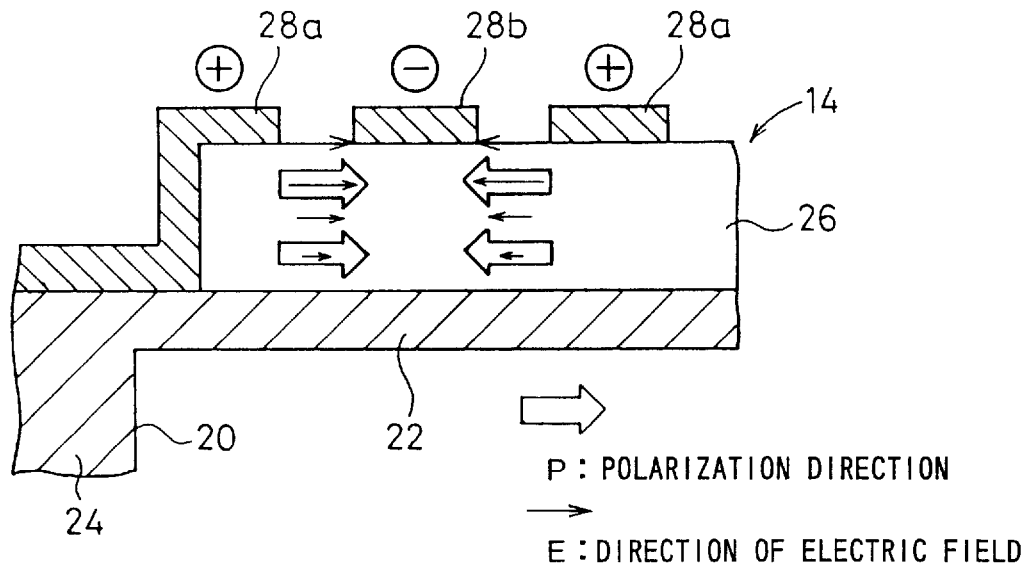
FIG. 18A explanatorily shows a polarization direction and a direction of an electric field obtained in a state in which the electric field (+3E) is applied in the positive direction to the actuator element of the display device according to the embodiment of the present invention.

Specifically, it is assumed that the measurement is started from a point of an electric field +3E indicated by Point A. At first, at Point A, as shown in FIG. 18A, the polarization direction is coincident with the direction of the electric field in the piezoelectric/electrostrictive layer 26, and the electric field is applied intensely in the vicinity of the surface of the piezoelectric/electrostrictive layer 26. Accordingly, the piezoelectric/electrostrictive layer 26 is elongated in the horizontal direction, and the actuator element 14 makes bending displacement in an amount of about 0.8 Δy in the first direction (direction for the pair of electrodes 28a, 289b formed on the piezoelectric/electrostrictive layer 26 to face the free space) (see FIG. 16B). In this process, an expression of 1 Δy=about 1.6 μm is given.

After that, the following operation is performed in a stage in which the voltage applied between the pair of electrodes 28a, 28b is changed, and an electric field is generated in the actuator element 14 in a direction opposite to the direction of the electric field upon the polarization treatment.

Figure 18B:
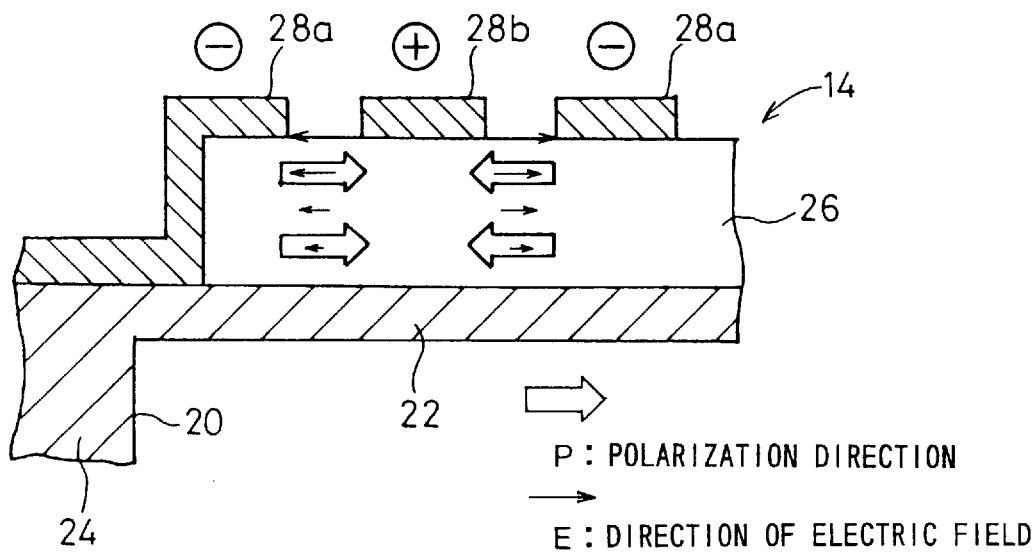
FIG. 18B explanatorily shows a polarization direction and a direction of an electric field obtained in a state in which the predetermined electric field (−0.6E) in the negative direction is applied to the actuator element.

At first, for example, at a stage of Point B at which the electric field is weak (−0.6E), the polarization direction is mutually opposite to the direction of the electric field in the piezoelectric/electrostrictive layer 26 as shown in FIG. 18B, and the piezoelectric/electrostrictive layer 26 is contracted in the horizontal direction. Accordingly, the actuator element 14 makes bending displacement in an amount of about −0.3 Δy in a second direction (direction directed from the piezoelectric/electrostrictive layer 26 to the vibrating section 22). In this stage, the polarization at the surface portion of the piezoelectric/electrostrictive layer 26 begins to make inversion. Therefore, the electric field (−0.6E) at Point B can be defined to be the predetermined electric field.

Figure 19A:
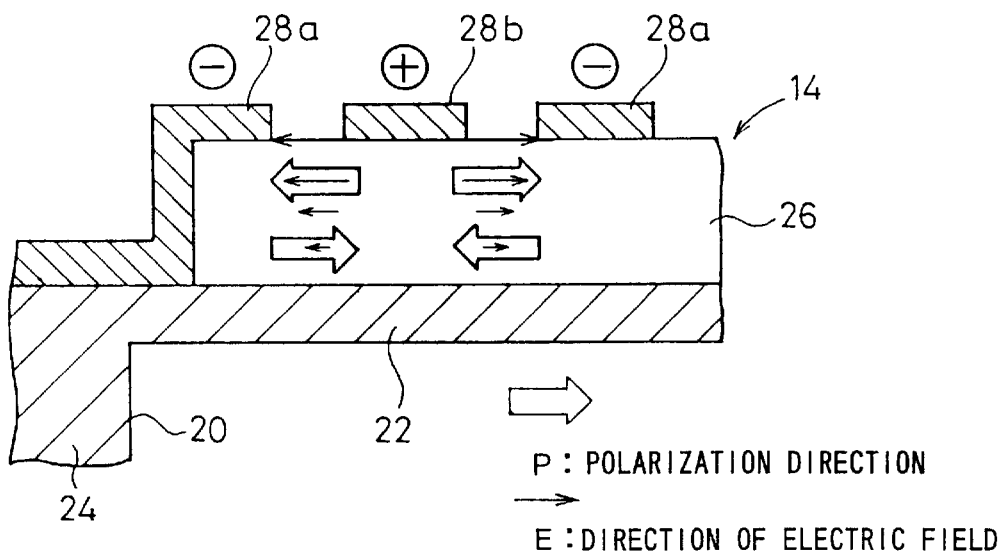
FIG. 19A explanatorily shows a polarization direction and a direction of an electric field obtained in a state in which the electric field (−3E) is applied in the negative direction to the actuator element of the display device according to the embodiment of the present invention.

After that, when the electric field is intensified in the negative direction, the inversion of polarization proceeds at the surface portion of the piezoelectric/electrostrictive layer 26 as shown in FIG. 19A. As a result, a phenomenon occurs in which the polarization direction is coincident with the direction of the electric field in the vicinity of the surface of the piezoelectric/electrostrictive layer 26, while the polarization direction is opposite to the direction of the electric field at the deep portions of the piezoelectric/electrostrictive layer 26. Namely, two types of polarization exist in the piezoelectric/electrostrictive layer 26. Accordingly, the actuator element 14 functions as a pseudo-bi-morph type actuator element. Especially at a stage in which the electric field is −3E, the displacement amount of the actuator element 14 is extremely large owing to the pseudo-bi-morph type action. In the instance shown in FIG. 16B, there is given a displacement=about 2.6 Δy.

Figure 19B:
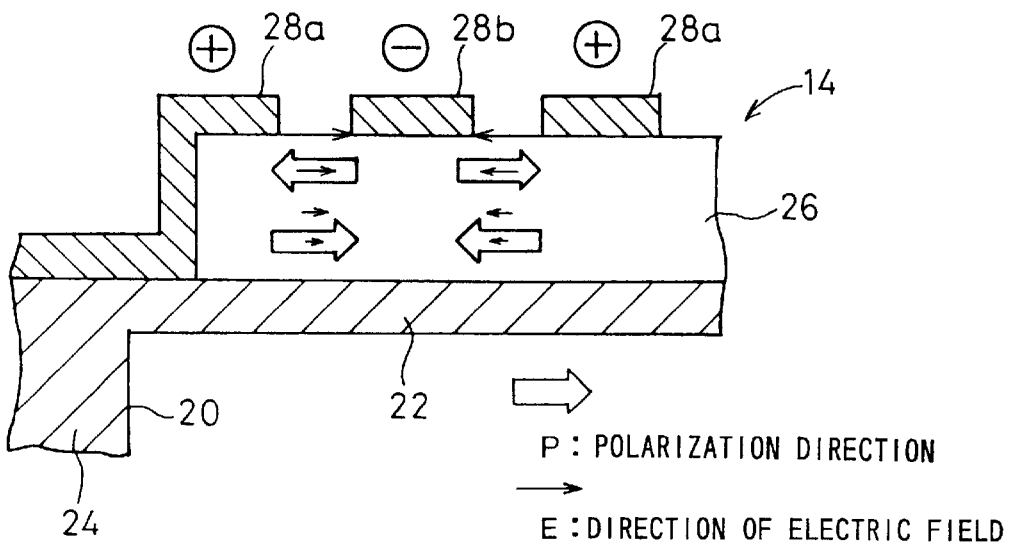
FIG. 19B explanatorily shows a polarization direction and a direction of an electric field obtained in a state in which the predetermined electric field (+0.6E) in the positive direction is applied to the actuator element.

Next, when the electric field is changed from the negative direction to the positive direction to arrive at a stage in which the electric field is weak, for example, at Point D (+0.6E), the polarization direction is opposite to the direction of the electric field in the vicinity of the surface of the piezoelectric/electrostrictive layer 26, while the polarization direction is coincident with the direction of the electric field at the deep portions of the piezoelectric/electrostrictive layer 26 as shown in FIG. 19B. As a result, a conformation is provided in which the surface portion of the piezoelectric/electrostrictive layer 26 is contracted in the horizontal direction, and the deep portion of the piezoelectric/electrostrictive layer 26 is elongated in the horizontal direction. Accordingly, the actuator element 14 makes bending displacement in an amount of about −1.0 Δy in the second direction (direction directed from the piezoelectric/electrostrictive layer 26 to the vibrating section 22). In this stage, the polarization at the surface portion of the piezoelectric/electrostrictive layer 26 begins to make inversion. Therefore, the electric field (+0.6E) at Point D can be defined to be the predetermined electric field in the same manner as the electric field at Point B.

Subsequently, as the electric field is gradually intensified in the positive direction, the inversion of polarization proceeds in the vicinity of the surface of the piezoelectric/electrostrictive layer 26, and the polarization direction is coincident with the direction of the electric field in the piezoelectric/electrostrictive layer 26. Therefore, the stage directed from Point D to Point A may be called "repolarization treatment stage".

As described above, in order to evaluate whether the bending displacement characteristic is the symmetrical characteristic or the asymmetrical characteristic, it is necessary to perform the measurement by using the electric field which is sufficiently larger than the predetermined electric field (±0.6E). However, if the measurement is performed by using an electric field which is far larger than the predetermined electric field, a situation may occur in which it is impossible to distinguish the asymmetrical characteristic which is the inherent characteristic of the actuator element 14 of the display device according to the embodiment of the present invention.

Therefore, in order to distinguish the asymmetrical characteristic for the bending displacement characteristic, it is desirable to evaluate the bending displacement characteristic by applying, in an alternating manner, an electric field which is not less than four times the electric field (defined herein as "predetermined electric field) at which the polarization direction begins to make inversion partially. Namely, it is possible to easily evaluate the asymmetrical characteristic for the bending displacement characteristic by using a large absolute amount of displacement to perform the measurement.

For example, in the case of the conventional display device, the predetermined electric field is ±0.5E. Therefore, the measurement may be performed on condition that the electric field in the positive direction is not less than +2.0E, and the electric field in the negative direction is not more than −2.0E. In the case of the display device according to the embodiment of the present invention, the predetermined electric field is ±0.6E. Therefore, the measurement may be performed on condition that the electric field in the positive direction is not less than +2.4E, and the electric field in the negative direction is not more than −2.4E.

In FIG. 16B, the bending displacement characteristic is measured by applying, in an alternating manner, the electric field (±3E) which is sufficiently larger than the predetermined electric field (±0.6E). In this case, the displacement amount ya is 0.8 Δy at the peak value (Point A) of the electric field in the positive direction, and the displacement amount yc is 2.6 Δy at the peak value (Point C) of the electric field in the negative direction. Accordingly, there is given a relationship of yc=3.25 ya.

Next, explanation will be made for dimensional relationships for allowing the bending displacement characteristic to have the asymmetrical characteristic. At first, the distance x between the pair of electrodes 28a, 28b and the thickness y of the piezoelectric/electrostrictive layer 26 will be described. As shown in FIG. 20, on condition that expressions of $1 \ \mu m \leq x \leq 200 \ \mu m$ and $1 \ \mu m \leq y \leq 100 \ \mu m$ are satisfied, and a relationship of y=ax is satisfied, it is specified that a range of $1/10 \leq a \leq 100$ is satisfied. Especially, as for the proportional constant a, the range is preferably $1/5 \leq a \leq 10$, and more preferably $1/2 \leq a \leq 5$. In this case, when expressions of $1 \ \mu m \leq x \leq 60 \ \mu m$ and $1 \ \mu m \leq y \leq 40 \ \mu m$ are satisfied, the polarization direction is easily inverted up to an appropriate depth of the piezoelectric/electrostrictive layer 26 upon application of the electric field in the direction opposite to the polarization direction, and the displacement amount is effectively increased. Accordingly, this condition is optimum for the actuator element 14.

Figure 21B:
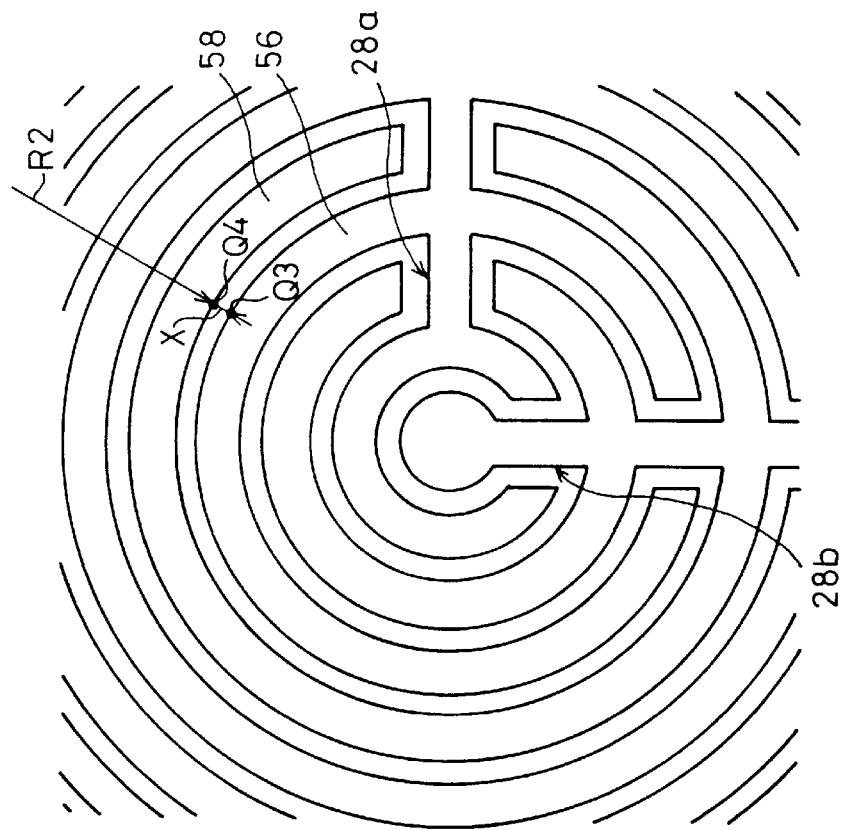
FIG. 21B explanatorily shows the distance between the electrodes when the pair of electrodes have a branched planar configuration.
Figure 21A:
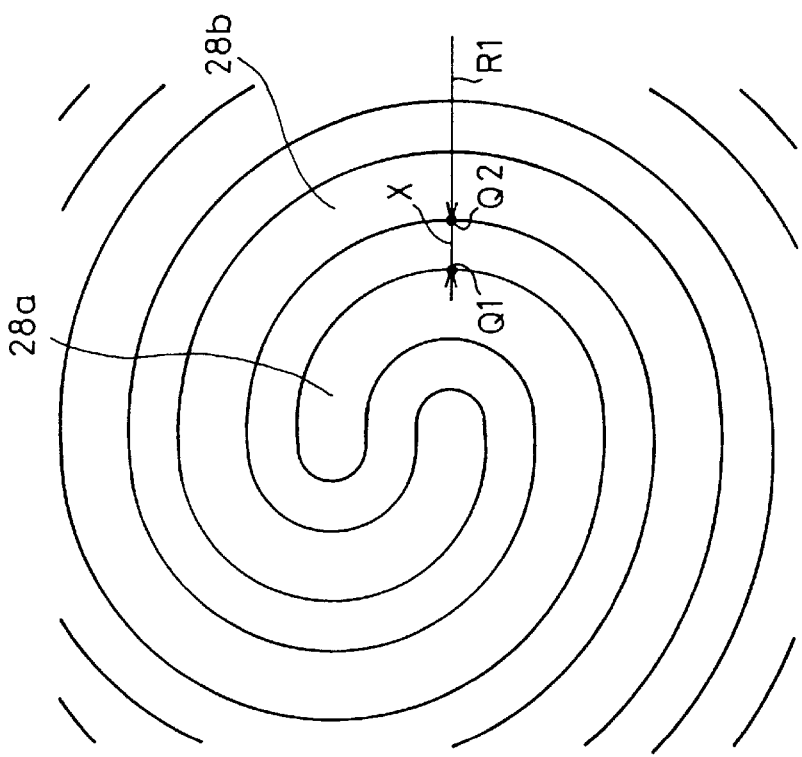
FIG. 21A explanatorily shows the distance between the electrodes when the pair of electrodes have a spiral planar configuration.

The distance x between the pair of electrodes 28a, 28b is determined as follows when the pair of electrodes 28a, 28b have the spiral planar configuration. Namely, as shown in FIG. 21A, for example, when a normal R1 is drawn from an outer circumferential edge of the first electrode 28a, the distance x is indicated by a distance between a starting point Q1 of the normal R1 and an intersection point Q2 between the normal R1 and an inner circumferential edge of the second electrode 28b.

When the pair of electrodes 28a, 28b have the branched planar configuration, the distance x between the pair of electrodes 28a, 28b is determined as follows. Namely, as shown in FIG. 22B, for example, when a normal R2 is drawn from an outer circumferential edge of a branch 56 of the first electrode 28a, the distance x is indicated by a distance between a starting point Q3 of the normal R2 and an intersection point Q4 between the normal R2 and an inner circumferential edge of a branch 58 of the second electrode 28b.

Figure 22:
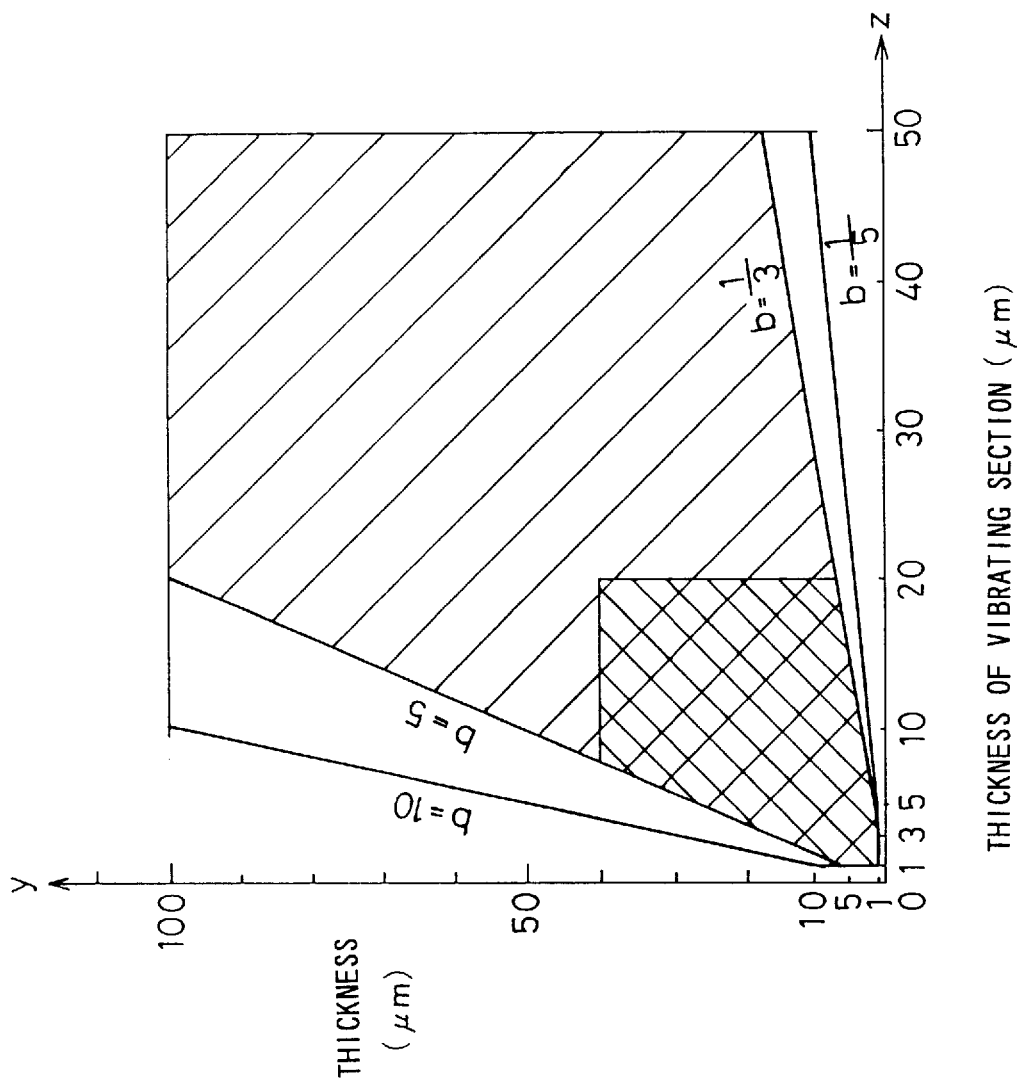
FIG. 22 shows characteristic curves illustrating a dimensional relationship between the thickness of the piezoelectric/electrostrictive layer and the thickness of the vibrating section of each of the actuator elements of the display device according to the embodiment of the present invention.

Next, the thickness y of the piezoelectric/electrostrictive layer 26 and the thickness z of the vibrating section 22 will be described. As shown in FIG. 22, on condition that expressions of $1 \ \mu m \leq y \leq 100 \ \mu m$ and $1 \ \mu m \leq z \leq 50 \ \mu m$ are satisfied, and a relationship of y=bz is satisfied, it is specified that a range of $1/5 \leq b \leq 10$ is satisfied. Especially, as for the proportional constant b, the range is preferably $1/3 \leq b \leq 5$. In this case, when expressions of $1 \ \mu m \leq y \leq 40 \ \mu m$ and $1 \ \mu m \leq z \leq 20 \ \mu m$ are satisfied, the polarization direction is easily inverted up to an appropriate depth of the piezoelectric/electrostrictive layer 26 upon application of the electric field in the direction opposite to the polarization direction, and the displacement amount is effectively increased. Accordingly, this condition is optimum for the actuator element 14.

Further, as shown in FIGS. 23 and 24, it is preferable for the display device according to the embodiment of the present invention that the cross-sectional configuration concerning the minimum dimension m passing through the center of the vibrating section 22 satisfies the following conditions, regardless of the fact that the display device is operated in accordance with the first or second illustrative operation. It is noted that the pair of electrodes 28a, 28b are omitted in FIGS. 23 and 24, in order to avoid complication of the drawings.

Figure 23A:
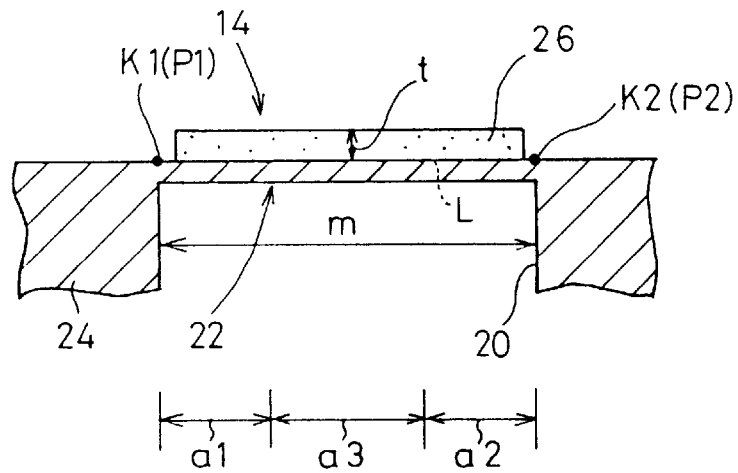
FIG. 23A shows a cross-sectional view illustrating, with partial omission, a cross-sectional shape of the actuator element in the shortest dimension.
Figure 23B:
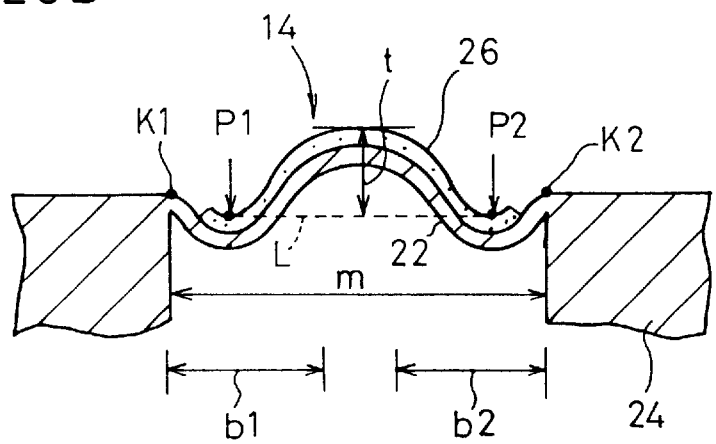
FIG. 23B shows a cross-sectional view illustrating, with partial omission, a case in which one outermost local minimum point and the other outermost local minimum point exist under the upper surface of the fixed section.

Namely, as shown in FIG. 23B, at least a part of the upper surface of the piezoelectric/electrostrictive layer 26 in the vicinity of its center makes, in the no-voltage-loaded state (state of the electric field E=0), a protrusion in a direction directed oppositely to the vibrating section 22 from a reference line L formed by connecting one outermost local minimum point P1 and the other outermost local minimum point P2 adjacent to the fixed section 24.

The vicinity of the center of the piezoelectric/electrostrictive layer 26 is herein defined as follows as shown in FIG. 23A. Concerning the shortest dimension m, boundary portions between the upper surface of the fixed section 24 and the upper surface of the vibrating section 22 are defined as one boundary point K1 and the other boundary point K2. When the shortest dimension m is regarded to be 100, the vicinity of the center of the piezoelectric/electrostrictive layer 26 is indicated by a central range a3 of 40%, except for a range a1 of 30% ranging from the one boundary point K1 toward the center of the shortest dimension m, and a range a2 of 30% ranging from the other boundary point K2 toward the center of the shortest dimension m.

The one outermost local minimum point P1 is defined as follows as shown in FIG. 23B. Concerning the shortest dimension m, a plurality of local minimum points are formed on a projection line concerning the first principal surface of the piezoelectric/electrostrictive layer 26 and the upper surface of the vibrating section 22 with respect to the plane of the shortest dimension. Among the plurality of the local minimum points, the one outermost local minimum point P1 corresponds to a local minimum point which is closest to the one boundary point K1. Among the plurality of the local minimum points, the other outermost local minimum point P2 corresponds to a local minimum point which is closest to the other boundary point K2.

In this case, on condition that the shortest dimension m is regarded to be 100, the one outermost local minimum point P1 is acknowledged to be a local minimum point which exists within a range of 40% (one local minimum point-existing region b1) ranging from the one boundary point K1 toward the center of the shortest dimension m, and which is closest to the one boundary point K1. The other outermost local minimum point P2 is acknowledged to be a local minimum point which exists within a range of 40% (the other local minimum point-existing region b2) ranging from the other boundary point K2 toward the center of the shortest dimension m, and which is closest to the other boundary point K2.

Figure 23C:
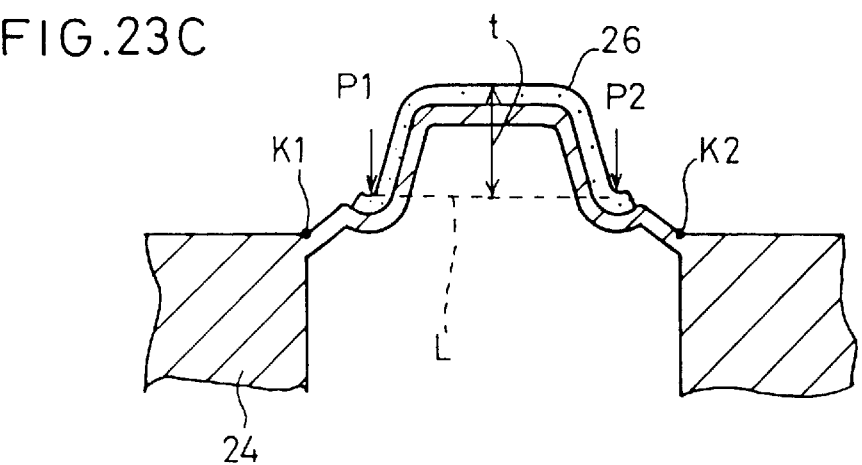
FIG. 23C shows a cross-sectional view illustrating, with partial omission, a case in which one outermost local minimum point and the other outermost local minimum point exist over the upper surface of the fixed section.

As shown in FIG. 23B, the outermost local minimum points P1, P2 may exist under the upper surface of the fixed section 24. As shown in FIG. 23C, the outermost local minimum points P1, P2 may exist over the upper surface of the fixed section 24.

Figure 24A:
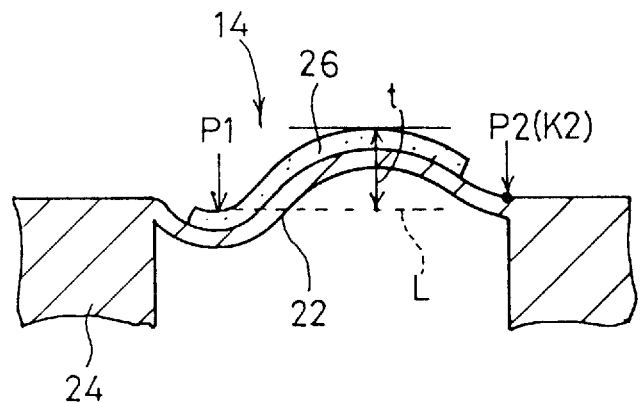
FIG. 24A shows a cross-sectional view illustrating, with partial omission, an illustrative case in which the other outermost local minimum point does not exist in the other local minimum point-existing region, and the other boundary point is regarded as the other outermost local minimum point.
Figure 24B:
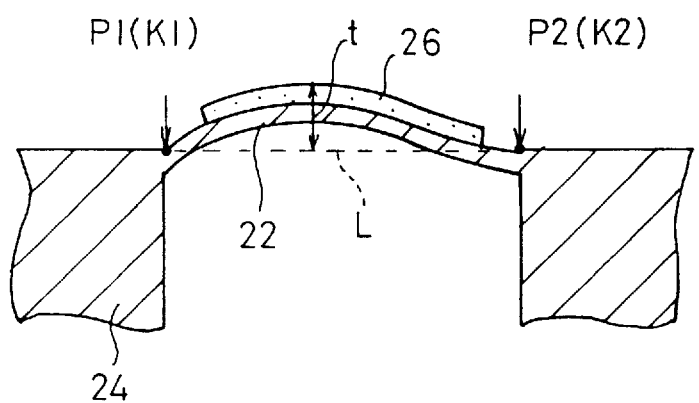
FIG. 24B shows a cross-sectional view illustrating, with partial omission, an illustrative case in which no outermost local minimum point exists in both of the local minimum point-existing regions respectively, and one boundary point and the other boundary point are regarded as one outermost local minimum point and the other outermost local minimum point respectively.

As shown in FIG. 24A, for example, when the other outermost local minimum point P2 does not exist in the other local minimum point-existing region b2, the other boundary point K2 is acknowledged to be the other outermost local minimum point P2. Such acknowledgment is made in the same manner for the one outermost local minimum point P1. As shown in FIGS. 23A and 24B, when the respective outermost local minimum points P1, P2 do not exist in both of the local minimum point-existing regions b1, b2, the one boundary point K1 and the other boundary point K2 are acknowledged to be the one outermost local minimum point P1 and the other outermost local minimum point P2 respectively.

Under the foregoing condition, i.e., under the condition that "at least a part of the upper surface in the vicinity of the center of the piezoelectric/electrostrictive layer 26 makes, in the no-voltage-loaded state, a protrusion in a direction directed oppositely to the vibrating section 22 from a reference line L", it is more preferable that the amount of protrusion t satisfies $m/1000 \leq t \leq m/10$ provided that the length of the shortest dimension is m.

By satisfying the foregoing condition, the produced actuator elements 14 is allowed to necessarily make large displacement in the first direction, making it possible to achieve improvement in yield when it is used for the display device.

Next, the second illustrative operation of the actuator element 14 will be explained. At first, apart from the driving of the display device according to the embodiment of the present invention shown in FIG. 1, the respective picture elements (actuator elements 14) are subjected to a polarization treatment (initial polarization treatment). The initial polarization treatment is performed by applying, for example, for 7 hours at an appropriate temperature, an electric field (+5E) which exceeds the range of use of the electric field to be used for the actuator (for example, a range of +3E to −3E in FIG. 16B). Thus the piezoelectric/electrostrictive layer 26 for each of the picture elements is subjected to the polarization treatment in the same direction as that of the applied electric field.

At a stage in which the initial polarization treatment is completed for all of the picture elements, the voltage application to the pair of electrodes 28a, 28b is stopped to give the no-voltage-loaded state.

The display device is operated such that the three basic operations (ON selection, OFF selection, and NO selection) are effected on the picture elements to display a picture.

Figure 25A:
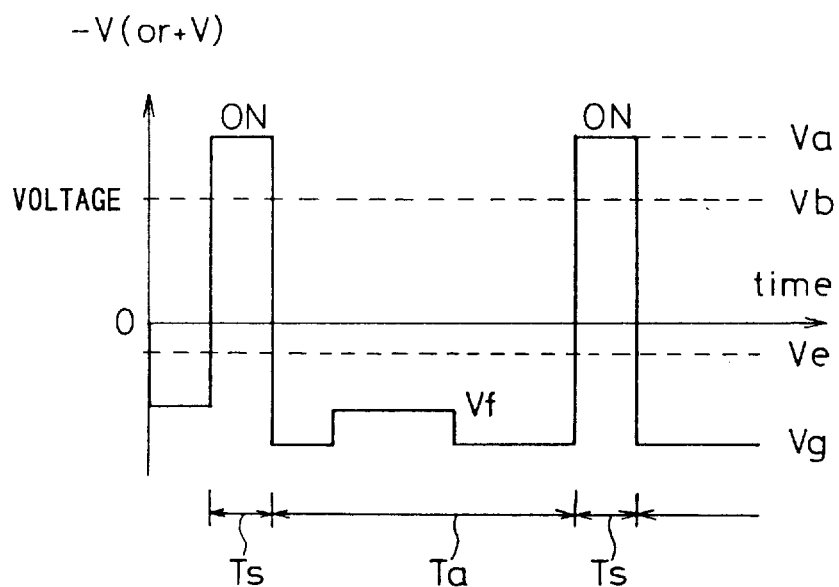
FIG. 25A shows a timing chart illustrating the change in voltage level between the NO selection state and the ON selection state concerning the actuator element.
Figure 25B:
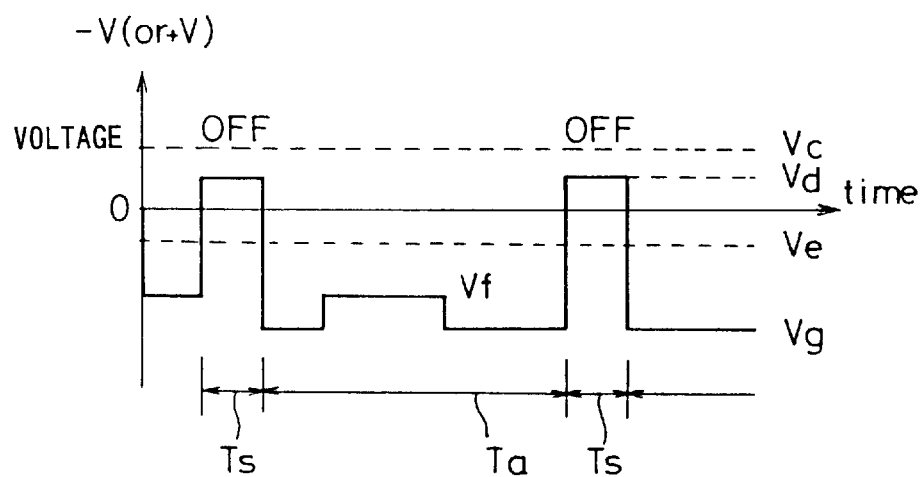
FIG. 25B shows a timing chart illustrating the change in voltage level between the NO selection state and the OFF selection state concerning the actuator element.

As shown in FIG. 25A, ON selection is performed by applying a voltage Va to the pair of electrodes 28a, 28b of the picture element during a predetermined selected term Ts to generate the electric field Ea in the negative direction (see FIG. 16B) between the pair of electrodes 28a, 28b. As shown in FIG. 25B, OFF selection is performed by applying a voltage Vd to the pair of electrodes 28a, 28b of the picture element during a predetermined selected term Ts to generate the electric field Ed in the negative or positive direction (see FIG. 16B) between the pair of electrodes 28a, 28b.

As shown in FIG. 25A or 25B, NO selection is performed by applying a voltage Vf or Vg to the pair of electrodes 28a, 28b of the picture element during a term (non-selected term Ta) other than the selected term Ts to generate the electric field Ef or Eg in the positive direction (see FIG. 16B) between the pair of electrodes 28a, 28b. In the non-selected term Ta, the electric field in the positive direction is generated in the same manner as the initial polarization treatment. Accordingly, the piezoelectric/electrostrictive layer 26 of the picture element, which is in the NO selection state, is subjected to a treatment equivalent to the polarization treatment (the treatment is conveniently referred to as "repolarization treatment").

The driving operation of the display device according to the embodiment of the present invention will be specifically explained. A group of the picture elements included in one row, for example, those included in 1st row, 2nd row, . . . nth row are successively selected for every one horizontal scanning term in accordance with electric potential supply to the vertical selection lines 40 by using, for example, a vertical shift circuit composed of a shift register, on the basis of input of an image signal into the display device. An electric potential is supplied to the signal line 42 corresponding to the picture element 14 which is included in the selected row and which should be subjected to ON selection, during the predetermined selected term Ts, for example, from a horizontal shift circuit composed of a shift register. As a result, the picture element 14, which is subjected to ON selection by the vertical shift circuit and the horizontal shift circuit, is operated such that a negative predetermined electric potential is applied to its first electrode 28a, and a positive electric potential is applied to its second electrode 28b. Thus the voltage between the pair of electrodes 28a, 28b is the predetermined voltage Va in the negative direction (see FIG. 25A). At this time, as shown in FIGS. 16B and 19A, for example, the electric field Ea in the negative direction (for example, −3E: electric field in the direction opposite to those of the electric fields upon the initial polarization treatment and NO selection) is generated between the pair of electrodes 28a, 28b, and the actuator element 14 corresponding to the picture element is displaced in the first direction in an amount of about 2.6 Δy. As viewed for the display device, this state exhibits the ON selection state. In the ON selection state, the displacement-transmitting section 32 is displaced toward the optical waveguide plate 12 in accordance with the convex deformation of the actuator element 14, and the displacement-transmitting section 32 contacts with the optical waveguide plate 12. On the other hand, the picture element 14, which is included in the group of the picture elements concerning the row selected by the vertical shift circuit and which is not subjected to ON selection or which is subjected to OFF selection, is operated as follows. Namely, the electric potential of the signal line 42 concerning the picture element 14 is made to be an electric potential which is different from the electric potential for ON selection, during the predetermined selected term Ts. A negative predetermined electric potential is applied to the first electrode 28a of the picture element 14, and a negative or positive electric potential is applied to the second electrode 28. Thus the voltage between the pair of electrodes 28a, 28b is the predetermined voltage Vd in the negative or positive direction (see FIG. 25B). At this time, as shown in FIG. 16B, for example, the electric field Ed in the negative or positive direction (for example, −0.6E to +0.6E) is generated between the pair of electrodes 28a, 28b, and the actuator element 14 corresponding to the picture element is displaced in the first direction in an amount of about −1.0 Δy to 0.5 Δy. As viewed for the display device, this state exhibits the OFF selection state. In the OFF selection state, the displacement-transmitting section 32 is separated from the optical waveguide plate 12 in accordance with the displacement action of the actuator element 14 as described above.

The actuator element 14 concerning the picture element subjected to ON selection or OFF selection undergoes the repolarization treatment in the NO selection state thereafter, and it makes displacement in an amount of about 1 Δy in the first direction (direction for the pair of electrodes 28a, 28b formed on the piezoelectric/electrostrictive layer 26 to face the free space). In the NO selection state, the voltage is at a level of Vg or Vf (see FIGS. 25A and 25B) which includes a superimposed voltage change brought about on the basis of ON selection or OFF selection in another row. However, the presence of the superimposed component (crosstalk component) effects a certain degree of the repolarization treatment for the actuator element 14 in the NO selection state. Accordingly, such a component is useful to restore the displacement amount obtained in response to the change in electric field and restore the response performance of the display device. Namely, the crosstalk component simultaneously contributes to the restoration of the response performance.

The voltage level to perform ON selection may be a voltage level in the negative direction as compared with the voltage level Vb (voltage level corresponding to the electric field Eb (for example, −2E) in FIG. 16B). The voltage level to perform OFF selection may be any voltage level included in a voltage level range from Vc to Ve (voltage level range corresponding to an electric field range of Ec (for example, −0.6E) to Ee (+0.6E) in FIG. 16B). The voltage level to perform the repolarization treatment may be a voltage level in the positive direction as compared with the voltage level Ve (voltage level corresponding to the electric field Ee (for example, +0.6E) in FIG. 16B).

Next, the operation of the display device according to the embodiment of the present invention will be explained with reference to FIG. 1. At first, the light 10 is introduced, for example, from the end of the optical waveguide plate 12. In this embodiment, all of the light 10 is subjected to total reflection at the inside of the optical waveguide plate 12 without being transmitted through the front and back surfaces of the optical waveguide plate 12 by controlling the magnitude of the refractive index of the optical waveguide plate 12. In this state, when a certain actuator element 14 is allowed to be in the voltage-applied state or the ON selection state, and the displacement-transmitting section 32 corresponding to the actuator element 14 contacts with the back surface of the optical waveguide plate 12 with a distance of not more than the wavelength of the light, if any, then the light 10, which has been subjected to total reflection, is transmitted to the surface of the displacement-transmitting section 32 which contacts with the back surface of the optical waveguide plate 12. The light 10, which has once arrived at the surface of the displacement-transmitting section 32, is reflected by the surface of the displacement-transmitting section 32, and it behaves as scattered light 70. A part of the scattered light 70 is reflected again in the optical waveguide plate 12. However, the greater part of the scattered light 70 is transmitted through the front surface of the optical waveguide plate 12 without being reflected by the optical waveguide plate 12.

Namely, the presence or absence of emission of light (leakage light) from the front surface of the optical waveguide plate 12 can be controlled in accordance with the presence or absence of the contact of the displacement-transmitting section 32 disposed at the back of the optical waveguide plate 12. Especially, in the display device according to the embodiment of the present invention, one unit for making the displacement movement of the displacement-transmitting section 32 in the direction to make contact or separation with respect to the optical waveguide plate 12 is used as one picture element. Further, a large number of the picture elements are arranged in a matrix form or in a zigzag configuration concerning the respective rows. Accordingly, when the displacement movement of each of the picture elements is controlled in accordance with an attribute of an inputted image signal, a picture (for example, characters and patterns) can be displayed on the front surface of the optical waveguide plate 12 in response to the image signal, in the same manner as the cathode-ray tube and the liquid crystal display device.

Figure 26A:
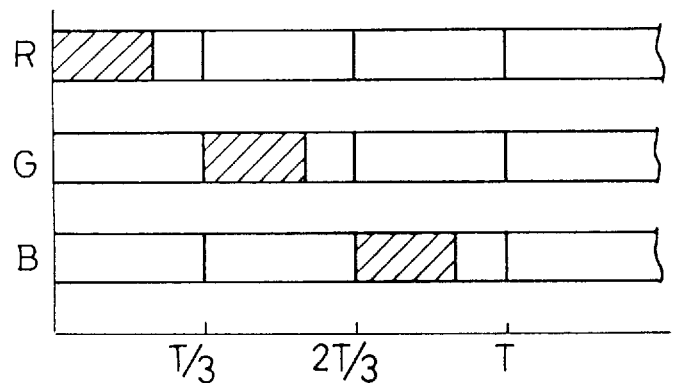
FIG. 26A shows a timing chart in which the ratio of RGB emission times is 1:1:1 when the display device according to the embodiment of the present invention is applied to a color display system.
Figure 26B:
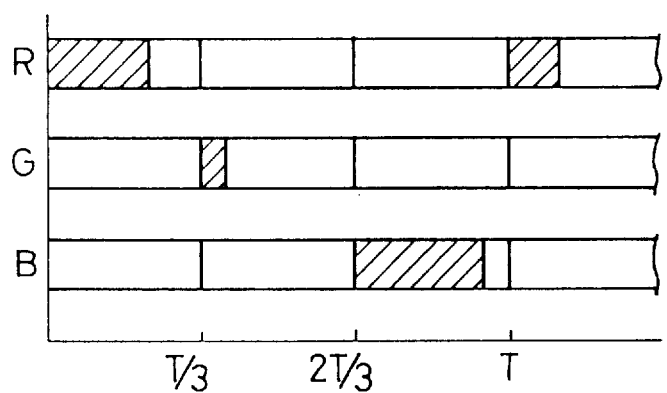
FIG. 26B shows a timing chart in which the ratio of RGB emission times is 4:1:5.

Next, explanation will be made for application of the display device according to the embodiment of the present invention to a color display system. At first, the principle of color development of the display device according to the embodiment of the present invention is specified by the mixing system of R (red), G (green), and B (blue) which are the three primary colors, in the same manner as the color display system in present use. Now, it is assumed that the period of color development is T, in order to divide the maximum emission time of RGB into three. As shown in FIG. 26A, when the ratio of RGB emission times is 1:1:1, white light is obtained. As shown in FIG. 26B, when the ratio of RGB emission times is 4:1:5, an intermediate color corresponding to the ratio is obtained. Therefore, the time of color development may be controlled as follows. Namely, the emission times of the three primary colors are controlled, while the contact time between the optical waveguide plate 12 and the displacement-transmitting section 32 is synchronized with the period of color development T. Alternatively, the contact time between the optical waveguide plate 12 and the displacement-transmitting section 32 is controlled, while the emission times of the three primary colors are synchronized with the period of color development T.

In view of the foregoing facts, the display device according to the embodiment of the present invention is advantageous in that it is unnecessary to increase the number of picture elements as compared with the case of a white-and-black screen even when the display device is applied to the color display system.

In the embodiment of the present invention, each of the picture elements is subjected to the repolarization treatment during the non-selected term. Alternatively, the repolarization treatment may be performed by applying, for example, the same electric field as that used in the initial polarization treatment, during any one of three terms, i.e., a term ranging from the light emission completion point for R to the next light emission start point for G, a term ranging from the light emission completion point for G to the next light emission start point for B, and a term ranging from the light emission completion point for B to the next light emission start point for R. In this procedure, the repolarization treatment may be combined with the repolarization treatment performed during the non-selected term.

Those preferably used as a light source for the illumination light to be introduced into the optical waveguide plate 12 include, for example, fluorescent light tubes, light emitting diodes, and laser beams. Alternatively, it is allowable to use a combination of a color filter and a halogen lamp, a metal halide lamp or a xenon lamp. Switching of RGB can be achieved by utilizing a mechanical shutter or an ON/OFF switch.

Figure 27:
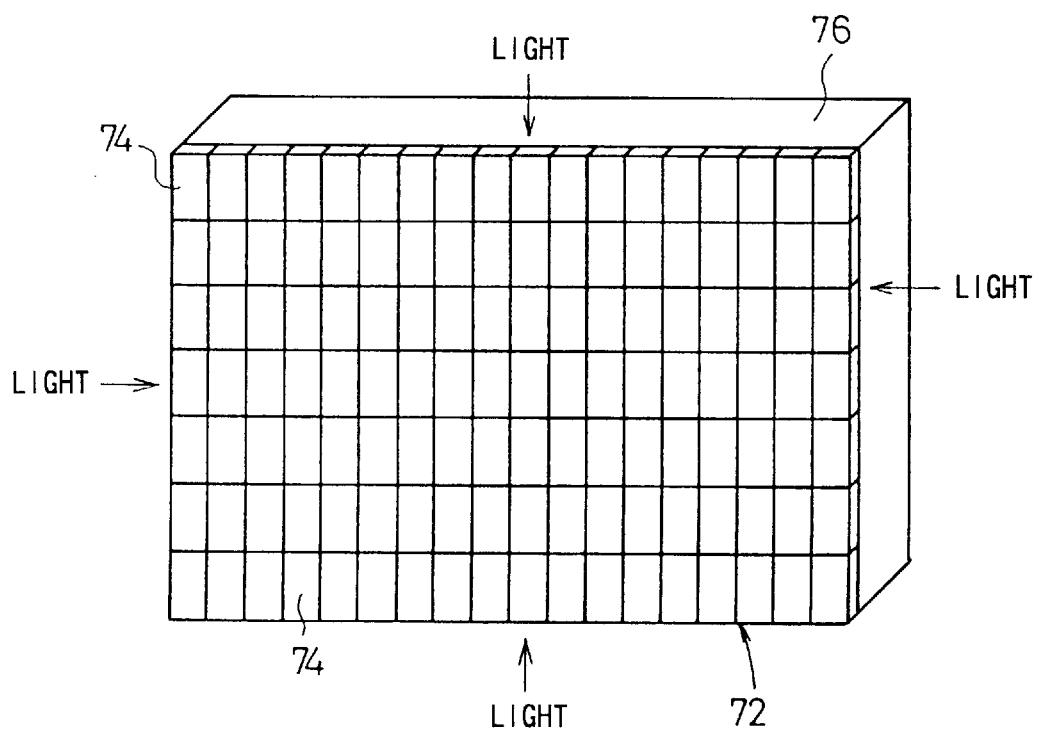
FIG. 27 shows a perspective view illustrating a large screen display apparatus based on the use of the display devices according to the embodiment of the present invention, as viewed from a back side.

The display device according to the embodiment of the present invention can be used singly. Besides, the display device according to the embodiment of the present invention may be used as one display element 74 included in a large screen display apparatus 72 as shown in FIG. 27. FIG. 27 shows an illustrative arrangement in which seven display elements 74 are arranged in a column in the vertical direction, and eighteen display elements 74 are arranged in a row in the lateral direction on a back surface of a light-introducing plate 76 having a display area for a large screen. In this arrangement, those which have a large and uniform light transmittance in the visible light region, such as glass plates and acrylic plates are used for the light-introducing plate 76. The respective display elements 74 are connected to one another by means of, for example, wire bonding, soldering, face connector, and back connector so that signals may be mutually supplied.

The large screen display apparatus 72 shown in FIG. 27 uses, for example, the display devices as shown in FIG. 7, as the display devices applied to the respective display elements 74. In each of the display elements 74, the arrangement of the picture elements comprises 32 individuals in the horizontal direction and 32 individuals in the vertical direction. In the display device shown in FIG. 7, the picture elements concerning the respective rows are arranged in the zigzag form. Accordingly, it is possible to provide an extremely small arrangement pitch of the picture elements in the horizontal direction. When the number of arranged picture elements in the horizontal direction is the same as that in the vertical direction, the entire planar configuration has a vertical length which is longer than a horizontal length.

The large screen display apparatus 72 shown in FIG. 27 represents the illustrative arrangement in which the display elements 74 including the optical waveguide plates 12 are arranged in the matrix form on the plate surface of the large light-introducing plate 76. Alternatively, the large light-introducing plate 76 may be omitted so that the large screen display apparatus 72 is constructed by arranging, in a matrix form, the display elements 74 including the optical waveguide plates 12. In such an arrangement, the large number of optical waveguide plates 12 arranged in the matrix form also serve as the large light-introducing plate 76. Besides the foregoing arrangement, it is also allowable that the large screen display apparatus 72 is constructed by arranging, in a matrix form, display elements 74 without including any optical waveguide plate 12 on the plate surface of the large light-introducing plate 76.

It is preferable that the light-introducing plate 76 has a refractive index which is similar to that of the optical waveguide plate 12. When the light-introducing plate 76 and the optical waveguide plates 12 are stuck to one another, a transparent adhesive may be used. The adhesive preferably has a uniform and high transmittance in the visible light region, in the same manner as the optical waveguide plate 12 and the light-introducing plate 76. It is desirable for the adhesive to set a refractive index which is near to those of the light-introducing plate 76 and the optical waveguide plate 12 in order to ensure brightness of the screen.

Next, explanation will be made for selection of the respective constitutive components of the actuator element 14, especially selection of materials for the respective constitutive components.

At first, it is preferable that the vibrating section 22 is composed of a highly heat-resistant material, because of the following reason. Namely, when the actuator element 14 has a structure in which the vibrating section 22 is directly supported by the fixed section 24 without using any material such as an organic adhesive which is inferior in heat resistance, the vibrating section 22 is preferably composed of a highly heat-resistant material so that the vibrating section 22 is not deteriorated at least during the formation of the piezoelectric/electrostrictive layer 26.

It is preferable that the vibrating section 22 is composed of an electrically insulative material in order to electrically separate the vertical selection line 40 communicating with the first electrode 28a of the pair of electrodes 28 formed on the substrate 18, from the signal line 42 communicating with the second electrode 28b.

Therefore, the vibrating section 22 may be composed of a material such as a highly heat-resistant metal and a porcelain enamel produced by coating a surface of such a metal with a ceramic material such as glass. However, the vibrating section 22 is optimally composed of a ceramic.

Those usable as the ceramic for constructing the vibrating section 22 include, for example, stabilized zirconium oxide, aluminum oxide, magnesium oxide, titanium oxide, spinel, mullite, aluminum nitride, silicon nitride, glass, and mixtures thereof. Stabilized zirconium oxide is especially preferred because of, for example, high mechanical strength obtained even when the thickness of the vibrating section 22 is thin, high toughness, and small chemical reactivity with the piezoelectric/electrostrictive layer 26 and the pair of electrodes 28. The term "stabilized zirconium oxide"

includes stabilized zirconium oxide and partially stabilized zirconium oxide. Stabilized zirconium oxide has a crystal structure such as cubic crystal, and hence it does not cause phase transition.

On the other hand, zirconium oxide causes phase transition between monoclinic crystal and tetragonal crystal at about 1000° C. Cracks appear during the phase transition in some cases. Stabilized zirconium oxide contains 1 to 30 mole % of a stabilizer such as calcium oxide, magnesium oxide, yttrium oxide, scandium oxide, ytterbium oxide, cerium oxide, and oxides of rare earth metals. In order to enhance the mechanical strength of the vibrating section 22, the stabilizer preferably comprises yttrium oxide. In this composition, yttrium oxide is contained preferably in an amount of 1.5 to 6 mole %, and more preferably 2 to 4 mole %. It is preferable that aluminum oxide is further contained in an amount of 0.1 to 5 mole %.

The crystal phase may be, for example, a mixed phase of cubic crystal+monoclinic crystal, a mixed phase of tetragonal crystal+monoclinic crystal, and a mixed phase of cubic crystal+tetragonal crystal+monoclinic crystal. However, among them, most preferred are those having a principal crystal phase composed of tetragonal crystal or a mixed phase of tetragonal crystal+cubic crystal, from viewpoints of strength, toughness, and durability.

When the vibrating section 22 is composed of a ceramic, a large number of crystal grains construct the vibrating section 22. In order to increase the mechanical strength of the vibrating section 22, the crystal grains preferably have an average grain diameter of 0.05 to 2 $\mu$m, and more preferably 0.1 to 1 $\mu$m.

The fixed section 24 preferably composed of a ceramic. The fixed section 24 may be composed of the same ceramic material as that used for the vibrating section 22, or the fixed section 24 may be composed of a ceramic material different from that used for the vibrating section 22. Those usable as the ceramic material for constructing the fixed section 24 include, for example, stabilized zirconium oxide, aluminum oxide, magnesium oxide, titanium oxide, spinel, mullite, aluminum nitride, silicon nitride, glass, and mixtures thereof, in the same manner as the ceramic material for the vibrating section 22.

Especially, those preferably adopted for the substrate 18 used in the display device according to the embodiment of the present invention include, for example, materials containing a major component of zirconium oxide, materials containing a major component of aluminum oxide, and materials containing a major component of a mixture thereof. Among them, those containing a major component of zirconium oxide are more preferable. Clay or the like is added as a sintering auxiliary in some cases. However, it is necessary to control auxiliary components in order not to contain an excessive amount of those liable to form glass such as silicon oxide and boron oxide because of the following reason. Namely, although the materials which are liable to form glass are advantageous to join the substrate 18 to the piezoelectric/electrostrictive layer 26, the materials facilitate the reaction between the substrate 18 and the piezoelectric/electrostrictive layer 26, making it difficult to maintain a predetermined composition of the piezoelectric/electrostrictive layer 26. As a result, the materials make a cause to deteriorate the element characteristics.

Namely, it is preferable that silicon oxide or the like in the substrate 18 is restricted to have a weight ratio of not more than 3%, and more preferably not more than 1%. The term "major component" herein refers to a component which exists in a proportion of not less than 50% in weight ratio.

Preferably, piezoelectric ceramics may be used as a constitutive material for the piezoelectric/electrostrictive layer 26. However, for the piezoelectric/electrostrictive layer 26, it is allowable to use electrostrictive ceramics or ferroelectric ceramics, and it is also allowable to use materials which require the polarization treatment, or materials which do not require the polarization treatment. The material for the piezoelectric/electrostrictive layer 26 is not limited to ceramics, which may be a piezoelectric material composed of a high molecular weight compound represented by PVDF (polyfluorovinylidene), or a composite comprising such a high molecular weight compound and a ceramic.

Those usable for the piezoelectric/electrostrictive layer 26 include, for example, ceramics such as lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, and lead cobalt niobate, and ceramics containing any one of combinations thereof. It is needless to say that the foregoing compounds may be a major component which occupies not less than 50% by weight. Among the ceramics described above, the ceramic containing lead zirconate is most frequently used as the constitutive material for the piezoelectric/electrostrictive layer 26 according to the embodiment of the present invention. When the piezoelectric/electrostrictive layer 26 is prepared based on the use of ceramic, it is allowable to use ceramics obtained by appropriately adding, to the foregoing ceramics, oxides of lanthanum, calcium, strontium, molybdenum, tungsten, barium, niobium, zinc, nickel, manganese or the like, or combinations of any of them, or other types of compounds.

For example, it is preferable to use a ceramic containing, as a major component, a component composed of lead magnesium niobate, lead zirconate, and lead titanate, and further containing lanthanum and strontium.

The piezoelectric/electrostrictive layer 26 may be either dense or porous. When the piezoelectric/electrostrictive layer 26 is porous, its porosity is preferably not more than 40%.

It is preferable that the thickness of the vibrating section 22 of the substrate 18 have a dimension identical to that of the thickness of the piezoelectric/electrostrictive layer 26 formed on the vibrating section 22, because of the following reason. Namely, if the thickness of the vibrating section 22 is extremely thicker than the thickness of the piezoelectric/electrostrictive layer 26 (if the former is different from the latter by not less than one figure), when the piezoelectric/electrostrictive layer 26 makes contraction upon firing, the vibrating section 22 behaves to inhibit the contraction. For this reason, the stress at the boundary surface between the piezoelectric/electrostrictive layer 26 and the substrate 18 is increased, and consequently they are easily peeled off from each other. On the contrary, when the dimension of the thickness is in an identical degree between the both, it is easy for the substrate 18 (vibrating section 22) to follow the contraction of the piezoelectric/electrostrictive layer 26 upon firing. Accordingly, such dimension of the thickness is preferred to achieve integration. Specifically, the vibrating section 22 preferably has a thickness of 1 to 100 $\mu$m, more preferably 3 to 50 $\mu$m, and much more preferably 5 to 20 $\mu$m. On the other hand, the piezoelectric/electrostrictive layer 26 preferably has a thickness of 5 to 100 $\mu$m, more preferably 5 to 50 $\mu$m, and much more preferably 5 to 30 $\mu$m.

The pair of electrodes 28 formed on the piezoelectric/electrostrictive layer 26 are allowed to have an appropriate thickness depending on the use or application. However, the thickness is preferably 0.01 to 50 μm, and more preferably 0.1 to 5 μm. The pair of electrodes 28 are preferably composed of a conductive metal which is solid at room temperature. The metal includes, for example, metal simple substances or alloys containing, for example, aluminum, titanium, chromium, iron, cobalt, nickel, copper, zinc, niobium, molybdenum, ruthenium, rhodium, silver, tin, tantalum, tungsten, iridium, platinum, gold, and lead. It is needless to say that these elements may be contained in an arbitrary combination.

The displacement-transmitting member 32b of the displacement-transmitting section 32 preferably has a hardness in a degree to directly transmit the displacement of the actuator element 14 to the optical waveguide plate 12. Therefore, those preferably used as materials for the displacement-transmitting member 32b include, for example, rubber, organic resins, organic adhesive films, and glass. However, it is allowable to use the electrode layer itself, or materials such as the piezoelectric materials and the ceramics described above. Those most preferably used include, for example, organic resins and organic adhesives based on epoxy compounds, acrylic compounds, silicone compounds, and polyolefin compounds. Further, it is effective to mix a filler with the foregoing compounds to suppress contraction upon curing.

Those desirably used as materials for the plate member 32a include the materials for the displacement-transmitting member 32b described above, as well as materials obtained by finely dispersing ceramic powder having a high refractive index, such as zirconia powder, titania powder, lead oxide powder, and mixed powder thereof, in an organic resin based on an epoxy, acrylic, or silicone compound, from viewpoints of light emission efficiency and maintenance of flatness. In this case, it is preferable to select a ratio of resin weight: ceramic powder weight=1:(0.1 to 10). Further, it is preferable to add, to the foregoing composition, glass powder having an average grain diameter of 0.5 to 10 μm in a ratio of 1:(0.1 to 1.0) with respect to the ceramic powder, because release property and contact property with respect to the surface of the optical waveguide plate 12 are improved.

Preferably, the flatness or the smoothness of the portion (surface) of the plate member 32a to contact with the optical waveguide plate 12 is sufficiently small as compared with the displacement amount of the actuator element 14, which is specifically not more than 1 μm, more preferably not more than 0.5 μm, and especially preferably not more than 0.1 μm. However, the flatness of the portion (surface) of the displacement-transmitting section 32 to contact with the optical waveguide plate 12 is important in order to reduce the clearance generated when the displacement-transmitting section 32 contacts with the optical waveguide plate 12. Accordingly, there is no limitation to the foregoing flatness range, when the contact portion makes deformation in a state of contact.

When the material described above is used for the displacement-transmitting section 32, the displacement-transmitting section 32 may be connected to the main actuator element 30 by stacking the displacement-transmitting section 32 composed of the foregoing material by using an adhesive, or by forming the displacement-transmitting section 32 on the upper portion of the main actuator element 30, or on the optical waveguide plate 12 or on the light-introducing plate 76 (see FIG. 27), in accordance with a method for coating a solution, a paste, or a slurry composed of the material described above.

When the displacement-transmitting section 32 is connected to the main actuator element 30, it is preferable that the material for the displacement-transmitting member 32b is a material which also serves as an adhesive. Especially, when an organic adhesive film is used, it can be used as an adhesive by applying heat, which is preferable.

The optical waveguide plate 12 has an optical refractive index so that the light 10 introduced into the inside is subjected to total reflection without being transmitted to the outside of the optical waveguide plate 12 through the front and back surfaces. It is necessary for the optical waveguide plate 12 to use those having a uniform and high transmittance in the wavelength region of visible light. The material for the optical waveguide plate 12 is not especially limited provided that it satisfies the foregoing characteristic. However, specifically, those generally used for the optical waveguide plate 12 include, for example, glass, quartz, light-transmissive plastics such as acrylic plastics, light-transmissive ceramics, structural materials comprising a plurality of layers composed of materials having different refractive indexes, and those having a surface coating layer.

Next, explanation will be made for the method for producing the display device according to the embodiment of the present invention. The substrate 18, which includes the vibrating section 22 and the fixed section 24, can be made into an integrated unit by stacking formed layers provided as green sheets or green tapes by means of thermal pressing and gluing, followed by firing. For example, the substrate 18 shown in FIG. 1 is preferably obtained by stacking two layers of green sheets or green tapes, in which a window having a predetermined shape to form the hollow space 20 is previously provided in the second layer of the two layers before stacking the first and second layers. Alternatively, a molded layer may be produced by means of, for example, pressing, casting, or injection molding based on the use of a mold so that a window to form the hollow space 20 is formed therein by means of mechanical processing such as cutting, cutting processing, laser processing, and punching by press processing. The two-layered structure is shown in FIG. 1. However, three-layered or four-layered structure may be used so that the rigidity of the substrate 18 may be improved, or a layer to be used as a back wiring board may be simultaneously stacked.

Next, the main actuator element 30 is formed on the vibrating section 22 of the substrate 18. In this procedure, two methods are available including a film-forming method described later on and a method in which the piezoelectric/electrostrictive layer 26 is formed in accordance with a press molding method based on the use of a mold or a tape-forming method based on the use of a slurry material, the piezoelectric/electrostrictive layer 26 before firing is stacked on the vibrating section 22 of the substrate 18 before firing by means of thermal pressing and gluing, and they are simultaneously fired to form the piezoelectric/electrostrictive layer 26 on the vibrating section 22 of the substrate 18.

In the film-forming method, the piezoelectric/electrostrictive layer 26 and the pair of electrodes 28 are stacked on the vibrating section 22 in this order. Those appropriately usable as the film-forming method include, for example, thick film methods such as screen printing, application methods such as dipping, and thin film methods such as ion beam, sputtering, vacuum deposition, ion plating, chemical vapor deposition (CVD), and plating. The wiring arrangements 40, 40 and terminal pads, which are connected to the pair of electrodes 28, are also formed by using the thick film method and the thin film method described above.

For example, the following illustrative production method is adopted for the display device according to the embodiment of the present invention. At first, the piezoelectric/ electrostrictive layer 26 is formed on the vibrating section 22 of the substrate 18 by means of the screen printing method. After that, firing is performed to join the piezoelectric/ electrostrictive layer 26 onto the vibrating section 22 of the substrate 18. In this procedure, in order to improve the joining performance between the substrate 18 and the piezoelectric/electrostrictive layer 26 and advantageously integrate the substrate 18 and the piezoelectric/ electrostrictive layer 26, it is preferable to carry out firing for the piezoelectric/electrostrictive layer 26 in an atmosphere of the piezoelectric/electrostrictive material in a tightly sealed vessel. More preferably, it is desirable to increase the atmosphere concentration.

The atmosphere firing is performed, for example, in accordance with the following method.

(1) Powder composed of the same components as those of the piezoelectric/electrostrictive material, which is used as an evaporation source, is placed together in the tightly sealed vessel.

(2) The composition of the piezoelectric/ electrostrictive material is allowed to previously contain an excessive amount of lead components.

(3) A plate made of the piezoelectric/electrostrictive material is used as a setter.

The firing temperature is preferably 900° to 1400° C., and more preferably 1100° to 1400° C.

After completion of the joining of the substrate 18 to the piezoelectric/electrostrictive layer 26, a wiring layer pattern including the pair of electrodes 28 is formed. The formation is performed by stacking, for example, a conductive paste such as conductor powder, organic metal, and resinate by means of screen printing. The pattern of the wiring layer includes, for example, a pattern for the vertical selection lines 40, a pattern for the signal lines 42, and an electrode pattern, as shown in FIG. 2. At this stage (stage of the screen printing), the electrode pattern has a simple circular configuration which is not the spiral configuration as shown in FIG. 3 or the branched configuration as shown in FIG. 4.

After that, necessary portions of the circular electrode pattern is evaporated off by using, for example, an excimer laser. Thus patterning is performed to provide the spiral configuration as shown in FIG. 3 or the branched configuration as shown in FIG. 4 so that the pair of electrodes 28*a*, 28*b* are produced.

A heat treatment is performed after completion of the patterning by means of the excimer laser to complete the formation of the main actuator element 30 on the substrate 18. When the pair of electrodes 28*a*, 28*b* are formed in accordance with the thin film method, the heat treatment is not necessarily required.

After completion of the formation of the main actuator element 30 on the substrate 18, the displacement-transmitting section 32 is connected thereto. When the material as described above is used for the displacement-transmitting section 32, the main actuator element 30 is preferably connected to the displacement-transmitting section 32 by stacking the displacement-transmitting section 32 composed of the foregoing material by using an adhesive, or by forming the displacement-transmitting section 32 on the upper portion of the main actuator element 30 by means of, for example, a method of coating a solution or a slurry comprising the foregoing material.

It is not necessarily indispensable to thereafter cut the displacement-transmitting section 32 into approximately the same shape as that of the main actuator element 30. However, depending on the material for the plate member 32*a* or the displacement-transmitting member 32*b* of the displacement-transmitting section 32, it is preferable to cut the layer of the displacement-transmitting section 32 or provide a cutout, in order to efficiently make displacement of the main actuator element 30.

It is needless to say that the predetermined distance between the displacement-transmitting section 32 and the optical waveguide plate 12 after the assembly is required to be small as compared with the displacement amount of the main actuator element 30. However, it is preferable that the fixed section 24 and the optical waveguide plate 12 are tightly fixed by providing a clearance-forming member having a predetermined size at a portion at which the main actuator element 30 does not exist.

As described above, the display device according to the embodiment of the present invention is advantageous in that it is unnecessary to increase the number of picture element as compared with the black-and-white screen even when the device is applied to the color display system.

In the display device according to the embodiment of the present invention, the main actuator element 30 for selectively displacing the displacement-transmitting section 32 is constructed such that the pair of electrodes 28 are formed on the first principal surface of the piezoelectric/electrostrictive layer 26 formed on the vibrating section 22. Since the pair of electrodes 28 are formed on the side of the first principal surface of the piezoelectric/electrostrictive layer 26, air or the constitutive material for the displacement-transmitting section 32, which has an extremely small dielectric constant as compared with the piezoelectric/electrostrictive layer 26, is allowed to intervene between the pair of electrodes 28*a*, 28*b*. For this reason, the electrostatic capacity of the main actuator element 30 is smaller than those in which electrodes are formed on upper and lower surfaces of the piezoelectric/ electrostrictive layer 26. Accordingly, the CR time constant for signal transmittance is also small. Namely, rounding scarcely occurs in the signal waveform of the voltage signal corresponding to the attribute of the image signal.

Accordingly, it is possible to selectively apply a specified voltage between the pair of electrodes 28 of each of the picture elements, making it possible to give necessary elongation to the respective piezoelectric/electrostrictive layers 26. Especially, it is possible to suppress the phenomenon that the display brightness is weakened at portions corresponding to the actuator elements 14 arranged at positions far from the portion from which the voltage signal is supplied (for example, peripheral and central portions of the screen).

Namely, the display device according to the embodiment of the present invention has an advantage that the electrostatic capacity of the actuator element 14 can be reduced, in addition to the advantage that it is unnecessary to increase the number of picture elements as compared with the black-and-white screen even when the display device is applied to the color display system. Further, it is possible to obtain the display brightness without any nonuniformity when a white color is displayed on the entire surface of a display screen, and it is possible to improve the image quality.

Especially, as shown in FIGS. 2 and 7, the display device according to the embodiment of the present invention has the pattern in which the first electrodes 28*a* of the pairs of electrodes 28*a*, 28*b*, which communicate with the vertical selection line 40, are connected in series concerning one row. Accordingly, it is possible to provide a wide dimension of the outer circumferential portion of each of the first electrodes 28a (shown by broken lines). In such an arrangement, it is possible to decrease the wiring resistance of the vertical selection line 40, and thus the CR time constant for signal transmission can be further decreased.

In the display device according to the embodiment of the present invention, the displacement direction of the main actuator element 30 is directed upwardly in FIG. 1 (direction toward the optical waveguide plate 12). Accordingly, the displacement-transmitting section 32 can be pressed against the optical waveguide plate 12 by means of the displacement force of the main actuator element 30. Moreover, it is easy to adjust the clearance (gap) between the optical waveguide plate 12 and the actuator element 14. Therefore, the display device is advantageous in that the displacement-transmitting section 32 reliably contacts with the optical waveguide plate 12.

If a part of the piezoelectric/electrostrictive layer 26 is lost together with a part of the electrode 28 disposed thereon due to dielectric breakdown or the like during production steps, for example, the actuator element 14 sufficiently functions only by repairing the lost electrode 28 even when the piezoelectric/electrostrictive layer 26 is not repaired. Accordingly, it is possible to eliminate vain efforts such as reproduction of an entire device during production steps, and it is possible to achieve improvement in yield of the display device.

In the display device according to the embodiment of the present invention, the vibrating section 22 and the fixed section 24 are formed in an integrated manner with the substrate 18 (ceramic), and the hollow space 20 is formed at the position corresponding to the vibrating section 22 so that the vibrating section 22 is thin-walled. Therefore, it is easy to produce the fixed section 24 and the vibrating section 22 in the substrate 18, which is advantageous in that the production cost for the display device can be reduced.

The thick-walled fixed section 24 and the thin-walled vibrating section 22 are consequently formed by providing the hollow space 20 in the substrate 18 composed of ceramic. Therefore, the vibrating section 22 responds to elongation of the piezoelectric/electrostrictive layer 26 in a sensitive manner. Thus the vibrating section 22 can promptly follow any change in voltage signal. Further, the rigidity is sufficiently ensured at the boundary between the vibrating section 22 and the fixed section 24, as compared with actuator elements having a bridged structure or a cantilever structure. Therefore, breakage scarcely occurs due to fatigue of the boundary caused by vibration of the vibrating section 22. In addition, the high rigidity of the substrate 18 makes it easy to stick the optical waveguide plate 12 to the vibrating section 16.

In the display device according to the present invention, both of the hollow space 20 and the piezoelectric/electrostrictive layer 26 have smoothly cornered planar configurations (circular configuration in the case of the display device according to the embodiment of the present invention and the display device according to the first modified embodiment, oblong configuration in the case of the display device according to the second and third modified embodiments, elliptic configuration in the case of the display device according to the fourth modified embodiment) respectively, and the planar configuration of the hollow space 20 has a size larger than that of the piezoelectric/electrostrictive layer 26. Therefore, the boundary between the vibrating section 24 and the fixed section 22 has a smoothly cornered configuration in the same manner as the planar configuration of the hollow space 20. Accordingly, the stress, which is generated by vibration of the vibrating section 22, is not locally concentrated. Moreover, all of the circumferential edge of the vibrating section 22 is supported by the fixed section 24, and hence it is possible to increase the rigidity at the circumferential edge portions of the vibrating section 22. As a result, it is possible to greatly improve the fatigue limit or endurance limit at the boundary, it is possible to realize a long service life of the actuator element 14, and consequently it is possible to realize a long service life of the display device.

In the display device according to the embodiment of the present invention, the pair of electrodes 28a, 28b on the piezoelectric/electrostrictive layer 26 are subjected to wiring in a planar form to have a spiral configuration in which the pair of electrodes 28a, 28b are arranged in parallel to one another and separated from each other. Therefore, when a predetermined voltage is applied between the pair of electrodes 28a, 28b, an electric field is generated radially (isotropically) around the first principal surface of the piezoelectric/electrostrictive layer 26. Accordingly, elongation occurs radially (isotropically) at the first principal surface of the piezoelectric/electrostrictive layer 26. Simultaneously, elongation, which is smaller than the elongation of the surface portion, occurs radially (isotropically), or contraction occurs radially (isotropically) at deep portions in the piezoelectric/electrostrictive layer 26. Therefore, the piezoelectric/electrostrictive layer 26 efficiently makes displacement so that its central portion is convex. Moreover, dispersion in displacement is decreased among the respective picture elements.

Alternatively, when the pair of electrodes 28a, 28b on the piezoelectric/electrostrictive layer 26 have a branched planar configuration, displacement occurs as follows. Namely, when a predetermined voltage is applied between the pair of electrodes 28a, 28b, elongation occurs radially (isotropically) at the first principal surface of the piezoelectric/electrostrictive layer 26, in the same manner as the display device according to the embodiment of the present invention. Simultaneously, elongation, which is smaller than the elongation of the surface portion, occurs radially (isotropically), or contraction occurs radially (isotropically) at deep portions in the piezoelectric/electrostrictive layer 26. Therefore, the piezoelectric/electrostrictive layer 26 efficiently makes displacement so that its central portion is convex. Further, dispersion in displacement is decreased among the respective picture elements. Especially, when the branched configuration is adopted, the electrode is divided into the trunk 52, 54 and the branches 56, 58. Therefore, even if a part of the piezoelectric/electrostrictive layer 26, for example, a part of the piezoelectric/electrostrictive layer 26 corresponding to any branch 56, 58 is lost together with the branch 56, 58 due to dielectric breakdown or the like, the other parts are extremely scarcely affected thereby. The actuator element 14 sufficiently functions as long as the trunk 52, 54 remains. It is a matter of course that the original function before the loss can be restored only by repairing the lost branch 56, 58 of the electrode. Accordingly, it is possible to realize easy maintenance for the display device.

In the first illustrative operation of the display device according to the embodiment of the present invention, the pair of electrodes 28a, 28b of each of the actuator elements 14 are subjected to selective switching between the state in which the voltage is applied to the pair of electrodes 28a, 28b in an alternative manner (alternating voltage-applied state) and the no-voltage-loaded state so that light emission occurs at a predetermined position of the optical waveguide plate 12 (i.e., ON selection is made in the alternative voltage-applied state, and OFF selection is made in the no-voltage-loaded state). Therefore, control performance is enhanced when the image information is converted into the driving signal (voltage signal) to be supplied to the actuator element, and it is easy to optimize the display driving operation. As a result, the display device is advantageous in that the electric power consumption is lowered. The display device is also advantageous in that the image quality is improved, i.e., the display brightness is improved, and flicker is suppressed.

In the second illustrative operation of the display device according to the embodiment of the present invention, the main actuator element 30 is constructed by the pair of electrodes 28a, 28b formed on the first principal surface of the piezoelectric/electrostrictive layer 26. Further, as shown in FIG. 16B, the displacement characteristic of the actuator element 14, which is obtained by applying, between the pair of electrodes 28a, 28b, the electric field which is not less than four times the predetermined electric field, is asymmetrical in relation to the reference electric field point as the center. Accordingly, when the electric field is applied in the opposite direction after the polarization treatment is performed for the piezoelectric/electrostrictive layer 26, the polarization direction is inverted to be the same as the direction of the electric field in the vicinity of the surface of the piezoelectric/electrostrictive layer 26 because the intensity of the electric field is large, while the polarization direction is not inverted at deep portions of the piezoelectric/electrostrictive layer 26 because the intensity of the electric field is small. Namely, two types of polarization exist in the piezoelectric/electrostrictive layer 26, and thus the actuator element 14 functions as the pseudo-bi-morph type actuator element.

As a result, the direction of distortion in the vicinity of the surface of the piezoelectric/electrostrictive layer 26 is mutually opposite to that of the deep portions, and the entire actuator element 14 makes convex displacement in the first direction. The displacement amount is extremely large owing to the pseudo-bi-morph type action.

Especially, in the display device according to the embodiment of the present invention, the bending displacement characteristic is asymmetrical in the positive and negative directions of the electric field in relation to the reference electric field point (point of the electric field=0) as the center. Therefore, for example, the difference occurs in the bending displacement amount between the two peak values of the periodically changing electric field. Accordingly, the relative displacement amount is increased between the no-voltage-loaded state and the voltage-applied state, and the relative displacement amount is increased between the states in which electric fields in mutually opposite directions are applied respectively. Therefore, when the actuator elements 14 are arranged for the unit picture elements of the display device, the actuator elements 14 can be easily controlled, which is extremely advantageous to improve the image quality of the display device.

In the display device according to the embodiment of the present invention, the relationship of y=ax is satisfied, and the expression of $1/10 \leq a \leq 100$ is satisfied provided that x represents the distance between the pair of electrodes 28a, 28b ($1 \, \mu m \leq x \leq 200 \, \mu m$), and y represents the thickness of the piezoelectric/electrostrictive layer 26 ($1 \leq m \leq y \leq 100 \, \mu m$).

Accordingly, the displacement characteristic of the actuator element 14, which is obtained by applying the electric field between the pair of electrodes 28a, 28b, can be made asymmetrical in relation to the reference electric field point (point at which the electric field E=0) as the center, as shown in FIG. 16B.

In the display device according to the embodiment of the present invention, the vibrating section 22 and the fixed section 24 are formed in the integrated manner by using ceramic. The hollow space 20 is formed at the position corresponding to the vibrating section 22 so that the vibrating section 22 is thin-walled. Accordingly, the fixed section 24 and the vibrating section 22 can be easily produced. Therefore, the display device is advantageous in order to reduce the production cost.

In the display device according to the embodiment of the present invention, the relationship of y=bz is satisfied, and the expression of $1/5 \leq b \leq 10$ is satisfied provided that y represents the thickness of the piezoelectric/electrostrictive layer 26 ($1 \, \mu m \leq y \leq 100 \, \mu m$), and z represents the thickness of the vibrating section 22 ($1 \, \mu m \leq z \leq 50 \, \mu m$). Accordingly, as shown in FIG. 12B, the bending displacement characteristic, which is obtained by applying the electric field between the pair of electrodes 28a, 28b, can be made asymmetrical in relation to the reference electric field point as the center.

Figure 28:
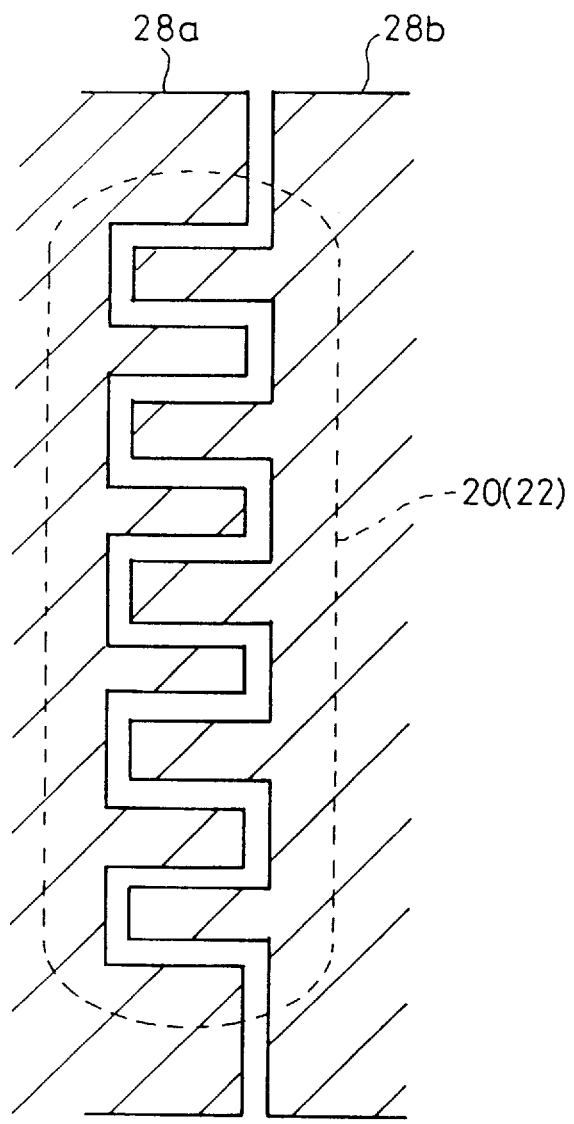
FIG. 28 shows a plan view illustrating a preferred embodiment including a pair of electrodes having a comb-shaped planar configuration, of the actuator element of the display device according to the embodiment of the present invention.

The display device according to the embodiment of the present invention has been specifically explained, as including the pair of electrodes 28a, 28b having the spiral planar configuration or the branched planar configuration. However, as shown in FIG. 28, the pair of electrodes 28a, 28b may have a comb-shaped configuration. In this embodiment, it is preferable that a pair of comb-shaped electrodes are formed, in which the shape of the vibrating section 22 satisfies a length-to-width ratio (aspect ratio) of not more than 0.25 or not less than 4.0, and the direction of arrangement of a large number of comb teeth is directed along the longitudinal direction of the vibrating section 22. When this condition is satisfied, the same effect as those obtained by using the spiral configuration and the branched planar configuration can be obtained by using the pair of electrodes 28a, 28b having the comb-shaped configuration.

However, in order to increase the relative displacement amount, it is most preferable that the shape of the vibrating section 22 has an aspect ratio of 0.25 to 4.0, and preferably 0.5 to 2.0, and the pair of electrodes 28a, 28b have the spiral or branched planar configuration.

Figure 29:
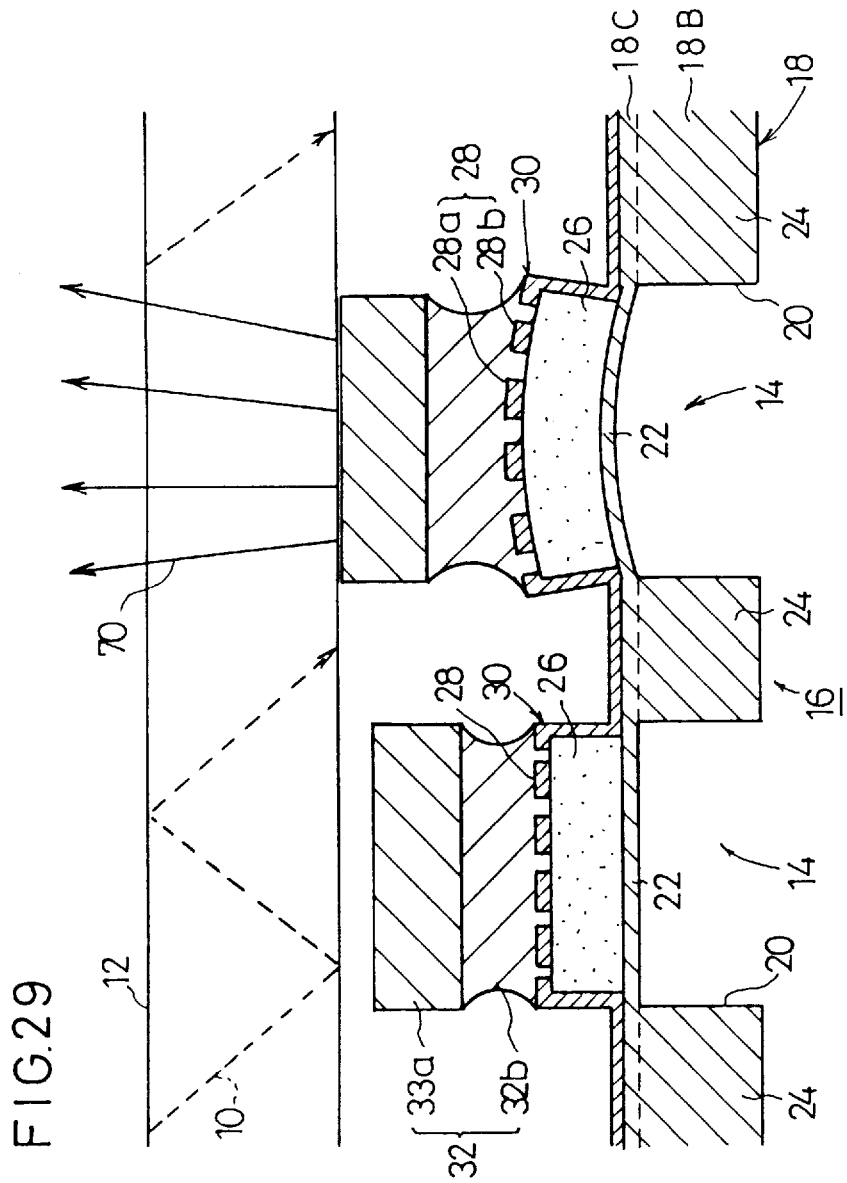
FIG. 29 shows an arrangement illustrating another illustrative structure of a substrate to be included in the display device according to the embodiment of the present invention.
Figure 30:
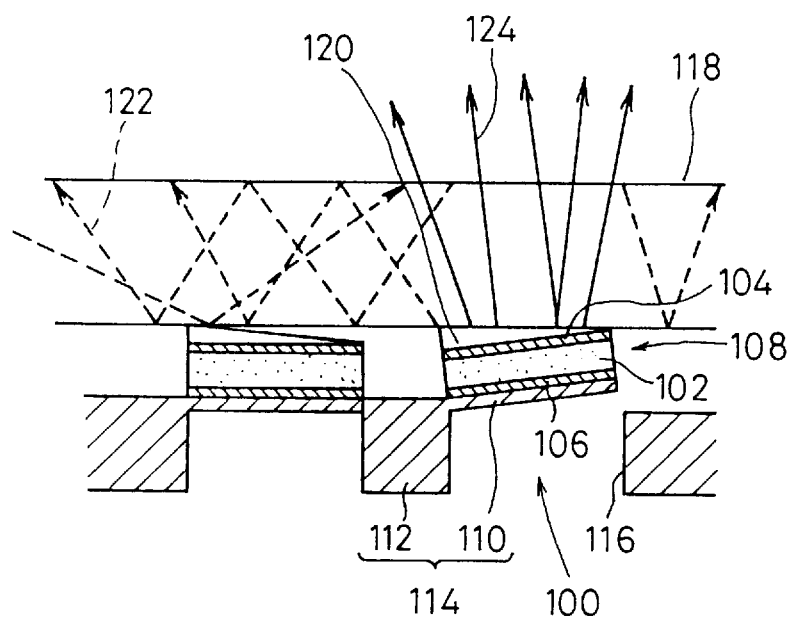
FIG. 30 shows an arrangement illustrating an illustrative display device suggested by the present applicant.
Figure 31A:
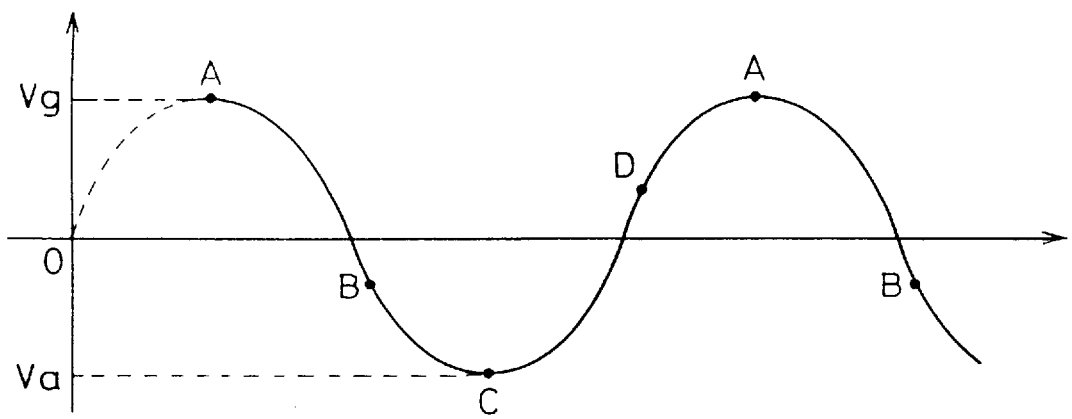
FIG. 31A shows a timing chart illustrating an electric potential waveform to be applied to upper and lower electrodes in order to measure a bending displacement characteristic of an actuator element of the illustrative display device suggested by the present applicant.
Figure 31B:
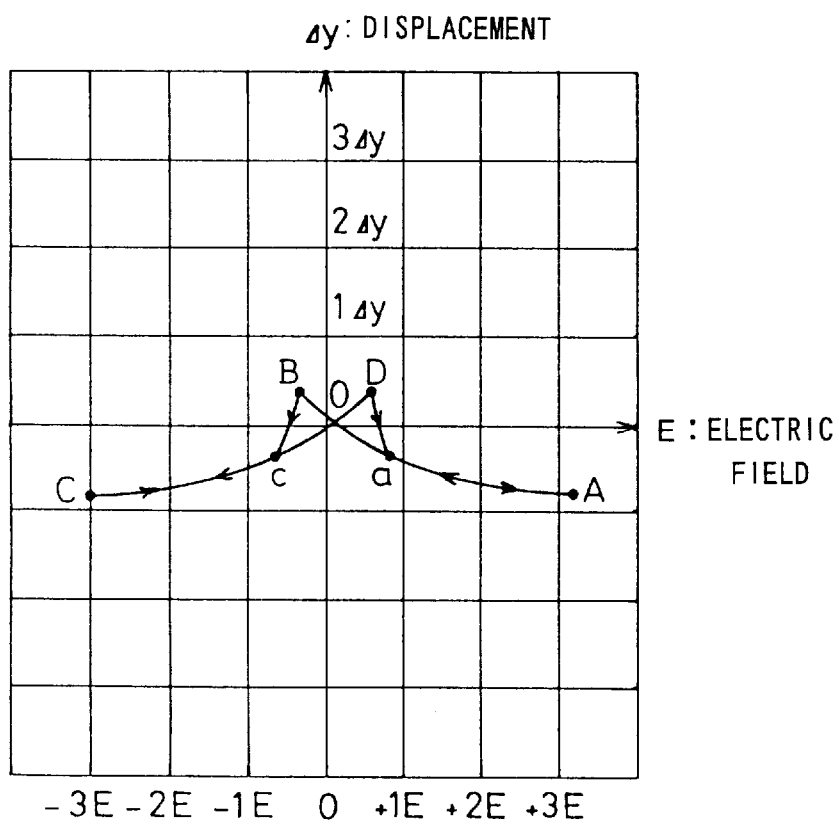
FIG. 31B shows a characteristic curve illustrating the bending displacement characteristic of the actuator element.
Figure 32A:
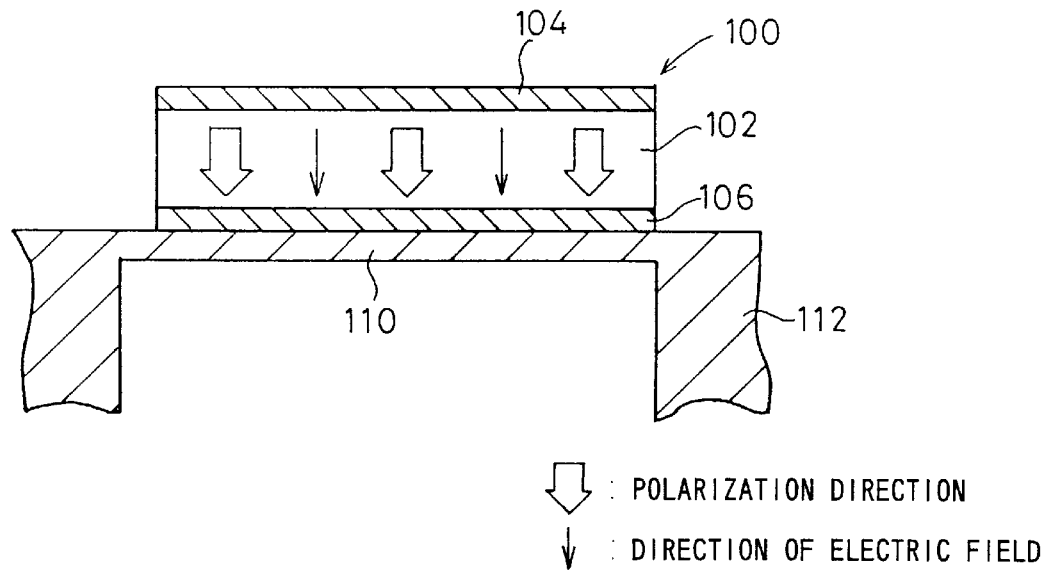
FIG. 32A explanatorily shows a polarization direction and a direction of an electric field obtained in a state in which the electric field (+3E) is applied in the positive direction to the actuator element of the illustrative display device suggested by the present applicant.
Figure 32B:
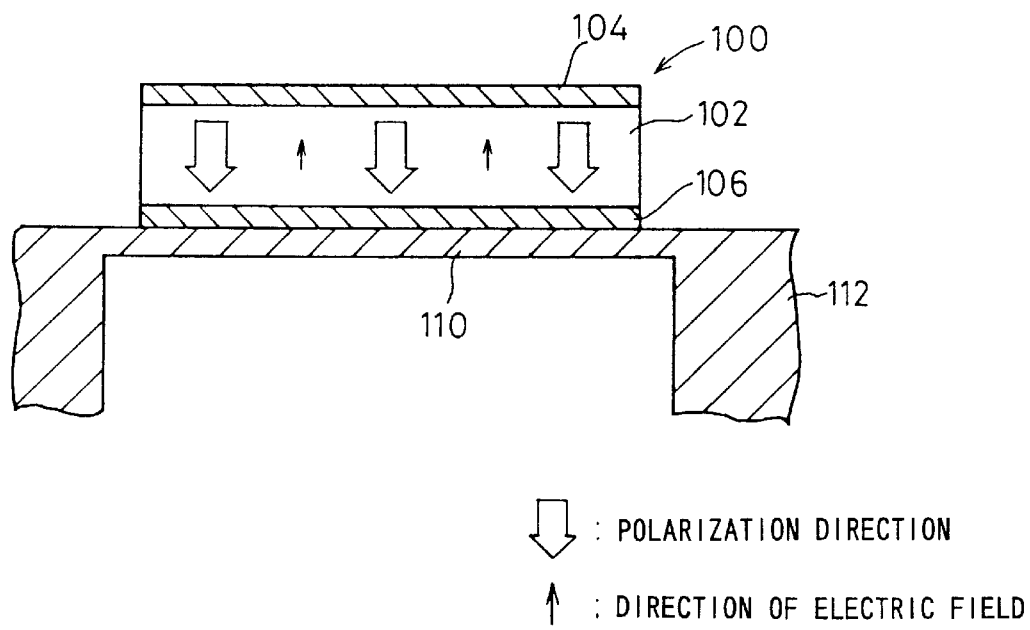
FIG. 32B explanatorily shows a polarization direction and a direction of an electric field obtained in a state in which the predetermined electric field (−0.5E) in the negative direction is applied to the actuator element.
Figure 33A:
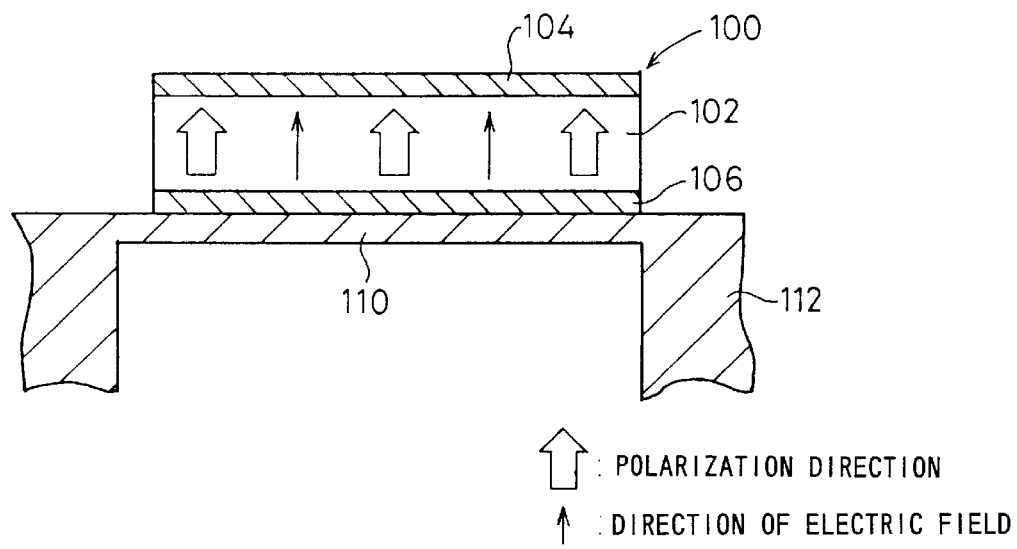
FIG. 33A explanatorily shows a polarization direction and a direction of an electric field obtained in a state in which the electric field (−3E) is applied in the negative direction to the actuator element of the illustrative display device suggested by the present applicant.
Figure 33B:
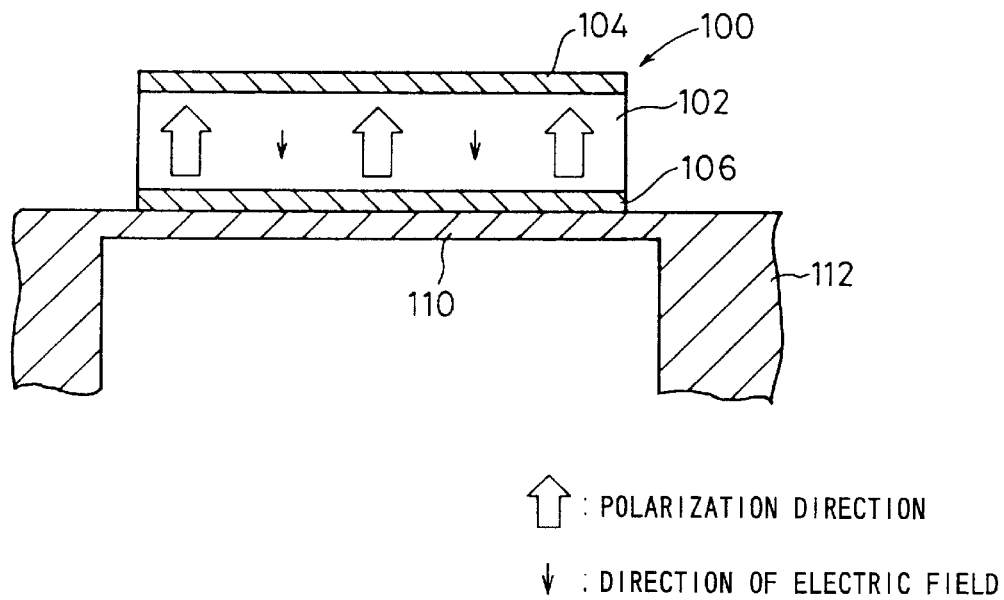
FIG. 33B explanatorily shows a polarization direction and a direction of an electric field obtained in a state in which the predetermined electric field (+0.5E) in the positive direction is applied to the actuator element.

In the display device according to the embodiment of the present invention, the substrate 18 has the stacked structure comprising the substrate layer 18A, the spacer layer 18B, and the thin plate layer 18C as shown in FIG. 1. Alternatively, as shown in FIG. 29, the substrate layer 18A as the lowermost layer may be omitted.

In the display device according to the embodiment of the present invention and the display devices according to the modified embodiments, those used as the optical waveguide plate 12 have a high flatness and a high smoothness at the both surfaces. Alternatively, it is also possible to use a plate of so-called ground glass having a back surface treated to be rough. In this embodiment, the first surface of the displacement-transmitting section 32 (surface opposed to the back surface of the ground glass plate) is treated to be rough corresponding to the rough surface configuration of the back surface of the ground glass plate. Alternatively, the first surface portion of the displacement-transmitting section 32 is constructed by using an elastomer having a relatively low viscosity.

In such an arrangement, at first, the light coming from the front is reflected by the rough surface of the ground glass plate, and the light is transmitted as scattered light toward the front surface of the ground glass plate. In this state, when a certain actuator element 14 is made to have the voltage-applied state or the ON selection state, and the displacement-transmitting section 32 corresponding to the actuator element 14 contacts with the back surface of the ground glass plate, then a situation occurs in which the rough surface portion corresponding to the contact portion is counteracted by the rough surface of the displacement-transmitting section 32 or elastic deformation of the displacement-transmitting section 32. Accordingly, the light, which has been reflected by the rough surface portion of the ground glass plate, is transmitted through the displacement-transmitting section 32 contacting with the back surface of the ground glass plate.

Namely, when the ground glass plate is used as the optical waveguide plate 12, the presence or absence of light emission at the front surface of the ground glass plate can be controlled depending on the presence or absence of contact of the displacement-transmitting section 32 located at the back surface of the ground glass plate. Thus it is possible to obtain the same effect as those provided by the display device according to the embodiment of the present invention and the display devices according to the modified embodiments. Especially, when the ground glass plate is used as described above, any illumination means for actively introducing light into the ground glass plate is unnecessary. Accordingly, the arrangement is more simplified.

The display device according to the present invention has been specifically explained on the basis of the display device according to the embodiment of the present invention and the display devices according to the first to fourth modified embodiments. However, the present invention should not be interpreted such that it is limited to the embodiment and the modified embodiments. It is possible to apply, to the present invention, various changes, modifications, and improvements without deviating from the scope of the present invention.

What is claimed is:

1. A display device including an optical waveguide plate for introducing light thereinto, and a driving unit disposed opposingly to one plate surface of said optical waveguide plate and arranged with actuator elements of a number corresponding to a large number of picture elements, for displaying a picture on said optical waveguide plate in accordance with an image signal by controlling displacement movement of each of said actuator elements in a direction to make contact or separation with respect to said optical waveguide plate in accordance with an attribute of said image signal to be inputted so that leakage light is controlled at a predetermined position on said optical waveguide plate, each of said actuator elements comprising:

a main actuator element including a piezoelectric/electrostrictive layer, and a pair of electrodes formed on a first principal surface of said piezoelectric/electrostrictive layer;

a vibrating section contacting with a second principal surface of said piezoelectric/electrostrictive layer, for supporting said main actuator element;

a fixed section for supporting said vibrating section in a vibrative manner; and a displacement-transmitting section for transmitting, to said optical waveguide plate, said displacement movement of said actuator element caused by applying a voltage between said pair of electrodes.

2. The display device according to claim 1, wherein:
said vibrating section and said fixed section are formed of ceramic in an integrated manner; and
a hollow space is formed at a portion corresponding to said vibrating section so that said vibrating section is thin-walled.

3. The display device according to claim 2, wherein both of said hollow space and said piezoelectric/electrostrictive layer have smoothly cornered planar configurations respectively, and said planar configuration of said hollow space has a size larger than that of said piezoelectric/electrostrictive layer.

4. The display device according to claim 3, wherein both of said hollow space and said piezoelectric/electrostrictive layer have circular planar configurations respectively.

5. The display device according to claim 3, wherein both of said hollow space and said piezoelectric/electrostrictive layer have oblong planar configurations respectively.

6. The display device according to claim 3, wherein both of said hollow space and said piezoelectric/electrostrictive layer have rectangular planar configurations with smooth corners respectively.

7. The display device according to claim 3, wherein both of said hollow space and said piezoelectric/electrostrictive layer have polygonal planar configurations with respective apex angle portions having rounded shapes respectively.

8. The display device according to claim 1, wherein said pair of electrodes on said piezoelectric/electrostrictive layer have a spiral planar configuration in which said pair of electrodes are arranged in parallel to one another and separated from each other.

9. The display device according to claim 1, wherein both of said pair of electrodes on said piezoelectric/electrostrictive layer have a planar configuration in which a lot of branches are spread from a trunk which extends toward a center of said piezoelectric/electrostrictive layer, and said pair of electrodes are separated from each other and arranged complementarily.

10. The display device according to claim 1, wherein spontaneous distortion is removed to operate said actuator element by applying a signal between said pair of electrodes to invert a polarization direction of said piezoelectric/electrostrictive layer.

11. The display device according to claim 1, wherein a bending displacement characteristic of said actuator element, which is obtained by applying an electric field not less than four times a predetermined electric field between said pair of electrodes, is asymmetrical in relation to a reference electric field point as a center.

12. The display device according to claim 11, wherein a relationship of $A \geq 1.5B$ is satisfied provided that A and B represent amounts of bending displacement obtained by applying electric fields which are not less than four times two predetermined electric fields having an identical absolute value and having different directions respectively, on the basis of said reference electric field point.

13. The display device according to claim 11, wherein assuming that said voltage is applied between said pair of electrodes within a predetermined voltage range, said voltage is applied to a group of said actuator elements to be subjected to ON selection, selected from said large number of said actuator elements, in a direction to maximize a displacement amount in a first direction in said bending displacement characteristic.

14. The display device according to claim 11, wherein assuming that said voltage is applied between said pair of electrodes within a predetermined voltage range, said voltage is applied to a group of said actuator elements to be subjected to OFF selection, selected from said large number of said actuator elements, in a direction to minimize a displacement amount in a first direction in said bending displacement characteristic.

15. The display device according to claim 11, wherein assuming that said voltage is applied between said pair of electrodes within a predetermined voltage range, said voltage is applied to a group of said actuator elements to be subjected to NO selection, selected from said large number of said actuator elements, in a direction to minimize a displacement amount in a first direction in said bending displacement characteristic.

16. The display device according to claim 1, wherein:
   a relationship of y = ax is satisfied; and
   an expression of $1/10 \leq a \leq 100$ is satisfied provided that x represents a distance between said pair of electrodes ($1 \mu m \leq x \leq 200 \mu m$), and y represents a thickness of said piezoelectric/electrostrictive layer ($1 \mu m \leq y \leq 100 \mu m$).

17. The display device according to claim 16, wherein an expression of $1/5 \leq a \leq 10$ is satisfied.

18. The display device according to claim 16, wherein an expression of $1/2 \leq a \leq 5$ is satisfied, and expressions of $1 \mu m \leq x \leq 60 \mu m$ and $1 \mu m \leq y \leq 40 \mu m$ are satisfied.

19. The display device according to claim 16, wherein:
   a relationship of y=bz is satisfied; and
   an expression of $1/5 \leq b \leq 10$ is satisfied provided that z represents a thickness of said vibrating section ($1 \mu m \leq z \leq 50 \mu m$).

20. The display device according to claim 19, wherein an expression of $1/3 \leq b \leq 5$ is satisfied.

21. The display device according to claim 19, wherein an expression of $1/3 \leq b \leq 5$ is satisfied, and expressions of $1 \mu m \leq y \leq 40 \mu m$ and $1 \mu m \leq z \leq 20 \mu m$ are satisfied.

22. The display device according to claim 10, wherein said vibrating section has a cross-sectional configuration corresponding to a shortest dimension m passing through a center of said vibrating section, and said cross-sectional configuration satisfies the following conditions (1) to (3) in a no-voltage-loaded state:

(1) at least a part of an upper surface of said piezoelectric/electrostrictive layer in the vicinity of its center makes a protrusion in a direction directed oppositely to said vibrating section from a reference line formed by connecting one outermost local minimum point and the other outermost local minimum point adjacent to said fixed section;

(2) when said outermost local minimum point as defined above is not present, said outermost local minimum point is regarded to be a point included in an upper surface of said vibrating section along said minimum dimension m and corresponding to a boundary point between said fixed section and said vibrating section;

(3) assuming that a boundary between said vibrating section and said fixed section is a zero position, and a length of said shortest dimension m of said vibrating section is 100%, when said outermost local minimum point is absent in a range of 40% of said length of said shortest dimension m of said vibrating section starting from said zero position, then said outermost local minimum point is regarded to be said point included in said upper surface of said vibrating section along said minimum dimension m and corresponding to said boundary point between said fixed section and said vibrating section.

23. The display device according to claim 22, wherein an amount t of said protrusion satisfies $m/1000 \leq t \leq m/10$ when at least said part of said upper surface of said piezoelectric/electrostrictive layer in the vicinity of its center makes said protrusion in said direction directed oppositely to said vibrating section from said reference line formed by connecting said one outermost local minimum point and said other outermost local minimum point adjacent to said fixed section.

* * * * *

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 1, line 39, please delete "been".

Col. 2, line 2, please delete "with" and insert --at--;
 line 4, please delete ", for example,";
 line 23, please delete ", for example,"; and
 line 57, please change "a" to --the--.

Col. 3, line 56, please change "At a" to --When--;
 line 57, please delete "stage at which"; and
 line 66, please delete "When" and insert --By contrast, when--.

Col. 4, line 33, please delete "This fact" and insert --Consequently--;
 line 34, please delete "involves a possiblity for" and change "to be" to --is--;
 line 44, please change ", in addition to an" to --. In addition,--;

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 4, line 45, please delete "advantage that";

line 50, please change "and it is" to --thereby making it--;

line 56, please insert --a number of-- before "actuator";

line 57, please delete "of a number";

line 65, please change "plate, wherein the" to --plate. The--; and line 66, please delete "main actuator element including a".

Col. 5, line 5, please change ", and" to --.--;

line 6, please change "wherein the" to --The--;

line 11, please delete ", for example,";

line 17, please delete ", for example,";

line 52, please insert --a-- before "human"; and line 56, please insert --is-- before "based".

UNITED STATES PATENT AND TRADEMARK OFFICE
CERTIFICATE OF CORRECTION

PATENT NO. : 5,862,275

DATED : January 19, 1999

INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 6, line 39, please change "In" to --As a result--;

line 40, please delete in its entirety;

line 41, please delete "piezoelectric/electrostrictive layer";

line 47, please change "," to --.--;

line 48, please change "and thus" to --Thus--;

line 54, please change "Namely" to --Consequently--;

line 60, please change "Especially" to --Thus--;

line 61, please change "at portions corresponding to the" to --in--;

line 64, please change "As described above, the display" to --Advantageously,--;

line 65, delete in its entirety;

line 66, please delete "that"; and line 67, please change "in addition to an advantage that" to --and--.

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 7, line 8, please delete "due to";

line 9, please delete "dielectric breakdown or the like" and "for";

line 10, please delete "example,";

lines 12-13, please change "it is possible to eliminate vain efforts such as reproduction of" to --the need to reproduce--;

line 14, please change "steps" to --is eliminated--;

lines 16-17, please change "In the display device according to the present invention, it is preferable that" to --Preferably--;

lines 22-23, please change ",which is advantageous in that" to --. Thus,--;

line 24, please delete "to be cheap";

lines 35-36, please change "In the display device according to the present invention, it is preferable that" to --Preferably,--;

line 38, please insert --,-- after "configurations" and change ", and" to --. Moreover--;

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 7, line 39, please change "has" to --should have--;

line 47, please change "it is" to --making it--;

lines 48-49, please delete "it is possible to realize";

line 62, please change "it is" to --making it--;

line 63, please delete "it is possible to realize"; and lines 65-66, please change "In the display device according to the present invention, it is preferable" to --Preferably,--.

Col. 8, lines 19-20, please change "In the display device according to the present invention, it is preferable" to --Preferably,--;

line 40, please delete "for";

line 41, please delete in its entirety;

line 44, please change "extremely scarcely" to --rarely--;

lines 45-46, please change "It is a matter of course that" to --Since--;

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 8, line 47, please delete "only";

line 48, please delete "Accordingly,"; and lines 50-51, please change "In the display device according to the present invention, it is preferable" to --Preferably,--.

Col. 9, lines 2-3, please change "in the case of the structure in which" to --when--;

line 18, please change ", after" to --. Afterwards--;

line 29, please insert --as-- before "an";

line 33, please delete "for example,";

line 35, please insert --,-- after --electrodes--;

line 37, please delete "superficial";

line 45, please change "accordance with the generation of" to --generating--;

line 46, please delete "for example,";

line 52, please delete ", for example,"; and

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 9, line 58, please change ", and" to --. Thus--.

Col. 10, line 3, please change "at a stage in which" to --when--;

line 6, please change ", and hence" to --. Hence--;

line 11, please insert --an-- before "inversion";

line 24, please insert --,-- after "Thus";

line 30, please change "Especially, in the present invention" to --Notably--;

line 33, please change "as" to --at-- and delete "for example,";

line 44, please change "order to improve" to --improving--;

line 53, please change "In accordance with the" to --According to this--; and line 55, please change "as" to --at--.

Col. 11, lines 23-24, please change "as for the display device according to this" to --in the--;

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 11, lines 24-25, please delete "of the present invention"; and line 47, please change "In the present invention, it is preferable that" to --Preferably,--.

Col. 16, line 20, please delete ", as shown in FIG.";

line 21, "1";

lines 22-23, please delete "according to the embodiment of the present invention";

lines 30-31, please change "make advantageous joining between" to --join--;

line 32, please delete "it is preferable that";

lines 36-37, please change "in a state in which" to --such that--;

line 37, please delete ", as in" and insert --,--;

line 38, please delete in its entirety;

line 39, please delete in its entirety; and line 59, please change "have, for example," to --may have--.

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 19, between lines 9-10, please insert --<u>Operation of the Display Device</u>--;

line 23, please change "any" to --no--;

line 24, please delete "not"; and lines 45-46, please change ", however" to --. However--.

line 12, please delete " of the present invention"; and line 40, please change ", for" to --. For--.

Col. 22, line 32, please change "," to --. By contrast,--;

line 33, please delete "and"; and line 64, please change ", while" to --. By contrast,--.

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 23, line 51, please change "In the case of the display device according" to --According--;

line 52, please delete "embodiment of the"; and between lines 65 and 66, please insert --Dimensional Relationships for Asymmetrical Bending Displacement--.

Col. 26, line 52, please insert --now-- before "be".

Col. 27, line 7, please delete "for example";

line 11, please change ", and" to --. As a result,--;

line 12, please insert --,-- after "14" and after "element";

line 18, please change ", and" to --. Consequently,--; and lines 36-37, please change ", and the" to --. The--.

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 28, line 30, please change ", and" to --. That is,--;

line 40, please delete "disposed at the back of the optical" and insert --. In--;

lines 41, please delete in its entirety;

line 42, please delete "ing to the embodiment of";

line 45, please insert --,-- after "12";

line 59, please delete "of the display device according to the"; and line 60, please delete "embodiment of the present invention".

Col. 29, line 32, please change "Those preferably used as a" to --Preferably, the--;

line 33, please change "to be" to --that is--;

line 34, please insert --may-- after "12" and delete ", for example,";

line 40, please delete "according to the embodiment of the"

line 41, please delete "present invention" and change "Besides, the" to --The--;

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 29, line 42, please delete "according to the embodiment of the present invention"; and line 43, please insert --also-- after "may".

Col. 30, line 16, please delete in its entirety and insert --In addition,--;

line 17, please delete "that" and change "is" to --can be--;

line 37, please delete ", because of the" and insert --since--;

line 38, please delete "following reason. Namely, when";

line 42, please change ", the" to --. The--;

line 49, please delete "of the pair of electrodes 28 formed on";

line 50, please delete "the substrate 18"; and line 57, please change "Those usable as the ceramic" to --Suitable Ceramic Materials--.

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 31, line 36, please change "Those usable as" to --Suitable ceramic materials--;

line 37, please delete "the ceramic material";

line 52, please change "in order not to" to --so that--;

line 53, please delete "contain an" and change "liable to" to --will not--;

line 54, please delete "because of the";

line 55, please delete "following reason";

line 59, please change ", making" to --. This makes--;

line 61, please delete "make a"; and line 62, please change "cause to deteriorate" to --may cause deterioration of--.

Col. 32, line 5, please change ", and it" to --. It--; and line 13, please change "Those usable" to --Suitable materials--.

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 33, line 6, please delete "for example,";

line 56, please delete in its entirety; and line 57, please change "displacement transmitting section 32, the" to --The--.

Col. 34, line 10, please change "use those having" to --have--;

line 47, please change "based on the use of" to --which uses-- and insert --,-- after "mold";

line 48, please change "based on the use of" to --which uses-- and change ", the" to --. The--; and line 51, please change ", and they" to --. They--.

Col. 36, line 8, please change "It is needless to say that the" to --The--;

lines 17-18, please delete "according to the embodiment of the present invention";

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 36, line 22, please delete in its entirety;

line 23, please change "present invention, the" to --The--;

line 45, please change "Especially, it" to --It--;

line 51, please delete "according to the embodiment";

line 52, please delete "of the present invention" and insert --in-- after "advantage"; and line 60, please change "and it is" to --thus making it--.

Col. 37, line 22, please delete "for example,";

line 26, please delete "," and insert --.--;

line 27, please change "and it is" to --It is also--;

line 29, please delete in its entirety;

line 30, please change "present invention, the" to --The--;

UNITED STATES PATENT AND TRADEMARK OFFICE
CERTIFICATE OF CORRECTION

PATENT NO. : 5,862,275
DATED : January 19, 1999
INVENTOR(S) : Yukihisa Takeuchi, Tsutomu Nanataki, Iwao Ohwada and Masao Takahashi It is certified that error appears in the above-identified patent and that said Letters Patent is hereby corrected as shown below:

Col. 37, line 53, please delete in its entirety; and line 54, please change "both" to --Both--.

Col. 38, line 10, please change "it is possible to realize a long" to --thereby resulting in a longer--;

line 11, please change ", and consequently" to --. Consequently,--;

line 13, please delete in its entirety and insert --According to--; and line 63, please delete "according to the embodiment of the present invention".

Col. 39, line 15, please delete "according to the embodiment of the present invention".

Col. 40, line 5, please delete in its entirety; and line 6, please change "present invention, the" to --The--.

Signed and Sealed this

Twenty-third Day of January, 2001

Attest:

Attesting Officer

Q. TODD DICKINSON
Commissioner of Patents and Trademarks